(12) United States Patent
Simon et al.

(10) Patent No.: US 12,384,234 B2
(45) Date of Patent: Aug. 12, 2025

(54) MODULAR ELECTRIC VEHICLE BATTERY CONFIGURATION

(71) Applicant: PAGE-ROBERTS AUTOMOTIVE LIMITED, Poole (GB)

(72) Inventors: Mark Simon, Poole (GB); Neil Hutchinson, Poole (GB)

(73) Assignee: PAGE-ROBERTS AUTOMOTIVE LIMITED, Poole (GB)

(*) Notice: Subject to any disclaimer, the term of this patent is extended or adjusted under 35 U.S.C. 154(b) by 93 days.

(21) Appl. No.: 17/905,751

(22) PCT Filed: Feb. 10, 2021

(86) PCT No.: PCT/EP2021/053252
§ 371 (c)(1),
(2) Date: Sep. 6, 2022

(87) PCT Pub. No.: WO2021/175549
PCT Pub. Date: Sep. 10, 2021

(65) Prior Publication Data
US 2023/0173903 A1  Jun. 8, 2023

(30) Foreign Application Priority Data

Mar. 6, 2020  (GB) .................................. 2003348
Feb. 9, 2021  (GB) .................................. 2101785

(51) Int. Cl.
*B60K 1/04* (2019.01)
*B60L 50/60* (2019.01)
(Continued)

(52) U.S. Cl.
CPC ............... *B60K 1/04* (2013.01); *B60L 50/66* (2019.02); *B60N 2/01* (2013.01); *H01M 50/249* (2021.01);
(Continued)

(58) Field of Classification Search
CPC ............... B60K 1/00; B60K 2001/044; B60K 2001/0427; B60K 2001/0433;
(Continued)

(56) References Cited

U.S. PATENT DOCUMENTS 3,477,538 A * 11/1969 Hall ..................... B60K 7/0007
105/51
3,746,389 A * 7/1973 Fourrey ............... B60N 2/3075
297/15
(Continued)

FOREIGN PATENT DOCUMENTS

CN   205574081 U   9/2016
CN   108528251 A   9/2018
(Continued)

OTHER PUBLICATIONS

International Search Report for corresponding application No. PCT/EP2021/053252, dated Apr. 9, 2021.
(Continued)

*Primary Examiner* — Jason D Shanske
*Assistant Examiner* — James J Triggs
(74) *Attorney, Agent, or Firm* — LEASON ELLIS LLP

(57) ABSTRACT

The invention generally relates to an electric vehicle having an electric motor and a pack for storing energy, said vehicle configured having: at least two passenger seats, including a first seat, and a second seat, positioned behind the front seat and configured to face rearward; and the pack having: a lateral module configured to extend perpendicularly to the longitudinal axis of the vehicle between the first seat and the second seat.

17 Claims, 25 Drawing Sheets

(51) Int. Cl.
  *B60N 2/01* (2006.01)
  *H01M 50/249* (2021.01)
  *H01M 50/258* (2021.01)
(52) U.S. Cl.
  CPC ... *H01M 50/258* (2021.01); *B60K 2001/0422* (2013.01); *B60K 2001/0427* (2013.01); *B60K 2001/0433* (2013.01); *B60K 2001/0438* (2013.01); *H01M 2220/20* (2013.01)
(58) Field of Classification Search
  CPC ... B60K 2001/0438; B60L 50/66; B60N 2/01; H01M 2220/20
  See application file for complete search history.

(56) References Cited

U.S. PATENT DOCUMENTS

| | | | |
|---|---|---|---|
| 5,114,184 | A | 5/1992 | Shimomura et al. |
| 6,170,847 | B1 | 1/2001 | Pham |
| 9,308,805 | B2 | 4/2016 | Hiroyasu et al. |
| 2011/0198137 | A1 | 8/2011 | De Paschoal |
| 2012/0019032 | A1 | 1/2012 | Sjoquist et al. |
| 2012/0175177 | A1 | 7/2012 | Lee et al. |
| 2013/0000997 | A1 | 1/2013 | Peng et al. |
| 2013/0248267 | A1 | 9/2013 | Nitawaki |
| 2014/0023902 | A1* | 1/2014 | Takeshita ............ H01M 50/213 429/96 |
| 2014/0302362 | A1 | 10/2014 | Takizawa |
| 2015/0246606 | A1 | 9/2015 | Katayama et al. |
| 2018/0111483 | A1 | 4/2018 | Nakayama |
| 2018/0170188 | A1 | 6/2018 | Uneme et al. |
| 2018/0244142 | A1 | 8/2018 | Takayanagi et al. |
| 2019/0092262 | A1 | 3/2019 | Mummigatti et al. |
| 2020/0207201 | A1 | 7/2020 | Favaretto |

FOREIGN PATENT DOCUMENTS

| | | |
|---|---|---|
| DE | 10 2011 119540 A1 | 5/2013 |
| DE | 102013212870 | 10/2018 |
| DE | 10201810834 A1 | 8/2019 |
| DE | 102018101834 A1 | 8/2019 |
| EP | 2418709 A1 | 2/2012 |
| EP | 2730484 A1 | 5/2014 |
| EP | 4353508 A1 | 4/2024 |
| GB | 2569664 A | 6/2019 |
| GB | 2588255 A | 4/2021 |
| GB | 2592754 A | 9/2021 |
| JP | H05201356 A | 8/1993 |
| JP | H0976798 A | 3/1997 |
| JP | 2013244861 A | 12/2013 |
| JP | 2015107727 A | 6/2015 |
| WO | 93/12945 A1 | 7/1993 |
| WO | 2009112415 A1 | 9/2009 |

OTHER PUBLICATIONS

EP Exam Report in EP Application No. 23210584.1, mailed Apr. 3, 2024 (2 pages).

* cited by examiner

| Battery shape | Segment | Model | Area of the vehicle ||||||| Total |
|---|---|---|---|---|---|---|---|---|---|
| | | | Front Bay | Front Floor | Front Seat | Rear Floor | Tunnel | Rear Seat | Rear Bay | |
| H-shape | A | VW Up | 0 | 0 | 50 | 0 | 30 | 70 | 0 | 150 |
| H-shape | C | VW eGolf | 0 | 0 | 55 | 0 | 35 | 110 | 0 | 200 |
| H-shape | C | Hyundai Kona | 0 | 0 | 70 | 0 | 55 | 140 | 0 | 265 |
| T-shape | C | Chevrolet Volt | 0 | 50 | 70 | 0 | 55 | 140 | 0 | 265 |
| T-shape | Sports | Rimac C2 | 0 | 100 | 0 | 60 | 130 | 0 | 180 | 360 |
| Underfloor | C | Nissan Leaf | 0 | 130 | 60 | 80 | 0 | 115 | 0 | 335 |
| Underfloor | D | Jaguar I-Pace | 65 | 125 | 100 | 70 | 0 | 85 | 0 | 460 |
| Underfloor | E | Tesla Model S | 65 | 125 | 95 | 70 | 0 | 80 | 0 | 435 |

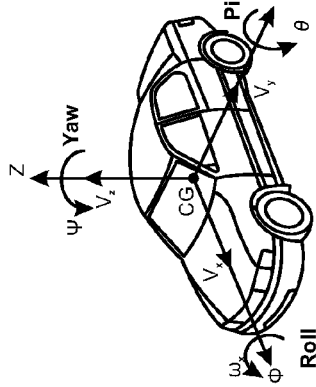

| Segment | Re-configured vehicle examples | Volumes Tunnel | Volumes Lateral | Volumes Rear | Volumes Total | Volume Ratio of total volume Tunnel | Volume Ratio of total volume Lateral | Volume Ratio of total volume Rear | Electric Powertrain Position Front Motor | Electric Powertrain Position Rear Motor | Steering and Suspension Front Mounted Steering Rack | Steering and Suspension Independent Rear Suspension | Steering and Suspension Rear Perimeter Frame |
|---|---|---|---|---|---|---|---|---|---|---|---|---|---|
| UNIT | | Litres | Litres | Litres | Litres | % | % | % | Y/N | Y/N | Y/N | Y/N | Y/N |
| Measurement direction | REFERENECE | | | | | | | | | | | | |
| Sub A-Segment | Smart | 78 | 379 | 0 | 457 | 17% | 83% | 0% | N | Y | Y | Y | N |
| A-Segment | VW UP | 126 | 470 | 47 | 642 | 20% | 73% | 7% | Y | N | N | N | N |
| B-Segment | Audi A1 | 140 | 493 | 46 | 679 | 21% | 73% | 7% | Y | N | N | N | N |
| C-Segment | Audi A3 | 145 | 504 | 36 | 685 | 21% | 74% | 5% | Y | N | N | Y | N |
| D-Segment | Audi A4 | 148 | 530 | 63 | 742 | 20% | 72% | 9% | Y | N | N | Y | N |
| E-Segment | Audi A6 | 159 | 574 | 60 | 792 | 20% | 72% | 8% | Y | Y | Y | Y | Y |
| F-Segment | Audi A8 | 157 | 599 | 75 | 831 | 19% | 72% | 9% | Y | Y | Y | Y | Y |
| Sports C-Segment | Audi TT | 153 | 475 | 13 | 640 | 24% | 74% | 2% | Y | Y | N | Y | N |
| Sports C-Segment | Independent EXAMPLE | 154 | 425 | 48 | 627 | 25% | 68% | 8% | Y | Y | N | Y | N |

Manufactures data 1234 bold, shaded
Measured data *1234* italic
Engineering estimate *1234* bold, italic
Calculation 1234 normal

FIG. 8a

| Segment | Measurement direction | | Vehicle Dimensions | | | | | | | | | Wheels and Tyres | | | | | | |
|---|---|---|---|---|---|---|---|---|---|---|---|---|---|---|---|---|---|---|
| | | UNIT | mm | mm | mm | mm | % | mm | mm | mm | mm | mm | inch | mm | mm | mm | inch | mm |
| | | | Length | Width | Height | SgRP/height | Ground Clearance | Wheelbase | Front Track | Rear Track | Interior Width | Front Type Width | Front Type Profile | Front Type Diameter | Front Type Outer Daimeter | Rear Type Width | Rear Type Profile | Rear Type Daimeter | Rear Type Outer Daimeter |
| | REFERENECE | | | | | | | | | | | | | | | | | | |
| | Re-configured vehicle examples | | | | | | | | | | | | | | | | | | |
| Sub A-Segment | Smart | | 2695 | 1663 | 1555 | 41% | 132 | 1873 | 1469 | 1430 | 1330 | 165 | 65 | 15 | 596 | 185 | 60 | 15 | 603 |
| A-Segment | VW UP | | 3600 | 1641 | 1504 | 35% | 144 | 2407 | 1428 | 1424 | 1420 | 185 | 55 | 15 | 585 | 185 | 55 | 15 | 585 |
| B-Segment | Audi A1 | | 3973 | 1740 | 1416 | 37% | 122 | 2469 | 1477 | 1471 | 1440 | 215 | 45 | 16 | 600 | 215 | 45 | 16 | 600 |
| C-Segment | Audi A3 | | 4241 | 1777 | 1424 | 36% | 140 | 2602 | 1543 | 1514 | 1475 | 205 | 55 | 16 | 632 | 205 | 55 | 16 | 632 |
| D-Segment | Audi A4 | | 4738 | 1842 | 1427 | 35% | 140 | 2820 | 1572 | 1555 | 1476 | 225 | 50 | 17 | 657 | 225 | 50 | 17 | 657 |
| E-Segment | Audi A6 | | 4939 | 1886 | 1457 | 34% | 132 | 2924 | 1630 | 1617 | 1527 | 255 | 55 | 18 | 738 | 255 | 55 | 18 | 738 |
| F-Segment | Audi A8 | | 5172 | 1945 | 1473 | 34% | 145 | 2998 | 1644 | 1633 | 1584 | 235 | 55 | 18 | 716 | 235 | 55 | 18 | 716 |
| Sports C-Segment | Audi TT | | 4191 | 1832 | 1353 | 31% | 125 | 2505 | 1572 | 1550 | 1450 | 225 | 50 | 17 | 657 | 225 | 50 | 17 | 657 |
| Sports C-Segment | Independent EXAMPLE | | 4270 | 1830 | 1270 | 31% | 140 | 2700 | 1570 | 1570 | 1500 | 205 | 45 | 20 | 693 | 205 | 45 | 20 | 693 |

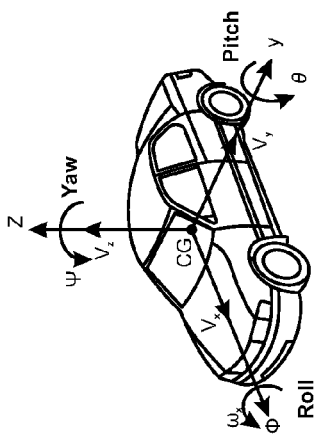

Manufactures data  1234  bold, shaded
Measured data  *1234*  italic
Engineering estimate  *1234*  bold, italic
Calculation  1234  normal

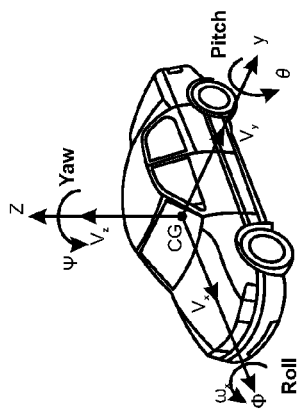

| Segment | | Ball of Foot | Heel Point | Displacement from Foot Ball to SgRP | Sgrp Fore-Aft Front Row | SgRP Height Front Row | SgRP Front Row to Ground Line | SgRP Front Row to Heel Point | SgRP to Seat Back (Horizontal Component) | Depth of Seat Back (Horizontal Component) | Seat width |
|---|---|---|---|---|---|---|---|---|---|---|---|
| UNIT | | mm | mm | mm | mm | mm | mm | mm | mm | mm | mm |
| Measurement direction | | x | z | x | x | z | z | z | x | x | y |
| REFERENECE | | A | B | C | D | E | G | F | H | I | J |
| | Re-configured vehicle examples | | | | | | | | | | |
| Sub A-Segment | Smart | 266 | 264 | 875 | 1142 | 640 | 508 | 413 | 130 | 60 | 550 |
| A-Segment | VW UP | 425 | 250 | 890 | 1315 | 530 | 386 | 280 | 130 | 65 | 550 |
| B-Segment | Audi A1 | 454 | 250 | 925 | 1379 | 520 | 398 | 268 | 130 | 70 | 550 |
| C-Segment | Audi A3 | 462 | 250 | 950 | 1412 | 510 | 370 | 240 | 130 | 75 | 550 |
| D-Segment | Audi A4 | 489 | 250 | 950 | 1439 | 500 | 360 | 230 | 130 | 80 | 550 |
| E-Segment | Audi A6 | 551 | 250 | 950 | 1501 | 500 | 368 | 238 | 130 | 85 | 550 |
| F-Segment | Audi A8 | 526 | 225 | 950 | 1476 | 500 | 355 | 225 | 130 | 90 | 550 |
| Sports C-Segment | Audi TT | 489 | 200 | 975 | 1464 | 425 | 300 | 170 | 130 | 75 | 550 |
| Sports C-Segment | Independent EXAMPLE | 493 | | 975 | 1468 | 400 | 260 | 130 | 130 | 75 | 550 |

Occupant Position and Seating

Manufactures data 1234 bold,shaded
Measured data *1234* italic
Engineering estimate *1234* bold,italic
Calculation 1234 normal

FIG. 8d

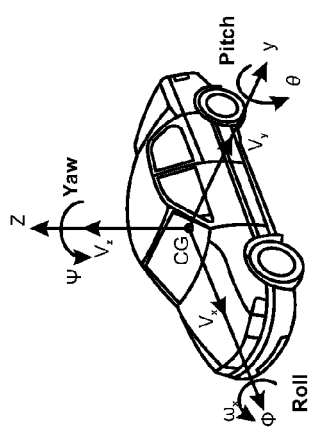

| Segment | Re-configured vehicle examples | Clearance from Front Axle Centre to pack Line — Motor (mm, x) | Clearance from Front Axle Centre to pack Line — Suspension/Steering Gear Allowance (mm, x) | Clearance from Front Axle Centre to pack Line — Total (Based on max clearance required) (mm, x) | Clearance from Vehicle side to pack (mm, y) | Clearance from Rear Axle Centre to pack Line — Motor (mm, x) | Clearance from Rear Axle Centre to pack Line — Rear Suspension (mm, x) | Clearance from Rear Axle Centre to pack Line — Perimeter Rear Frame(Additive to Motor or Suspension) (mm, x) | Clearance from Rear Axle Centre to pack Line — Total (Based on max clearance required) (mm, x) | Clearance allowance for trim (mm) | Clearance allowance for panel (mm) | Clearance assembly allowance for body and battery (mm) |
|---|---|---|---|---|---|---|---|---|---|---|---|---|
| | UNIT | | | | | | | | | | | |
| | Measurement direction | | | | | | | | | | | |
| | REFERENECE | | | | | | | | | | | |
| Sub A-Segment | Smart | 0 | 50 | 60 | 200 | 67 | 71 | 0 | 71 | 8 | 2 | 10 |
| A-Segment | VW UP | 90 | 146 | 156 | 200 | 0 | 50 | 0 | 50 | 8 | 2 | 10 |
| B-Segment | Audi A1 / VW Polo | 99 | 150 | 160 | 200 | 0 | 50 | 0 | 50 | 8 | 2 | 10 |
| C-Segment | Audi A3 / VW Golf | 106 | 158 | 168 | 200 | 0 | 121 | 0 | 121 | 8 | 2 | 10 |
| D-Segment | Audi A4 | 118 | 164 | 174 | 200 | 0 | 129 | 0 | 129 | 8 | 2 | 10 |
| E-Segment | Audi A6 / VW Passat | 123 | 50 | 133 | 200 | 123 | 183 | 50 | 133 | 8 | 2 | 10 |
| F-Segment | Audi A8 / VW Phaeton | 129 | 50 | 139 | 200 | 129 | 185 | 50 | 135 | 8 | 2 | 10 |
| Sports C-Segment | Audi TT | 105 | 164 | 174 | 200 | 105 | 118 | 0 | 118 | 8 | 2 | 10 |
| Sports C-Segment | Independent EXAMPLE | 107 | 173 | 183 | 200 | 107 | 125 | 0 | 125 | 8 | 2 | 10 |

Manufactures data    1234    bold, shaded
Measured data    *1234*    italic
Engineering estimate    *1234*    bold, italic
Calculation    1234    normal

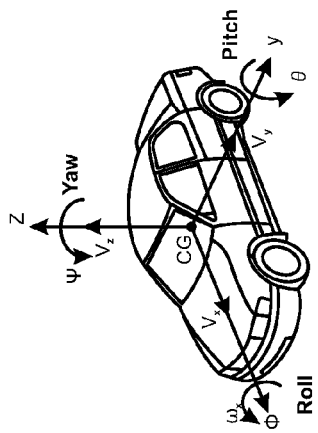

FIG. 8e

| Segment | | Pack Overall | | | | | Tunnel module | | | | Rear module | | |
|---|---|---|---|---|---|---|---|---|---|---|---|---|---|
| | | Front x-Plane of pack Position | Rear Axle Centre Line | Rear x-Plane of pack Position | pack Length | pack Length as Proportion of wheelbase | Tunnel Upper Length | Tunnel Lower Length | Tunnel Width | Tunnel Height | Rear Length | Rear Width | Rear Height |
| UNIT | | mm | mm | mm | mm | % | mm | mm | mm | mm | mm | mm | mm |
| Measurement direction | | x | x | x | x | | x | x | y | z | x | y | z |
| | | J | | K | L | | M | N | O | P | AA | AB | AC |
| REFERENCE | | | | | | | | | | | | | |
| Re-configured vehicle examples | | | | | | | | | | | | | |
| Sub A-Segment | Smart | 60 | 1873 | 1792 | 1732 | 97% | 1234 | 1107 | 190 | 350 | 0 | 735 | 200 |
| A-Segment | VW UP | 156 | 2407 | 2347 | 2191 | 93% | 1359 | 1210 | 280 | 350 | 221 | 1061 | 200 |
| B-Segment | Audi A1 | 160 | 2469 | 2409 | 2249 | 93% | 1416 | 1253 | 300 | 350 | 216 | 1078 | 200 |
| C-Segment | Audi A3 | 168 | 2602 | 2471 | 2303 | 93% | 1460 | 1297 | 300 | 350 | 230 | 774 | 200 |
| D-Segment | Audi A4 | 174 | 2820 | 2681 | 2507 | 94% | 1490 | 1327 | 300 | 350 | 403 | 788 | 200 |
| E-Segment | Audi A6 | 133 | 2924 | 2731 | 2598 | 95% | 1594 | 1431 | 300 | 350 | 371 | 809 | 200 |
| F-Segment | Audi A8 | 139 | 2998 | 2803 | 2664 | 95% | 1547 | 1411 | 300 | 350 | 455 | 828 | 200 |
| Sports C-Segment | Audi TT | 174 | 2505 | 2377 | 2203 | 93% | 1538 | 1375 | 300 | 350 | 81 | 785 | 200 |
| Sports C-Segment | Independent EXAMPLE | 183 | 2700 | 2585 | 2382 | 93% | 1552 | 1388 | 300 | 350 | 297 | 806 | 200 |

Manufactures data 1234 bold,shaded
Measured data *1234* italic
Engineering estimate *1234* bold,italic
Calculation 1234 normal Lateral module

| Segment | | UNIT | Front Bulkhead Lower Position | Front Bulkhead Angle | Rear Bulkhead Angle | Potential Lateral Height (of Battery pack) | Potential Battery Pack Position at Front Bulkhead Upper | Max Length of Lateral Upper | Rear of Lateral Based on Max Length of Lateral | Position of lower rear point of lateral based on Rear x-Plane of pack | Lateral Upper Length based on max size to rear of pack pack | Actual length of lateral upper | Actual Height of Battery Pack | Actual Battery Pack Position at Front Bulkhead Upper | Rear Bulkhead Upper Position | Rear Bulkhead Lower Position | Lateral Lower Length | Lateral Width |
|---|---|---|---|---|---|---|---|---|---|---|---|---|---|---|---|---|---|---|
| | Measurement direction | | x | | | z | x | x | x | x | x | x | x | x | x | x | x | y |
| | | | mm | Degrees | Degrees | mm | mm | mm | mm | mm | mm | mm | mm | mm | mm | mm | mm | mm |
| | REFERENCE | | Q | R | S | | | | | | | | | U | W | X | Y | Z |
| Re-configured vehicle examples | | | | | | | | | | | | T | V | | | | | |
| Sub A-Segment | Smart | | 1167 | 70 | 70 | 783 | 1452 | 210 | 1874 | 1792 | 128 | 128 | 783 | 1452 | 1580 | 1792 | 625 | 1243 |
| A-Segment | VW UP | | 1366 | 67 | 67 | 748 | 1684 | 210 | 2126 | 2347 | 431 | 210 | 748 | 1684 | 1894 | 2126 | 760 | 1221 |
| B-Segment | Audi A1 | | 1413 | 65 | 65 | 712 | 1745 | 210 | 2193 | 2409 | 426 | 210 | 712 | 1745 | 1955 | 2193 | 780 | 1320 |
| C-Segment | Audi A3 | | 1465 | 65 | 65 | 706 | 1794 | 210 | 2240 | 2471 | 440 | 210 | 706 | 1794 | 2004 | 2240 | 775 | 1357 |
| D-Segment | Audi A4 | | 1501 | 65 | 65 | 708 | 1831 | 210 | 2278 | 2681 | 613 | 210 | 708 | 1831 | 2041 | 2278 | 777 | 1422 |
| E-Segment | Audi A6 | | 1564 | 65 | 65 | 729 | 1904 | 210 | 2361 | 2731 | 581 | 210 | 729 | 1904 | 2114 | 2361 | 796 | 1466 |
| F-Segment | Audi A8 | | 1550 | 65 | 65 | 730 | 1891 | 210 | 2348 | 2803 | 665 | 210 | 730 | 1891 | 2101 | 2348 | 798 | 1525 |
| Sports C-Segment | Audi TT | | 1549 | 65 | 65 | 675 | 1864 | 210 | 2296 | 2377 | 291 | 210 | 675 | 1864 | 2074 | 2296 | 747 | 1412 |
| Sports C-Segment | Independent EXAMPLE | | 1571 | 65 | 65 | 622 | 1861 | 210 | 2268 | 2565 | 507 | 210 | 622 | 1861 | 2071 | 2268 | 696 | 1410 |

Manufactures data 1234 bold, shaded
Measured data *1234* italic
Engineering estimate *1234* bold, italic
Calculation 1234 normal

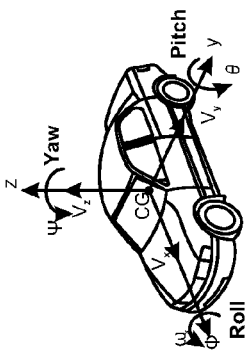

FIG. 8f

MODULAR ELECTRIC VEHICLE BATTERY CONFIGURATION

CROSS-REFERENCE TO RELATED PATENT APPLICATIONS

This application is a U.S. National Stage Application under 35 U.S.C. § 371 of International Patent Application No. PCT/EP2021/053252 filed Feb. 10, 2021, which claims the benefit of priority of British Patent Application numbers GB 2101785.0 filed Feb. 9, 2021, and GB 2003348.6 filed Mar. 6, 2020, all of which are incorporated by reference in their entireties. The International Application was published on Sep. 10, 2021, as International Publication No. WO 2021/175549 A1.

FIELD

The invention relates to an electric vehicle having an energy storage pack for providing energy to power and drive an electric traction motor of the vehicle. More specifically, the invention relates to an automotive vehicle configured to optimise passenger space without compromising either the vehicle dynamic performance nor the range of the vehicle by increasing the volume of the energy storage pack. The invention also resides in the energy storage pack and its configuration.

BACKGROUND

Battery-powered electric vehicles often have a high voltage battery pack containing thousands of low voltage battery cells arranged to suit the needs of an individual vehicle type. The battery pack contains battery cells that are electrically configured and physically assembled to provide a high voltage for delivering the energy necessary to enable an electrically driven vehicle to travel a reasonable distance between re-charging. By way of example, a Nissan Leaf manufactured circa 2010 would have had an initial real-world range of circa 70 miles, while a Tesla Model S manufactured circa 2012 would have had an initial had a range of about 200 miles—in each case the battery pack energy storage capacity is a dominant influence of the range.

The volumetric energy density of gasoline is 35 MJ/Litre and diesel at 38.6 MJ/Litre, compared with 0.9 MJ/Litre for a latest technology Lithium-Ion battery pack (Tesla Model 3). Once energy conversion efficiency and the whole propulsion system volume is taken into consideration, an internal combustion engine's volumetric energy density is circa 3.0 MJ/Litre compared with 0.6 MJ/Litre for a battery electric vehicle (figures based on comparing two mid-sized vehicles: Audi A4 and Tesla Model 3). The volume required for the energy storage device in an internal combustion engine is circa 65 litres plus 170 litres for the rest of the propulsion system (engine, transmission, inlet, exhaust). The volume of an equivalent battery energy storage device for an electric vehicle would be circa 1,170 litres plus an additional 120 litres for the rest of the propulsion system. As volume is a major constraint in passenger vehicles, the available volume for a battery pack on a mid-sized vehicle is limited to about 400 litres. The downside of this is that the vehicle range between re-fueling (re-charge) is 600 km for the best battery electric vehicle (Tesla Model 3 Long Range on WLTP cycle), compared with 1380 km for an equivalent sized internal combustion vehicle (Audi A4 TDi on WLTP cycle).

Battery pack volume will continue to be a significant constraint on battery pack energy levels and the vehicle range. Battery packs are typically between 150 L on small (A-segment vehicles) up to 460 L on large luxury vehicles, which is significant compared to a typical fuel tank volume of 35 L for a small vehicle and 100 L for a large luxury vehicle. Once energy conversion efficiencies and differences in propulsion system component volumes are taken into consideration, battery packs of comparable energy to those fuel tanks are approximately 480 litres and 1340 Litres respectively, which require a relatively substantial amount of packaging space in the equivalent vehicle.

Table 1 indicates the typical interior volumes of vehicles according to the US EPA classification and the typical volumes of the propulsion system.

TABLE 1

| Classification EPA | Classification EEC | Typical Vehicle | Interior combined passenger and cargo volume (L) index EPA (L) | Typical Propulsion System Volume ICE Derivative (L) | Typical Range ICE Derivative (km) | Typical Propulsion System volume BEV Derivative (L) [Battery Volume] | Typical Range BEV Derivative (km) |
|---|---|---|---|---|---|---|---|
| | A | Fiat 500 | c.1400 (estimate; no EPA) | 150 | 840 | 235 [150] | 135 (Fiat 500e) |
| Mini compact | B | Audi A1 | <2,405 | 160 | 820 | 315 [220] | 285 (BMW i3) |
| Sub compact | C | Audi A3 | 2,405-2,830 | 180 | 1100 | 370 [265] | 449 (Hyundai Kona) |
| Compact | D | Audi A4 | 2,830-3,110 | 220 | 1050 | 490 [370] Underfloor battery | 600 (Tesla Model 3) |
| Mid-Size | E | Audi A6 | 3,115-3,395 | 280 | 1380 | 600 [435] Underfloor battery | 539 (Tesla Model 5) |
| Large | F | Audi A8 | ≥3,400 | 350 | 1450 | | |

Packaging space within a vehicle is a key constraint for passenger vehicles. FIG. 1a illustrates a schematic plan view of a typical passenger vehicle 2 configuration having a body 4 and two axles 6 with a wheel 8 at each end of the axles 6. A 'front bay' 10 of the vehicle 2 extends from the region of the front tyres 8 to the front of the vehicle (on the left, as viewed) while a 'rear bay' 12 extends from the region of the rear tyres 8 to the rear of the vehicle (on the right, as viewed). Between the front bay 10 and the rear bay 12, between the axles 6 of the vehicle, is a 'cabin section' 14. Around the perimeter of the vehicle is a crash envelope, such as a buffer-zone 16. Critical parts, such as a battery, tend to be kept out of the crash envelope to reduce the probability of damage in the event of a crash.

Areas in which batteries or their ancillary components can be stored can be described as being configured in one or more of seven areas, which are illustrated in FIG. 1a and described in a longitudinal direction as can be described as follows: The front bay 10 area, being the space under the hood or bonnet of the vehicle that typically resides between the front of the vehicle and the engine-bay bulkhead, and packages an electric motor and, if possible, luggage; a front floor area 18, which is the area between the engine-bay bulkhead and the front seats, and is the area in which front passengers rest their feet and stretch their legs; a front seat area 20, which is the area beneath the front passenger seats; a rear floor area 22, which is the area between the front seat area 20 and a rear seat area 24, and is the area in which rear passengers rest their feet; a tunnel area 26, which typically extends along a central longitudinal axis of the vehicle between the front passenger seats and beneath the rear seat area 24; the rear seat area 24 is the area beneath the rear passenger seats; and the rear bay area 12 that is commonly referred to as the 'boot' or 'trunk' of the vehicle and extends from the rear seat area to the rear or the vehicle.

One of the earliest mass-production vehicles to use electric power was the hybrid Toyota Prius (from 1997), a schematic of which is shown in FIG. 1b. A battery pack 28 is configured in the rear bay area 12, or luggage area. The Toyota Prius has an internal combustion engine 30 (ICE) and control module 32 in the front bay 10. Vehicles with no internal combustion engines (non-ICE), created by manufacturers and produced at volume for use on public roads, and developed over the last decade, have tended towards one of three battery pack layouts, as follows.

H-type: Primarily a floor-based battery pack layout, with greater volume in the vertical direction in the front and rear seat areas i.e. under the front and second row of passenger seats, like the two vertices of a letter "H", with portions of the pack extending at a lower level in the front and/or rear floor area therebetween. An H-type battery pack is suitable for use on vehicle platforms that are shared with derivatives using an internal combustion engine because the body-in-white (BIW) requires less redevelopment. An example of such a vehicle having an H-type battery layout is the 2010 model year Nissan Leaf®. While the H-type layout uses the space beneath the occupants, such that there is no sacrifice to the luggage space in the rear, the height of the occupants and, ultimately, the vehicle is raised. Therefore, the overall frontal area of the vehicle is increased to accommodate the battery pack without sacrificing passenger headroom. The VW eGolf® is another example of a vehicle with an H-type battery layout. In this example the manufacturer chose not to raise the vehicle, thereby accepting a low battery volume.

T-type: A layout that predominately uses the rear seat area or rear bay area i.e. the space behind a vehicle's $2^{nd}$-row occupants (the horizontal portion of the letter "T"), with additional battery pack volume provided in the tunnel area i.e. centre of the vehicle (the vertice of the letter "T") between the occupants. The T-type layout can be used either on a shared platform e.g. the first version of the Chevrolet Volt or be implemented on a dedicated vehicle platform e.g. Audi R8 eConcept. The T-type layout can permit an increase in the volume of the battery back without compromise to the height of the front seats of the vehicle by using the longitudinal space between the occupants. However, in the rear seat area the passenger seats are raised, like an early generation Chevrolet Volt®, or alternatively, when a battery pack is packaged in the rear bay area of a sport-car then rear seats cannot be packaged, like a Rimac Concept One®.

Underfloor-type: This type of battery pack typically requires a dedicated vehicle platform, and forms a planar volume of even depth, like a 'slab' or 'skateboard', across the cabin section i.e. beneath the floor of the vehicle between the axles. Examples of vehicles having underfloor-type packs include the Porsche Taycan®, Tesla Model S®, Jaguar I-Pace®, Chevrolet Bolt® and Audi e-Tron®. The underfloor-type pack can provide a greater volume, especially on longer wheelbase vehicles having a greater interior volume but has a direct impact on the height of the vehicle, and the frontal area. An example of an underfloor-type battery pack configured in a vehicle is shown in FIG. 1c.

FIG. 1d illustrates, by way of example, a chronological trend of battery pack types, from left to right—a first generation Chevrolet Volt EV T-type battery pack, a second-generation Chevrolet Volt EV T-type battery pack, a first-generation Chevrolet Spark EV H-type battery pack and a Chevrolet Bolt EV underfloor-type battery pack.

FIG. 1e is a table illustrating the approximate volumes of the batteries, in litres, in various models of vehicles, with the distribution of the volume between the front bay area 10, front floor area 18, front seat area 20, rear floor area 22, tunnel area 26, rear seat area 24 and rear bay 12. It can be appreciated that the total volume of battery tends to increase as the vehicle segment and size increases, and that this is achieved using underfloor-type battery packs.

The chart in FIG. 1f demonstrates the impact of underfloor-type battery configuration on vehicle height, ground clearance, available headspace within the vehicle and the remainder of vertical packaging space within the vehicle, which is important for the internal spaciousness of a vehicle interior. Notable comparison can be made between the Porsche 911® and Taycan®.

While the height of the Taycan has not increased significantly over the 911, the proportion of the height allocated to the height of the battery module has an impact on the remainder of vertical height and, therefore, likely to have placed tight layout constraints. By way of example, the Taycan has a gap on the battery module in the rear floor areas to accommodate the feet of rear passengers.

Accommodating passengers comfortably is a priority for manufacturers of electric traction motor driven vehicles and accommodating underfloor-type battery packs has a clear impact on at least one of vehicle height and/or or design constraints/compromises to accommodate passengers, like the gap in the battery of the floor of the Porsche Taycan. H-type battery packs can require greater vehicle height, while T-type battery packs can reduce the space available for rear-occupants (e.g. Chevrolet Volt EV®), or utilise rear-occupant space entirely (e.g. Rimac Concept 1®).

Each of the known battery pack layouts has an impact on at least one of body design, interior layout, passenger space and vehicle height, which ultimately leads to a greater frontal area of the vehicle and increased fuel consumption because of the reduced aerodynamic performance and, ultimately, the range of the vehicle (which the electric vehicle manufacturers strive to maximise). The front area of the vehicle and the drag efficiency is even more critical at motorway speeds, at which it has the greatest effect on reducing electric car range i.e. as the speed doubles the drag quadruples.

A further impact of the battery pack layout is on vehicle performance, which is influenced by the structural requirements required to accommodate the pack that affects at least one of many factors, including weight, material strength, torsional rigidity and crash performance.

H-type and T-type battery packs are often packaged to minimise the changes required to a standard body-in-white (BIW) configuration of an existing vehicle, and this requires a compromise between the volume of the pack and the encroachment into the occupant/storage space.

Underfloor-type battery packs, often implemented on a 'skateboard' platform, can offer a larger battery volume, with minimal impact on the passenger occupancy or storage space although they incur an increase in ride height. However, the planar configuration of such underfloor battery packs is long, wide and shallow in depth i.e. they have a large footprint. The cells within a battery pack are not structural and, therefore, the casing must be sufficiently rigid to maintain its form. Neither the pack nor the vehicle can be allowed to flex or bend. Moreover, if an underfloor battery pack were to be inserted within a BIW or skateboard-type platform the aperture for receiving the underfloor battery pack would require reinforcement to prevent flexing. It follows that the compromise is adding weight to the vehicle to main strength and crashworthiness.

It is against this background that the present invention has been made. This invention results from efforts to overcome the problems of known battery pack layouts and conventional seating configurations. Other aims of the invention will be apparent from the following description.

SUMMARY

The invention generally relates to an electric vehicle having an electric motor and a pack for storing energy, said vehicle configured having: at least two passenger seats, including a first seat facing forward, and a second seat, positioned behind the first seat, such as a front seat, and configured to face rearward, wherein the pack is configured having a lateral module configured to extend perpendicularly to the longitudinal axis of the vehicle between the first seat and the second seat. The first and second seat are in adjacent rows and because they face in opposite directions a void is formed therebetween, and the lateral module of the pack extends at least in part between the adjacent rows across a portion of the width of the vehicle. The lateral module extends vertically and thus configured to optimise the volume of the void between the adjacent rows. The lateral module can extend at least above the seat cushions and/or hip-point of the seats in the rows. The vehicle can have a compartment configured to retain one or more modules. Alternatively, the seats can be arranged back-to-back and face in a direction perpendicular to the direction of travel and the module and compartment can extend longitudinally.

In a first aspect, the invention resides in a vehicle having an electric motor and a pack for storing energy, said vehicle configured having: a first seat configured to face forward and/or a second seat configured to face rearward; and a compartment, for receiving the pack, wherein the compartment is configured: integral with the vehicle structure and/or body and behind the first seat; and to extend laterally across the vehicle substantially perpendicular to its longitudinal axis, wherein the height of the compartment extends in a vertical direction between a lowermost point of the compartment that it is beneath the lowest point of the first seat and/or the second seat, and an uppermost point of the compartment that is above at least the maximum height of a cushion of the first seat and/or the second seat. The compartment, or a separate compartment, can be configured to house a longitudinal module, front module or rear module. The first seat can be a front seat, such as a front-row seat in a vehicle. The first seat can be the driver's seat. The second seat can be a rear seat, and in the row immediately behind the front-row seat.

The height of the compartment can extend in a vertical direction between a lowermost point of the compartment that is beneath the hip-point of the first seat and/or the second seat, and an uppermost point of the compartment that is above at least the hip-point of the first seat and/or the second seat. The lowermost point of the compartment can be the floor or base of the body-in-white or the vehicle chassis.

The height of the compartment can extend in a vertical direction to a point above the maximum height of the front and/or rear tyres. The lowermost point of the compartment can be a point beneath the maximum height of the front and/or rear tyres. The lowermost point of the compartment can be a point beneath the height of the front and/or rear axle.

The compartment can function as a torsion box. The structure of the compartment can be configured as a cage. The cage can be open. The compartment can include reinforcing features, such as struts, braces and webs, and said features can be connectively configured. The compartment can be connected to the vehicle sides and/or floor and/or chassis structure. The compartment can be bolted to the body-in-white or vehicle chassis.

The compartment is configured for receiving a module. The module can be removably connected to the compartment. Said connection can be on the uppermost and/or lowermost surfaces of the module.

The vehicle can have the first seat and the second seat arranged facing in opposite directions and the compartment extends between the first seat and the second seat. The vehicle can be configured having at least two passenger seats having seat backs, including the first seat, configured to face forward, and a second seat, positioned behind and adjacent the first seat and configured to face rearward, wherein the compartment is configured to extend between the first seat and the second seat across the width of the vehicle, and wherein the height of the compartment extends in a vertical direction between a lowermost point of the compartment that it is beneath the lowest point of the first seat adjacent to the compartment, and an uppermost surface of the compartment that is above at least one of: the top of the seat back of the first and/or second seat; the maximum height of a cushion of the seat in the first seat in a first row and/or the second seat in a second row; an average height of a seat cushion in the first seat in a first row and/or the second seat in a second row; and a hip-point of the seats in the first row and/or the second row.

The compartment can be integral with the vehicle, such that at least one of said pillars and the compartment forms at least in part, a structural ring or enclosure around the vehicle interior, and the compartment is preferably integral with at least one of the A-pillar, B-pillar, C-pillar and D-pillar of the vehicle. The compartment can form part of a roll-cage for the vehicle. The compartment can be configured to be connected to, or form part of, a ladder-chassis.

The compartment can be integral with the vehicle and is configured as a load-path, wherein an external force applied to the vehicle is directed through the compartment. The compartment can be configured to absorb energy from a crash pulse during a collision. The compartment can be configured with energy absorbing features, such as crumple-zones.

The compartment can have an aperture configured for removably receiving and securing a pack therein. The aperture can be in the vehicle floor, or in the chassis. The aperture can be sized to receive a complete module, such as a lateral module. The aperture can be sized to receive a cell, or sub-pack of cells of the module. The aperture can be provided on a side of the compartment that extends vertically, or lies on the side of the compartment. The perimeter of the aperture can be rectilinear. At least one of the sides of the aperture can be non-linear.

The vehicle can include a pack, and the pack is removably secured within the compartment by fixings connecting at least one of (i) the lowermost perimeter edge of the pack to the vehicle floor or chassis, and (ii) the uppermost region of the pack to the compartment. The fixings securing the pack within the compartment can include a resilient member. A resilient member, such as a rubber bush, can be used to mitigate noise and vibration.

The compartment can have walls, said walls configured to include at least one of: a cage, comprising bracing functioning as a load path, configured to provide a reinforcing enclosure for the pack; sheet metal, such as sheet steel; reinforcement ribs formed within sheet metal, such as sheet steel; and reinforcement ribs connected to sheet metal, such as sheet steel.

The pack can be enclosed, at least in part, by an envelope having walls and/or a base, said walls and/or base configured to include at least one of: a cage, comprising bracing functioning as a load path, configured to provide a reinforcing enclosure for the pack; sheet metal, such as sheet steel; reinforcement ribs formed within sheet metal, such as sheet steel; and reinforcement ribs connected to sheet metal, such as sheet steel. The pack can include one or more of a lateral, longitudinal, front or read module.

The pack can be releasably secured within the compartment. It can be configured to close the aperture of the compartment to seal the pack therein. The envelope of a pack connected to the vehicle and secured within an envelope can provide reinforcement to the compartment, wherein both the envelope and the compartment form part of the vehicle structure and include at least one load path. The pack can be enclosed with an envelope and the pack and include reinforcement members configured to protect cells of the pack and/or reinforce the walls of the envelope. One or more surfaces of the compartment, in in particular the surface that closes the aperture, can be shaped to inhibit resonance and/or increase strength. By way of example, this can be achieved by having ribbed and/or reinforced features, such as corrugation, and/or be arcuate in cross-section.

The height of the compartment can extend in a vertical direction between a lowermost point of the compartment that it is beneath the hip-point of the first seat and/or the second seat, and an uppermost point of the compartment that is above at least the hip-point of the first seat and/or the second seat.

The compartment and/or module can add stiffness and/or strength to the vehicle. The module, such as the lateral module, casing can include at least one of a cage, fabricated panel, strut, brace, lattice and honeycomb structure. Lateral and longitudinal members of the compartment and/or module, such as struts or braces, can be at least one of: folded, extruded, pressed, cast, 3D printed material, such as metal or plastic.

The lateral module and/or the compartment extend in an off-set direction, such as asymmetrically, across the width of the vehicle. The compartment and/or lateral module can have two or more surfaces whose tangents extend in different planes, for example a step or curved profile can be incorporated.

In a further aspect, the invention resides in a module of a pack, wherein the module incorporates at least one of: shelves, braces and compartments for receiving energy cells, said module configured as a torsion box. The module can be configured to co-operate with a compartment of a vehicle. The structural integrity can be the same with or without an energy cell or cells provided therein.

In another aspect, the vehicle is configured having an electric motor, such as a traction motor, and a pack for storing energy, said vehicle configured having: at least two passenger seats, including a first seat, and a second seat, positioned behind the first seat, such as a front seat, and configured to face rearward; and the pack having: a lateral module configured to extend perpendicularly to a longitudinal axis of the vehicle between the first seat and the second seat. The first seat can be a front seat, such as a front-row seat in a vehicle. The first seat can be the driver's seat. The second seat can be a rear seat, and in the row immediately behind the front-row seat. The height of the lateral module can extend in a vertical direction between a lowermost surface of the lateral module that it is beneath the lowest point of the first seat adjacent to the pack, and an uppermost surface of the lateral module that is above at least one of: the top of the seat back of the first and second seat; greater than the maximum height of a cushion of the seat in the first seat in a first row and/or the second seat in a second row; an average height of a seat cushion in the first seat in a first row and/or the second seat in a second row; and a hip-point of the seats in the first row and/or the second row.

The height of the lateral module can extend in a vertical direction between a lowermost point of the lateral module that it is beneath the hip-point of the first seat and/or the second seat, and an uppermost point of the compartment that is above at least the hip-point of the first seat and/or the second seat. The lowermost point of the lateral module can be in the region of the floor or base of the body-in-white or the vehicle chassis.

The height of the lateral module can extend in a vertical direction to a point above the maximum height of the front and/or rear tyres. The lowermost point of the lateral module can be a point beneath the maximum height of the front and/or rear tyres. The lowermost point of the lateral can be a point beneath the height of the front and/or rear axle.

The lateral module can be configured between adjacent rows of seats, with one row in a first direction, such as facing forward and the other facing in the opposite direction, such as rearward. The rows of seats can be arranged in a longitudinal direction of the vehicle. A rearward facing seat can face the rear of the vehicle, and can be aligned with the longitudinal axis of the vehicle. A rearward facing seat can be arranged to be offset from a longitudinal axis of the vehicle. While the invention incorporates a pack between adjacent seats configured to face in different directions, such as rows of seats, the adjacent rows can be the first and second row i.e. the front seats and the rear seats.

The seating arrangement can provide a space or void between the rear surfaces of the seat. The void can extend above the height of the seat base, such as the upper surface of the cushion upon which a passenger sits. The lateral module can substantially occupy said void and extends in a vertical direction above the seat cushion. The lateral module can extend to the height of the seat back, which can include the head restraint. The lateral module can extend above the height of the seat cushion, which can be the average height or the uppermost height of the seat cushion, and/or the hip-point of the seat. The hip-point, often referred to as an H-point, is unique to each vehicle and a well-known reference point that is influential in vehicle design.

Different seating arrangements can be provided and include, without limitation: two seats, arranged in-line in a longitudinal direction, with a first seat positioned towards the front of the vehicle and a second seat positioned adjacent and behind the first, said second seat facing rearward, such as in a back-to-back configuration; three seats, arranged in a longitudinal direction, with a first seat positioned in a first row towards the front of the vehicle and a two seats arranged in a second-row positioned adjacent and behind the first, and facing rearward; three seats, arranged in a longitudinal direction, with two seats positioned in a first row towards the front of the vehicle and a third seat arranged in a second-row positioned adjacent and behind the first, and facing rearward; four seats, arranged in a longitudinal direction, with two seats positioned in a first row towards the front of the vehicle and two seats arranged in a second-row positioned adjacent and behind the first, wherein the second-row is configured to face rearward; five seats, arranged in a longitudinal direction, with two seats positioned in a first row towards the front of the vehicle and three seats arranged in a second-row positioned adjacent and behind the first, wherein the second-row is configured to face rearward; the vehicle has three or more rows of seats, each row having one or more seats, and at least two of the rows of seats face in opposite directions, such as in a back-to-back configuration; the vehicle has three or more rows of seats, each row having one or more seats, and at least two of the rows of seats facing sideward; and the vehicle has three or more rows of seats, each row having one or more seats, and at least two of the rows of seats are aligned with a longitudinal axis of the vehicle.

The vehicle can be driven only by electric power, said power coming from energy stored in a battery configured to output electrical current. Additionally, or alternatively another source of energy can be used to generate electrical power, such as a hydrogen fuel source and an electrolysis system that converts the stored hydrogen to electrical current to drive the traction motor. The vehicle can be powered solely by non-combustion means.

The vehicle can be provided with a drivetrain and/or energy management system, said system configured to take stored energy and process it to power the drivetrain and/or capture energy for storage. Said system can incorporate an energy conversion module, which can function to manage the receipt of power from an external source to charge the pack of the vehicle. The energy conversion module can manage the supply of energy from the pack to the traction motors. The energy conversion module can manage the supply of energy from any source, such a regenerative braking, to charge the pack of the vehicle.

The vehicle can further comprise a longitudinal module configured: to extend along a longitudinal axis of the vehicle; to extend perpendicularly from the lateral module; and to extend, at least in part, between the front seat and the rear seat. The longitudinal axis can be a central longitudinal axis of the vehicle. The front seat can be positioned to the side of the longitudinal axis of the vehicle.

The longitudinal axis can be central to the vehicle, and the vehicle can be configured having: at least two front seats, separated by the longitudinal axis; and/or at least two rear seats, separated by the longitudinal axis. At least one front seat and at least one rear seat can be arranged, at least in part, to be facing different directions. At least one seat in a first row and at least one seat is an adjacent second row can be arranged, at least in part, to be facing different directions, such as facing in opposite directions.

The distance between the front seat and the rear seat can be less than the maximum dimension of the front seat or the rear seat in the longitudinal direction. Each seat can have a footprint, wherein each footprint has and a maximum footprint dimension in the longitudinal direction of the vehicle. The seats can be separated in the longitudinal direction of the vehicle by a space defined by the rear surface of the front seat, the rear surface of the rear seat and the floor of the vehicle therebetween. The seats can have a maximum angle at which they can recline. The maximum angle at which they can recline can be determined by the lateral module. The maximum dimension of the space between the front and rear seat in the longitudinal direction of the vehicle can be smaller than the maximum footprint dimension in the longitudinal direction of the vehicle of at least one of the front and rear seats. The longitudinal length of the base of the lateral module can be between about 20% to about 41% of the wheelbase of the vehicle. The front seat can be between about 45-60 cm in length. The maximum distance between adjacent rows of seats, in a longitudinal direction, can be up to about 50 cm, or up to about 30 cm, or less than 25 cm.

While the invention can reside in a vehicle having a lateral module extending between adjacent rows of seats, the form of the lateral module can improve the performance of a vehicle in which it is configured, such the invention can reside in a pack having a lateral module as described and claimed herein, and/or a method of configuring a vehicle having a lateral module as described and claimed herein.

In a further aspect the invention resides in a vehicle having an electric traction motor and a pack for storing energy, said pack having a lateral module extending perpendicularly to a longitudinal axis of the vehicle, wherein at least of portion of the cross-section of the lateral module is trapezoidal. The lateral module can be defined by a perimeter envelope. The envelope can be in the form of a rectangular based truncated pyramid. The lateral module can have at least two sides configured to extend vertically towards a common point above the lateral module and narrow towards its top. The sides that extend vertically towards a common point above the lateral module can be the sides facing the front and rear of the vehicle, and/or the sides facing the sides of the vehicle. The lateral module can be an isosceles trapezoid. The lateral module can have a front side facing the front of the vehicle and a rear side facing the rear of the vehicle. The front and rear sides can be angled to complement or match the closest surface of the seats thereto because the lateral module extends between adjacent rows of seats. The centre of gravity can be lower in a vertical direction than the mid-point, in a vertical direction, of the cross-sectional profile. The upper surface of the lateral module, in a longitudinal direction, is shorter than the length of the base of the lateral module. The length of the uppermost portion of the lateral module can be between about 10% and about 50% of the length of the base of the lateral module, and more preferably between about 20% and about 40% of the length of the base of the lateral module, and more preferably between about 25% and about 35% of the length of the base of the lateral module.

The lateral module can be wider towards the front of the vehicle and narrower towards the rear of the vehicle in a longitudinal direction and/or the lateral module is wider towards the bottom of the vehicle and narrower towards the top of the vehicle in a vertical direction. The sides of the lateral module can be shaped to accommodate features of the vehicle, such as the wheel arch.

The pack can further comprise a longitudinal module connected to the lateral module; the longitudinal module configured to extend along the longitudinal axis from the lateral module towards the front of the vehicle. The connection can be a mechanical and/or electrical connection. The longitudinal module can have a cross-section having, at least in part, a trapezoidal profile. The upper surface of the longitudinal module, in a lateral direction, is shorter than the width of the base. The width of the uppermost portion of the longitudinal module in the lateral direction can be between about 10% and about 50% of the width of the base of the longitudinal module, and more preferably between about 20% and about 40%, and more preferably between about 25% and about 35% of the width of the base of the longitudinal module.

The pack can be provided with a rear module connected to the lateral module and configured to extend rearward from the lateral module. The connection can be a mechanical and/or electrical connection. The pack can be provided with a front module, packaged in the front bay of the vehicle and connected to the pack. The connection can be a mechanical and/or electrical connection. The rear module can be wider towards the front of the vehicle and narrower towards the rear of the vehicle. The rear module can be configured to extend: between the rear seats in line with the longitudinal module; and/or beneath a rear seat.

The lowermost surface of the longitudinal module and the lowermost surface of the lateral module can be configured to extend at the same level in the vehicle. The height of the lateral module can be at least one of: a maximum of the height of the lowermost position of the top of either the front or rear seat, or up to 100 mm lower; at least greater than the maximum height of the cushion of the seats in the first row and/or the second row; and lower than the lowest edge of the closest window opening to the pack.

The vehicle can be configured having at least one of the following parameters: a lateral module having a volume ranging from about 3791 to about 11231; the length of a pack including a longitudinal, a lateral and a rear module is between about 88% to about 92% of the wheelbase; the length of the base of the lateral module is between about 26% to about 41% of the wheelbase length in the longitudinal direction; in a vehicle having a lateral module and a longitudinal module, the lateral module can be between about 275% and about 720% of the volume of the longitudinal module, and/or about 150% and about 350% of the height of the longitudinal module; when the pack extends outside of the area beneath front seat passengers the hip-point of front passenger is between about 31% and about 41% of the vehicle height; when taking in to account the area in which a pack can be configured in vehicle, and the height of the vehicle, the packaging efficiency (i) the volume of the pack per m$^2$, which is the wheelbase multiplied by the average of the track of the vehicle, and (ii) the volume of the pack per m$^2$ compared to the height of the vehicle, then the pack provides between about 144 l/m$^2$ and about 265 l/m$^2$, and/or about 294 l/m and about 885 l/m.

Overall, the invention has deviated from known vehicles and has improved features that can provide for:

An increased energy storage volume, which can be achieved by the shape and configuration of the lateral module of the energy pack-which has an increased height compared to the other modules. The increased height can be achieved by arranging the lateral module between adjacent rows of seats, such as a front seat and a rear seat, wherein the rear seat faces rearward and away from the front of the vehicle. The rear seat can face to the side or to the rear e.g. in a back-to-back configuration, such that the lateral module does not impede on a rear passenger's legroom. In such an arrangement the lateral module can extend across the width of the vehicle between adjacent rows of seats e.g. the front and rear seats. The lateral module can be configured to extend above the hip-point positions of passengers in the front seats and rear seats, that are in the next row of seats behind the front seats. In other words, the lateral module extends vertically to a height above the maximum height of the seat cushion on which a passenger would sit.

Improved safety, because the pack can be centrally positioned, which can reduce the perimeter of the pack that is exposed to a side of the vehicle e.g. a crash buffer zone around the vehicle. A vehicle having the pack can have a crash buffer zone and the pack can be shaped such that it does not extend into the buffer zone, or the perimeter surface of the pack exposed to the crash buffer zone is minimised. The invention can provide for a pack with greater volume while minimising the exposure of the pack to the vehicle exterior body.

Improved crash performance, because of the interface between the modules of the pack, which is at least one of shaped to deflect forces to inhibit damage from longitudinal forces and/or incorporates energy absorbing properties. The modules of the pack can be shaped to inhibit damage caused by a collision and can include at least one of: shaped interfaces that direct modules away from one another to deflect the force of a crash pulse; pivotable interfaces; and energy absorbing components.

Improved range by reducing the frontal area of the vehicle. This can also improve fuel efficiency, which can be achieved by lowering the hip-point of the occupants of a vehicle because there's no module packaged beneath the occupants that causes their seating position to be raised, and subsequently allow for a lower overall vehicle height.

Efficient packaging, as a result of the layout of the pack, which can reduce the mass of the vehicle.

The invention can reside in vehicles incorporating one or all of these improved features. A vehicle can be provided with two or more of the lateral modules and/or compartments. By way of example, a known vehicle having only a planar slab-like underfloor battery pack can benefit from having a lateral module configured to extend between front and second-row seats in which the second row of seats faces rearward e.g. towards the rear of the vehicle. The vehicle of the invention can be an electrically powered vehicle, having an electric traction motor. The vehicle and/or pack of the invention has been demonstrated, by way of example, with the intention of using electrical batteries, or cells within the or each module that forms the pack.

In light of the teaching of the present invention, the skilled person would appreciate that aspects of the invention were interchangeable and transferrable between the aspects described herein, and can be combined to provide improved aspects of the invention. Further aspects of the invention will be appreciated from the following description.

DESCRIPTION OF THE FIGURES

Known vehicle layouts have been described above in relation to FIGS. 1a to 1f. In order that the invention can be more readily understood reference is made, by way of example, to the remaining drawings, in which:

FIG. 7a shows a schematic side elevation of a vehicle having a pack, while

FIGS. 8a to 8f are sections of the same table, which when taken as a whole provides information on the dimensions of a pack of the invention when implemented, by way of example, in a variety of sized using a combination of real-world data, calculations and the references shown in FIG. 7;

Like reference numerals refer to like features.

DETAILED DESCRIPTION

Figure 1A:
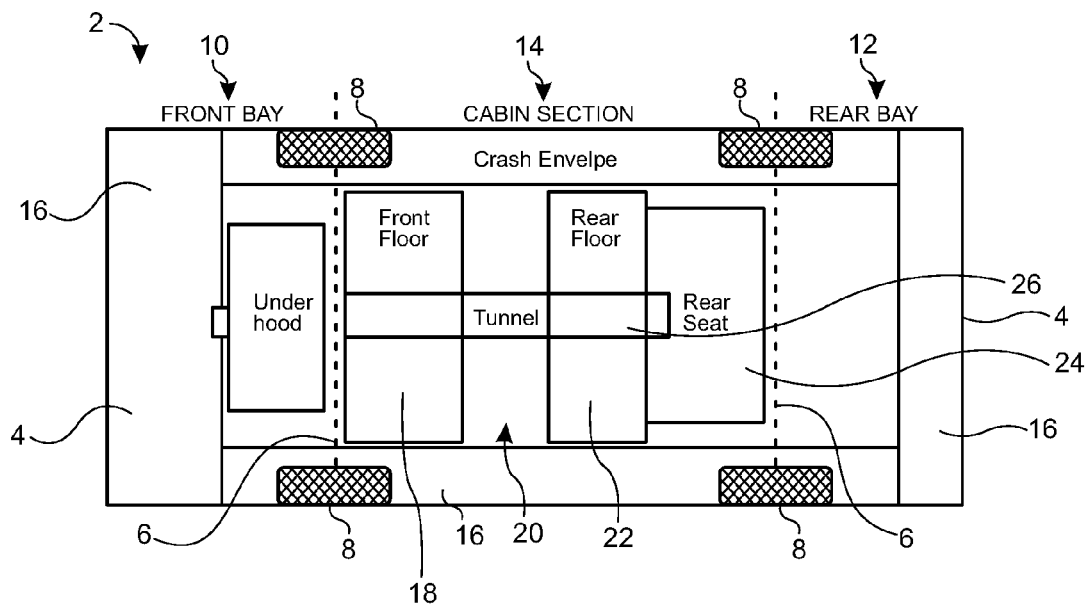
Figure 1B:
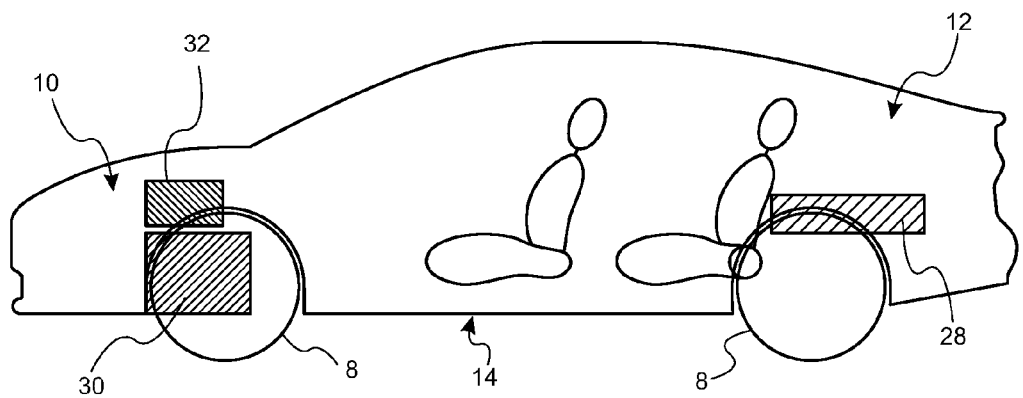
Figure 1C:
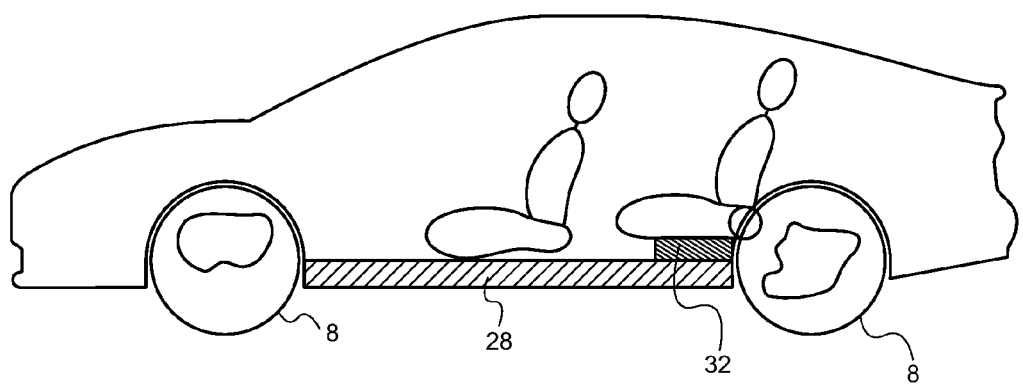
Figures 1D, 1E:
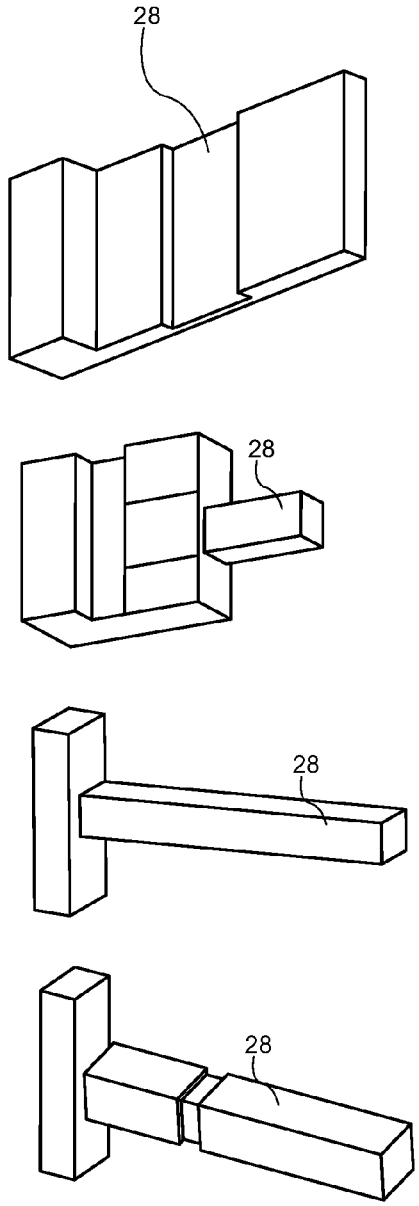
Figure 1F:
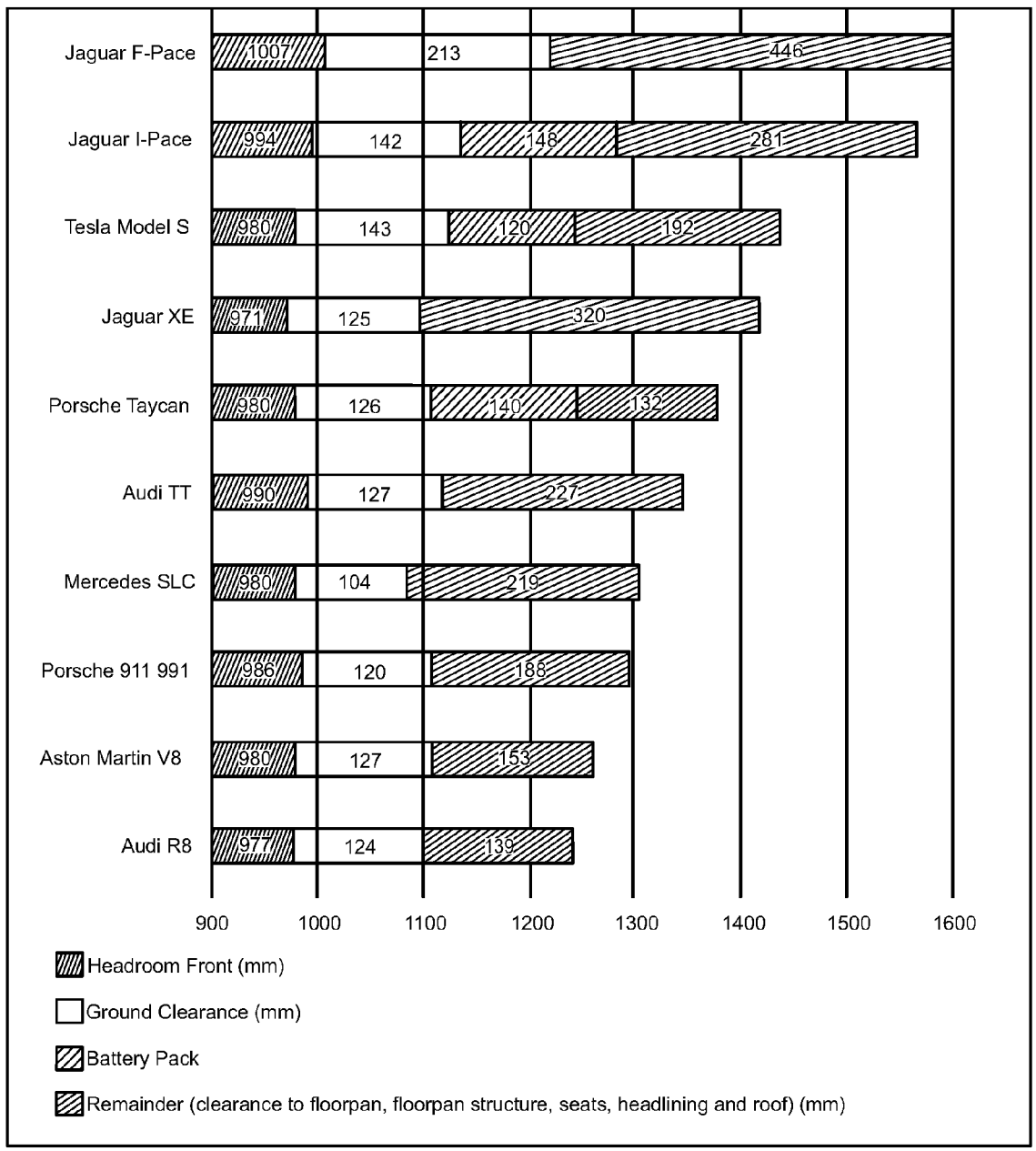

FIGS. 2a to 2e are derived from CAD data and are anatomically to scale to be proportionally representative of a passenger vehicle 100 having an example configuration of the invention. The electric vehicle in the example has an electric traction motor 102 for driving the wheels 104 and an associated energy conversion module 106 for converting energy to and from a pack 107 configured to store energy, the module providing electrical energy for driving the electric motor 102. Each of the vehicles of the examples herein can incorporate such an energy conversion module 106, which can function to manage the receipt of power from an external source to charge the pack of the vehicle and subsequently manage the supply of energy from the pack to the traction motors. Although not shown in this example an internal combustion engine can optionally be provided, to at least one of drive the wheels of the vehicle or drive a generator to generate electrical energy for storage in the pack. It is the intention of the applicant, however, to provide an improved pack configuration and/or an improved vehicle layout for a vehicle having a non-combustion engine, said vehicle configured to accommodate a pack with a greater volume to increase the energy storage capacity and, therefore, range of a vehicle without an ICE.

Figure 2A:
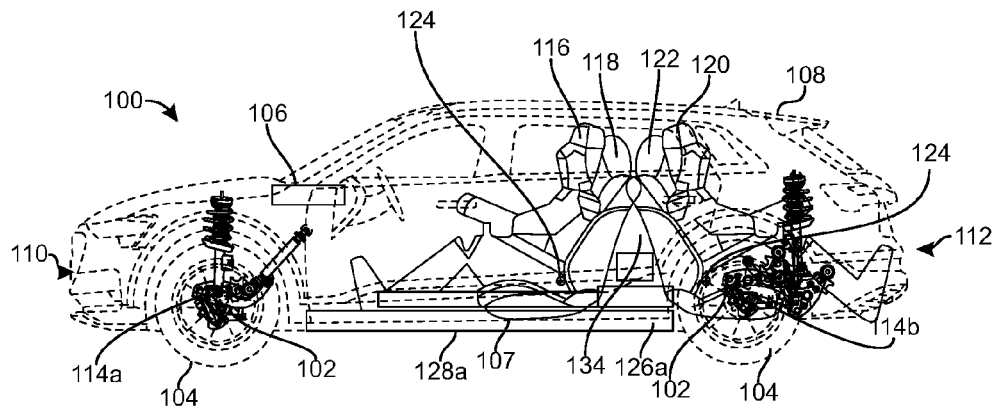
FIGS. 2a to 2f show, respectively, a variety of views of a vehicle, including a side elevation, plan and perspective views of a vehicle having a pack with a lateral module, as well as an illustration of occupants seated next to a pack.

In FIG. 2a, a body 108 of the vehicle has a front 110 and a rear 112, a front axle 114a and a rear axle 114b with wheels 104 and tyres provided at the ends of the axles. In each of the FIGS. 2a to 2c a front passenger 116 ($95^{th}$ percentile male) is depicted sitting on a front seat 118, facing the front of the vehicle. Further, a rear passenger 120 ($95^{th}$ percentile male) is depicted sitting between the front passenger 116 and the rear of the vehicle upon a rear seat 122, said rear seat and rear passenger facing the rear 112 of the vehicle. Configuring a rear seat to accommodate a $95^{th}$ percentile male is optional-some vehicle types, such as sports cars having a 2+2 configuration, have rear seats that are used infrequently and, therefore, are configured having rear seats for accommodating a $50^{th}$ percentile males, and example of which is shown in FIGS. 2d and 2e.

Figure 2B:
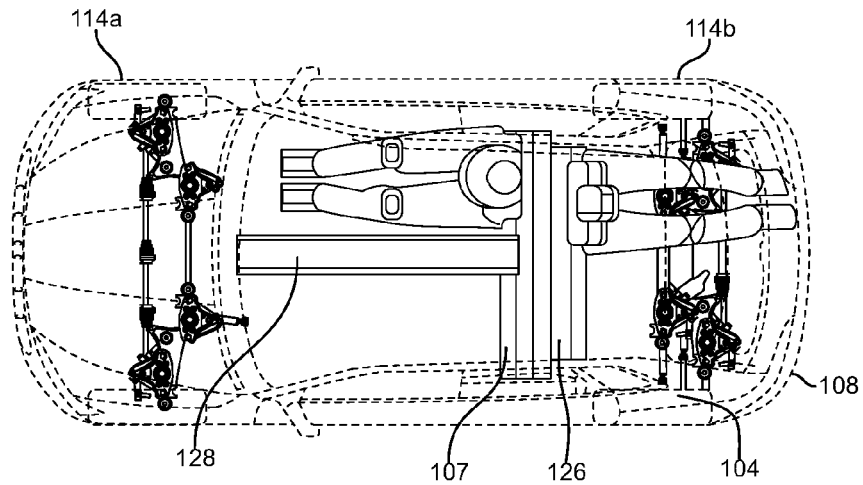
Figure 2C:
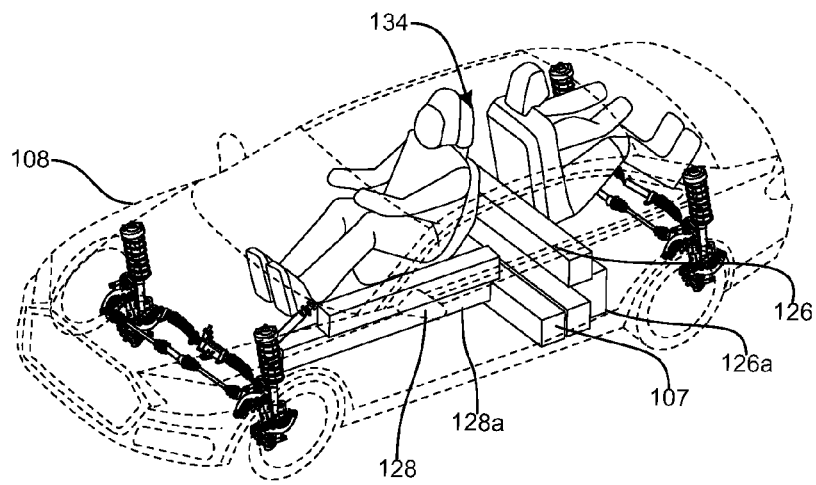
Figure 2D:
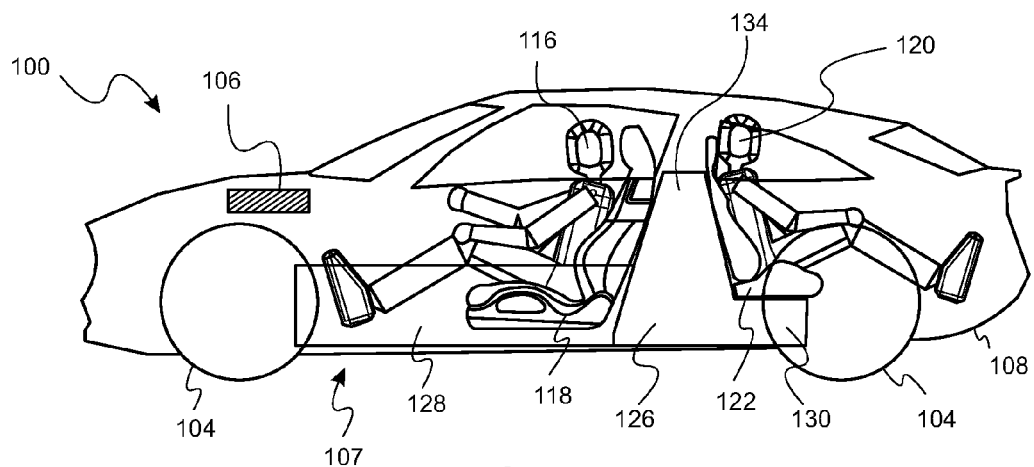
Figure 2E:
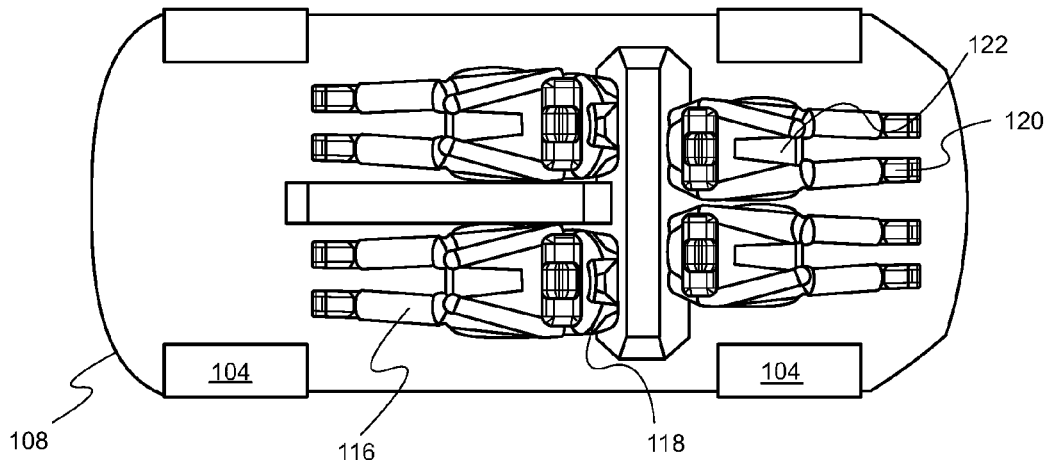
Figure 2F:
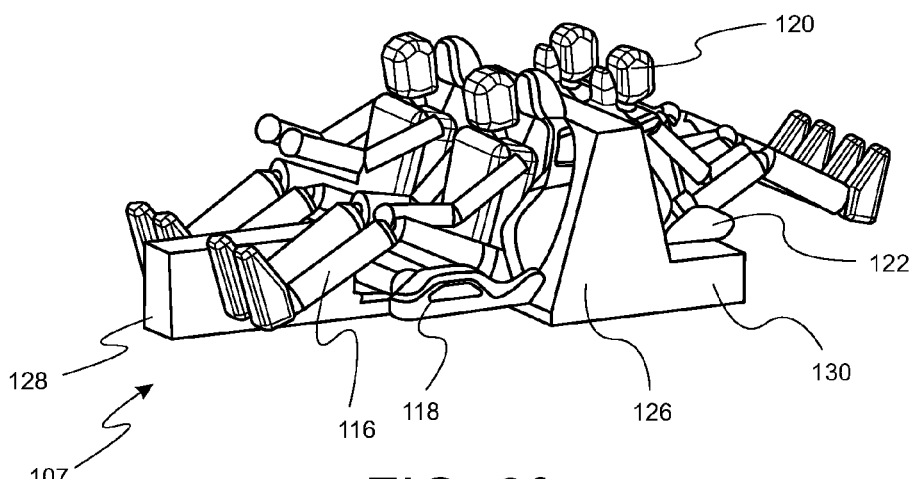
Figure 3A:
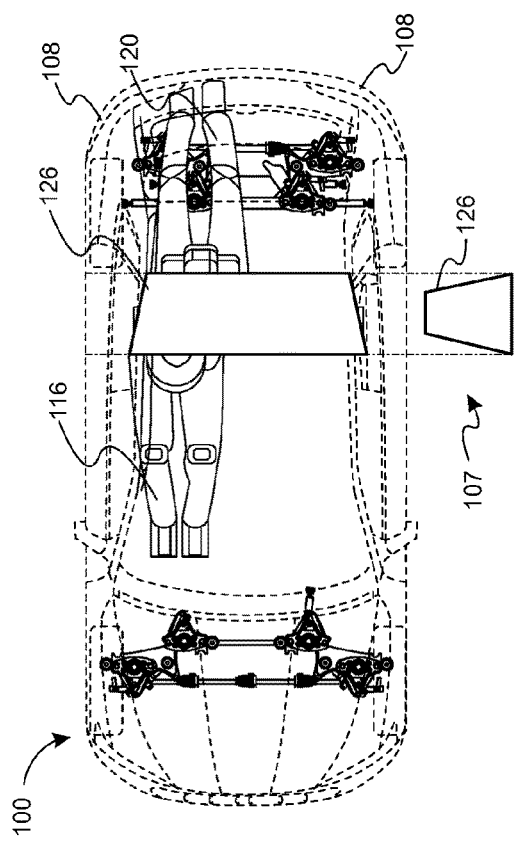
FIGS. 3a to 3d show schematic plan views of the vehicle in FIG. 2b showing various pack layouts, while alongside each figure a side-elevation view of each pack is shown for reference.
Figure 3B:
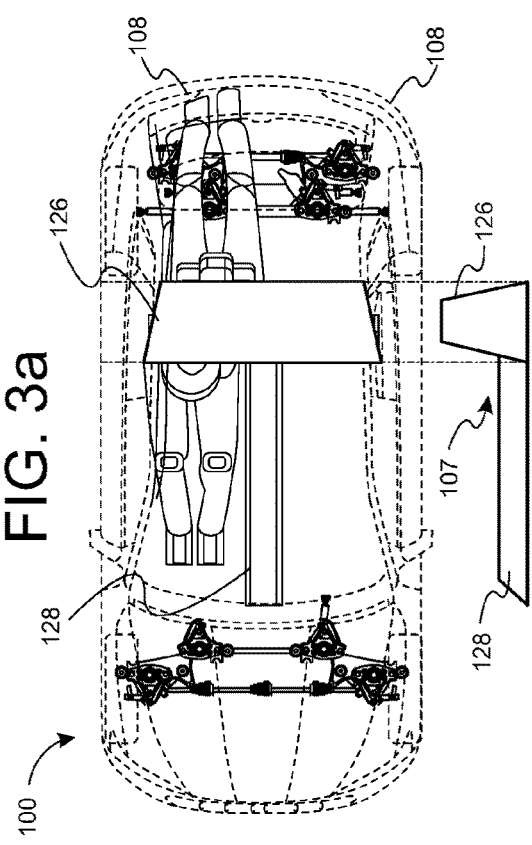
Figure 3C:
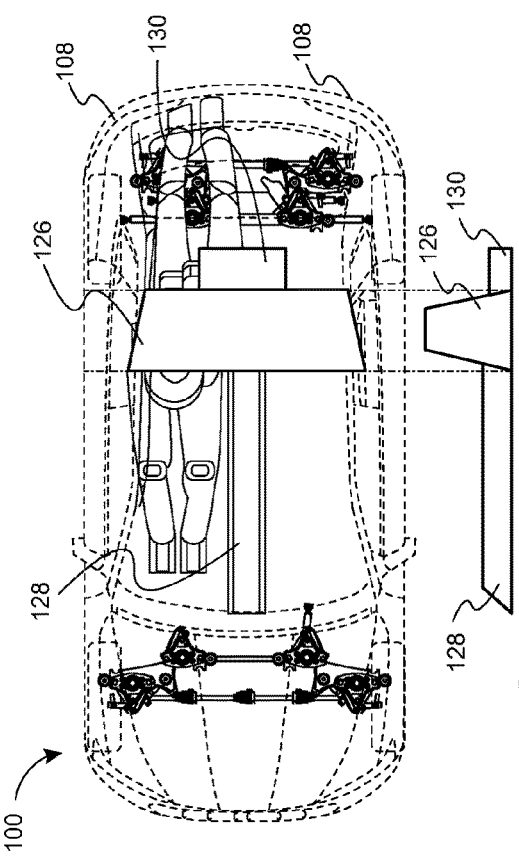
Figure 3D:
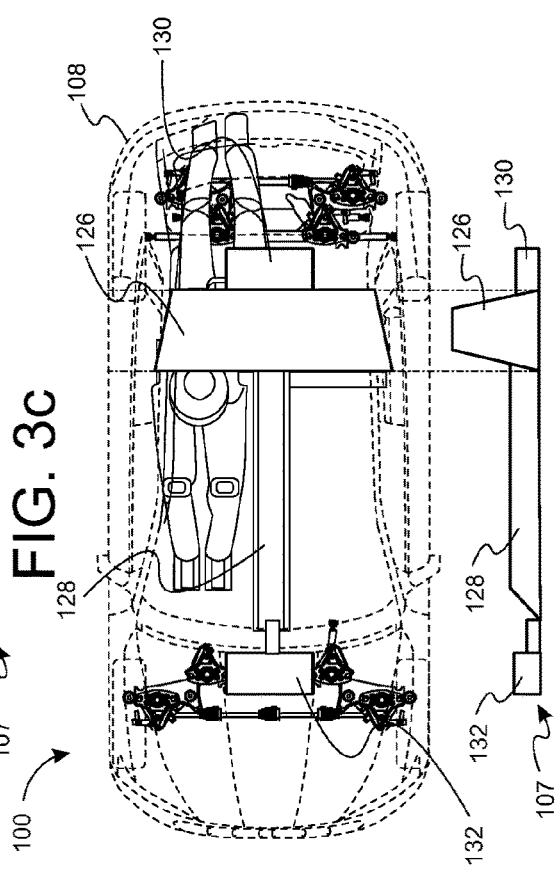

FIG. 2f shows the passengers of FIGS. 2d and 2e on seats, positioned about the pack, wherein one of the rows of passenger seats, in this example it is the front row seats, are positioned outside the footprint of the pack. In other words, the first row of passenger seats has no pack beneath them. In this way the hip-point of the seat can be lowered. In this example the second row of seats, adjacent to the first row, and facing rearwards are positioned above a portion of the pack. However, the rear module is optional and/or can be configured to extend between the passengers in the rear such that they too seats have no pack beneath them.

The front seat 118 and the rear seat 122 are arranged back-to-back such that the passengers face in opposite directions. In this example, the front seat 118 is positioned such that the front passenger sits approximately mid-way between the front axle 114a and rear axle 114b of the vehicle 100. The rear seat is positioned in the region of the rear axle. In the example of FIGS. 2a to 2c a hip-point (HP) 124 of the rear seat and passenger is such that the HP 124 is in front of the rear axle 114b and the legs of the passenger would extend over the axle towards the rear of the vehicle. FIGS. 2b, 2c and 2d illustrate, respectively, a plan view and a front elevation view of the vehicle in FIG. 2a—and in all of these Figures only two occupants 116, 120 are shown to provide a clear view of the pack 107 for storing energy in the vehicle. While the vehicle can have only two seats the vehicle shown can accommodate four seats in a '2+2' configuration, with two front seats and two rear seats, the additional seats (not shown) being positionable in mirror positions.

The pack 107 in this example has two modules-a lateral module 126 and a longitudinal module 128. The lateral module is configured to extend between the front 118 and rear seats 122 i.e. between two front passenger seats (although only one front passenger is shown for clarity), and between the two rear seats (although only one front passenger is shown for clarity). The lateral module 126 is configured to extend between the opposing passenger front and rear seats as shown in FIGS. 2b and 2c, extending from one side of the vehicle to the other. The lateral module 126 can extend from one side of the vehicle to the other. The lateral module can be restricted to extend within the crash envelope. The longitudinal module 128 of the pack extends perpendicularly from the lateral module 126 along a longitudinal axis of the vehicle towards the front of the vehicle. The longitudinal module can extend between the front passenger seats 118 along a longitudinal axis of the vehicle. The lateral and longitudinal modules 126, 128 can include respective sub-modules. The modules and sub-modules can contain individual cells, such as battery cells.

The pack, as shown, can extend in a longitudinal direction from front to rear, from a region adjacent the bulkhead of the vehicle to a region adjacent the rear axle. The longitudinal module extends from the bulkhead to a region level with the back of the front seat, wherein it meets the floor of the vehicle. Behind this point, towards the rear of the vehicle, the lateral module extends to a region level with the rear axle.

Both the longitudinal module 128 and lateral module 126 have a bottom surface configured such that it is level with the bottom of the vehicle, which is typically the floor of the body-in-white, or bottom of the vehicle chassis. The base of the longitudinal module can be at the same height as the lateral module. The height of the longitudinal module 128 can be consistent along its length. The height of the longitudinal module can be between about 100 mm and about 500 mm, and optionally between about 200 mm and about 400 mm, and preferably about 350 mm. The height of the longitudinal module can be between about 5% of the vehicle depth to about 45% of the vehicle depth, and optionally between about 14% of the vehicle depth to about 35%, and preferably between about 25% to about 32% of vehicle depth. The height of the longitudinal module can vary in height to accommodate other features of the vehicle. But way of example, the height can be reduced, tapered or stepped down in the region of the bulkhead to accommodate the instrument panel of the vehicle.

The height of the lateral module in relation to a longitudinal module, when provided, can vary depending on the vehicle size and configuration. The values in FIGS. 8a to 8f, discussed below, represent a nominal configuration, by way of example only, in which the longitudinal module has a height of 350 mm and the lateral module is 55% of the depth of the vehicle-such that the lateral module is between about 175% and about 225% the height of the longitudinal module. However, having a lower longitudinal module (circa 100 mm) and a taller lateral module (circa 70% of the vehicle depth) results in the lateral module being between about 750% and about 1000% the height of the longitudinal module.

The height of the lateral module can be a maximum of the height of the seat back of the front and rear seat backs. The maximum height of the seat back can include the head restraint of the seat, which can be integral with the seat.

FIGS. 2a to 2d show an example in which four passengers can be accommodated-two in the front facing forward, and two in the rear facing backwards—with two front seats, separated by the longitudinal axis and two rear seats, separated by the longitudinal axis. Various different arrangements are envisaged within the scope of the invention, such that at least one front seat is provided and at least one rear seat is provided, said rear seat facing backwards. In such a configuration the longitudinal module can extend along a non-central axis of the vehicle. Two longitudinal modules can be provided in the event that a single central seat is provided, or three front seats are provided, said longitudinal modules extending either side of the seat. In the examples of FIGS. 2a to 2d each front seat is arranged with a rear seat adjacent and behind the front seat, such that they are back-to-back. However, the front seat and rear seat are not necessarily aligned. It follows that at least one front seat and at least one rear seat can be configured, at least in part: offset in a lateral direction; having the rear seat facing rearward, which includes a range of positions from facing to the side of the vehicle to facing the rear of the vehicle; and back-to-back.

By way of example, a micro-car can be provided having a configuration in which the vehicle has only two seats, said seats aligned facing opposite directions and having a lateral module of a pack, as taught herein, configured between the two seats. The two seats can be centrally aligned in the vehicle. Such a vehicle can have a lateral module and, optionally a front module and/or optionally a rear module. While the lateral module herein is intended to provide an increased pack volume, as an alternative to an underfloor battery pack, a vehicle can be provided with both an underfloor battery pack and a lateral module.

The lateral module of the battery pack is configured in a void, or space 134, between a back surface of the front seat and a back surface of the rear seat. This void 134 is configured as a result of the front seat and rear seat facing away from each other and the seats having an incline. The minimum size of the void 134, in cross section, as viewed in FIG. 2a, can be determined by the limits at which the front seat and rear seat can be reclined e.g. until an upper part of the front seat comes in to contact with an upper part of a rear seat. Even when the front seat and rear seat are reclined, and in contact, there is void between them. The void is a three-dimensional space defined: in cross-section, as shown in FIG. 2a, by a floor of the vehicle and the back surface of the front seat and rear seat; and as shown in plan view in FIG. 2b, by the body of the vehicle at the sides of the vehicle.

To accommodate the body 108 shape of the vehicle, the lateral module can be wider towards the front of the vehicle and narrower towards the rear of the vehicle in a longitudinal direction, as shown in FIG. 2b, and/or the lateral module is wider at the base and narrower towards the top of the vehicle in a vertical direction, as shown in FIG. 2c. For the avoidance of doubt, the applicant has arranged the rear seat to face rearward to create a void in which a lateral module can be packaged. The pack can be shaped to maximise its volume in the void by having at least one of: the lateral faces i.e. those facing the front and rear of the vehicle, extending non-vertically towards each other e.g. inclined to form a triangular or trapezoidal shape in cross-section; the ends of the lateral module i.e. those closest to the sides of the vehicle, being angled and extending non-vertically with respect to the longitudinal axis of the vehicle; and the ends of the lateral module i.e. those closest to the sides of the vehicle, being shaped to extend towards each other, such that they are tapered or otherwise shaped to accommodate the shape of the vehicle, which can include accommodating the wheel arch.

The lateral module 126 can be shaped, at least in part, as a triangular prism, having three side faces and two end faces. To accommodate ideal mathematical shapes would require the prism to be smaller than the void or space between the seats, thus leaving unused space. In practice, a module can be shaped to have, in cross-section, at least a portion that is substantially triangular or trapezoidal-like in shape. The triangular prism can have shaped upper portion, such as a flat top, which can be referred to as the lateral upper. The lateral upper extends in the region of the top of the back of the seats. The smallest dimension at the top of the lateral module can be approximate, or proportional, to the size of the smallest cell of the module. The shape of a vehicle can have curved sides and, therefore, the ends of the lateral module can be inclined or angled to utilise the space available. The shape of the pack can be between an ideal, which is a triangular prism, and a three-dimensional shape that occupies the majority of the space in the void. The lateral module 126 can be in the form of a truncated rectangular pyramid.

The lateral module of the pack of the invention can function as an internal divider, because the height can extend to at least 75% of the height of the front seat and, preferably, extends to the full height of the front seat. The pack can extend higher and, in theory, to the height of the internal roof of the car. The pack can be configured to act as a dividing wall between a front passenger zone and a rear passenger zone. The lateral module can be configured to extend vertically to a height of the lowest point of the closest opening, such as a window. The lateral module height can be between about 50% and about 70% of the vehicle depth. The example in the table of FIGS. 8a to 8f, described below, is fixed at 55% of vehicle depth for each vehicle example.

The pack 107 can be configured to accommodate different vehicle sizes and seat configurations, with each of the modules being configured for a given configuration. FIGS. 3a to 3d show the plan view of FIG. 2b illustrated with different pack 107 configurations, as follows: a vehicle 100 having a pack 107 having only a lateral module 126, located between front and rear seats, wherein the rear seat is rear facing, which can be appropriate if the vehicle has, for example, a short wheelbase (distance between the axles) and has minimal room to accommodate a longitudinal and/or rear module (see FIG. 3a); a vehicle having a pack having a lateral module 126, located between back-to-back front and rear seats, and an optional longitudinal 128 module that extends from the lateral module towards the front of the vehicle between individual front seats (see FIG. 3b); a battery pack having a lateral module 126 and the optional longitudinal module 128, as per FIGS. 3a and 3b, plus an additional optional rear module 130, which can be appropriate if the vehicle has space to accommodate the lateral module 130 e.g. a larger sports utility vehicle beneath and/or between rear seats (see FIG. 3c); and a battery pack having a lateral module 126, optional longitudinal module 128 and optional rear module 130, as per FIG. 3c, plus an additional optional front module 132, which can be appropriate if the vehicle has a rear-wheel drive electric traction motor and, therefore, space in the front to accommodate further pack 107 volume and energy storage (see FIG. 3d).

As seen in these Figures, the modules 126, 128, 130, 132 can be shaped to accommodate the shape of the vehicle e.g. the front of the longitudinal module and rear of the rear module are tapered, as is the sides of the lateral module, which in the case take in to account the rear-wheel arches of the vehicle.

The rear module can have at least one of: a rear face i.e. the side facing the rear of the vehicle, extending non-vertically towards a point above the rear module e.g. inclined to form a wedge-shape; the sides of the rear module being angled with respect to the longitudinal axis of the vehicle; and the ends of the lateral closest to the side of the vehicle being arranged to extend towards each other.

The rear module can be wider towards the front of the vehicle and narrower towards the rear of the vehicle. The rear seat can be a bench seat i.e. single cushion configured to accommodate two or more passengers, and the rear module can be flat and slab-like to extend under the bench-seat. If, however, the vehicle is provided with two independent rear seats then the rear module can be configured to extend beneath and/or between said independent rear seats along the longitudinal axis of the vehicle.

The longitudinal module can be also be shaped to optimise the use of space between the front seats and at the foremost part of the vehicle adjacent the bulkhead. The longitudinal module can be shaped to maximise its volume in the void by having at least one of: the front face i.e. the face closest to the bulkhead, having a non-vertical face e.g. inclined to form a tapered nose that accommodates an instrument panel or seminal display above the vehicle; and the sides i.e. those closest to the front seats, being angled and extending non-vertically with respect to the vertical axis of the vehicle, such that there is a greater volume with minimal intrusion on the occupant space.

Figure 4A:
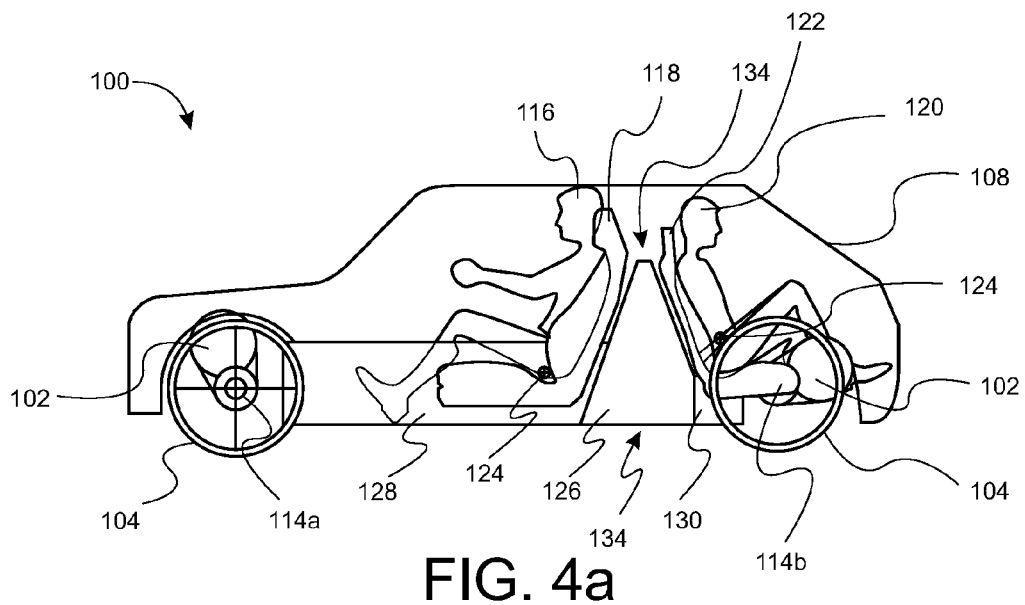
FIGS. 4a to 4c show cross-sectional schematic views of vehicles of various sizes having a pack and layout comparable to FIG. 3c.
Figure 4B:
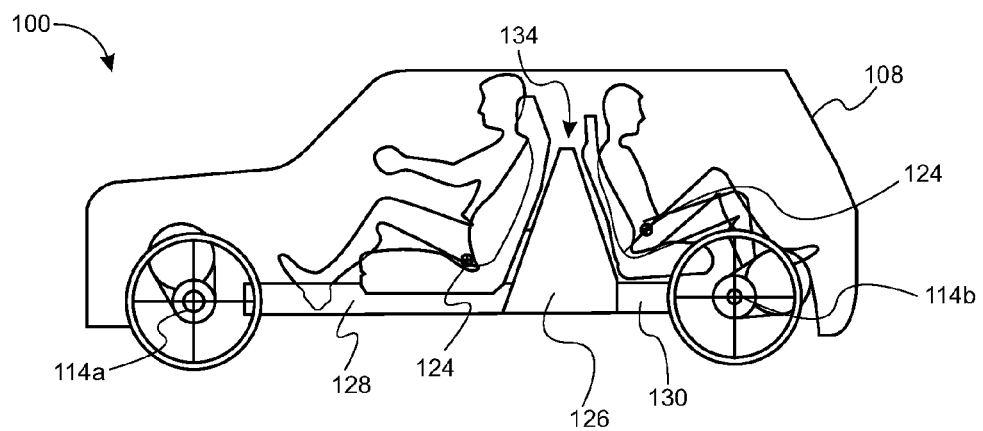
Figure 4C:
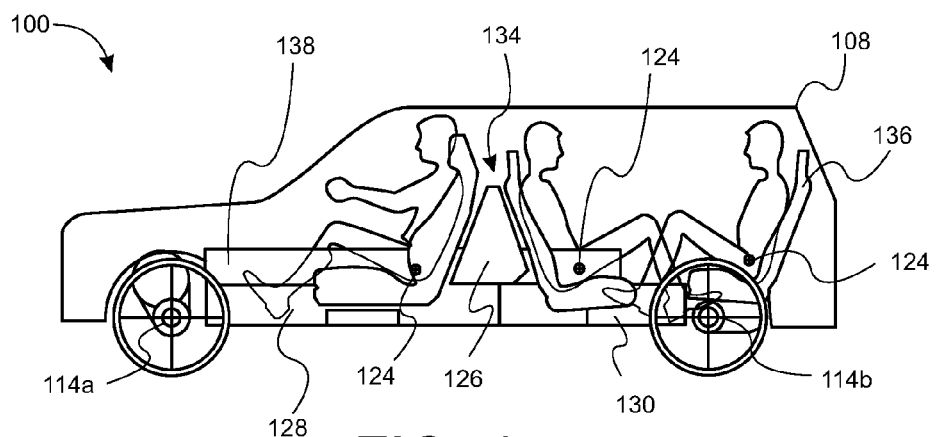

FIGS. 4a to 4c illustrate, in schematic cross-section, the position of seats 118, 122, passengers 116, 120 and packs 107 within three types of vehicle 100 of different size and purpose. Each of the cars show a pack 107 having a longitudinal 128, lateral 126 and rear module 130. Electric traction motors 102 are provided to drive wheels 104 mounted on the front and rear axles 114a, 114b. Passengers are indicated upon a front seat and a rear seat.

Figure 6A:
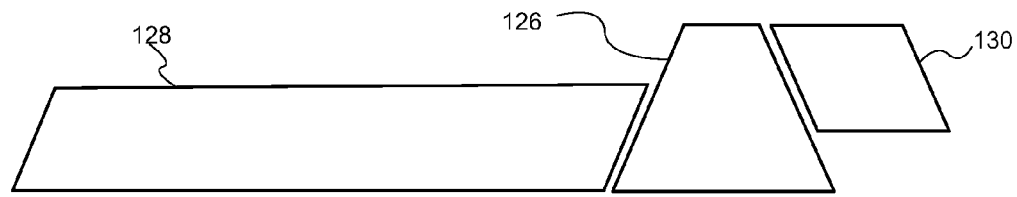
FIGS. 6a to 6c show schematic cross-sectional views of battery packs having features that inhibit damage to the battery packs in the event of a frontal or rear-end collision.
Figure 6B:
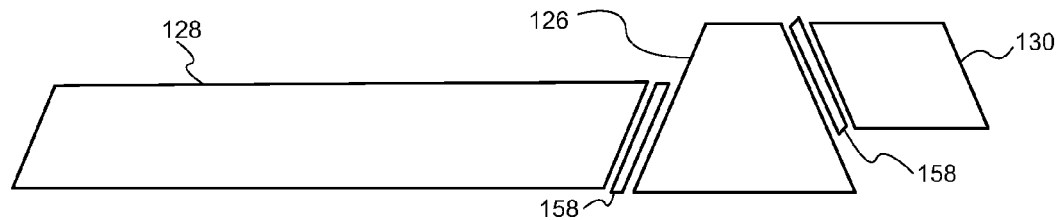

FIG. 4a represents a "2+2" seater sports car having a low overall vehicle height and seats positioned lower in the vehicle such that the occupants HP 124 is lower. In plan view FIG. 4a would have a layout comparable to FIG. 3c. Overall the lower ride height can be reduced and provide a reduced frontal area of the car for greater performance and efficiency i.e. leading to increased range. As described above in relation to FIGS. 2a to 3c, the front seat and rear seat are facing in opposite directions. The lateral module of the pack is configured to accommodate the space between the front and rear seats-thus having, in cross section, a wide base and configured to narrow in a vertical direction towards the top of the vehicle. In the example shown the uppermost point of the lateral module is in the region of the top of the seat back or the front and rear seat. The longitudinal module extends from the lateral module, between two front seats, towards the front of the vehicle—this enables the HP 124 of the seat 118, 122 or occupant 116, 120 to be lowered because there is no element of the pack 107 beneath the front seat. In this example, the sports-vehicle has front seats that typically accommodate a $95^{th}$ percentile male, as shown, while the rear seats that are infrequently used are often smaller and typically accommodate a $50^{th}$ percentile male, as shown. A rear module is configured to extend from the lateral module towards the rear of the car. The rear module can be configured to extend from the lateral module to the rear axle. The rear module can, however, be packaged above the rear axle by extending from a point higher up in the lateral module-a side-elevation schematic view of an example of this layout is shown in FIGS. 6a and 6b. The pack 107 can be accommodated between the axles of the vehicle. The lateral module extends vertically beyond the height of the longitudinal module to provide extra storage capacity for the pack. This is because the increased height of the lateral module 126 of the pack 107 in combination with the opposing seating arrangement provides for a pack with a greater volume while enabling rear passengers to be accommodated without compromising comfort e.g. reduction in legroom, or compromises in the pack layout e.g. specially shaped underfloor battery to accommodate a rear seat passengers feet i.e. like the Porsche Taycan.

FIG. 4b shows a comparable layout to FIG. 4a, except that the vehicle represented is illustrative of a small car, such as a B-segment vehicle having a longer wheelbase. The lateral module 126 extends vertically between the seats, its uppermost point being in the region of the tops of the seat backs. The longitudinal module 128 extends between the front seat and is lower in height to provide a more spacious cabin feel. In this example a $95^{th}$ percentile male is shown in the front and the rear, and the rear module 130 extends under the rear seat, which can be a bench seat.

The vehicle in FIG. 4c is illustrative of a larger car, such as an E-segment vehicle having three rows of seats. In this example a $95^{th}$ percentile male is shown in the front seat. The second-row seat faces rearward, is occupied by a $95^{th}$ percentile male, and backs on to the front-row seat such that a void is created therebetween. A lateral module 126 of a pack extends between the front-row seat 118 and the second-row seat 122. A third row of seats 136 is located at the rear of the car facing forward. A longitudinal module 128 extends from the lateral module between the front-row seats towards the front of the vehicle and a rear module extends between the second-row seats from the lateral module towards the rear of the vehicle.

While the examples of the packs herein are provided to demonstrate the increased volume in various configurations and for a range of vehicle sizes, the teaching can be applied to any vehicle by scaling the size of the pack according to vehicle size e.g. wider cars can accommodate a wider lateral and longitudinal module. FIG. 4c additionally includes an extension module 138, which adds additional volume to the pack. The extension module 138 can be added to any one of the modules to increase the volume of any one of the lateral module 126, longitudinal module 128, rear module 130 or front module 132. The configuration is vehicle dependent.

Although the examples herein enable a vehicle to be configured with a low hip-point 124, or seating register position (SgRP), which consequently enables the frontal area of the car to be reduced, the pack 107 configuration can be implemented, for example, in conjunction with an underfloor pack. Although the hip-point may be raised to increase the volume of the pack, the sacrifice in vehicle height can increase the storage volume and hence the range.

The examples of FIGS. 2a to 4c show a vehicle 100 having a pack 107 with a lateral module 126, longitudinal module 128 and/or a rear module 130 extending towards the rear of the vehicle. In each example the lateral module 126 is presented as having, in cross-section, at least a portion that is substantially triangular or trapezoidal-like in shape. In other words, the uppermost part of the lateral module narrows or tapers towards a point above the lateral module. In practice, the ends of the lateral module that are adjacent the sides of the vehicle can also be tapered towards the top. In three-dimensions the lateral module can take the form of, at least in part, a truncated rectangular pyramid. The footprint of the truncated rectangular pyramid shaped lateral module can be shaped, such that it is trapezoidal in shape e.g. to accommodate the shape of the side of the vehicle in the region of the wheel-arches.

Figure 5A:
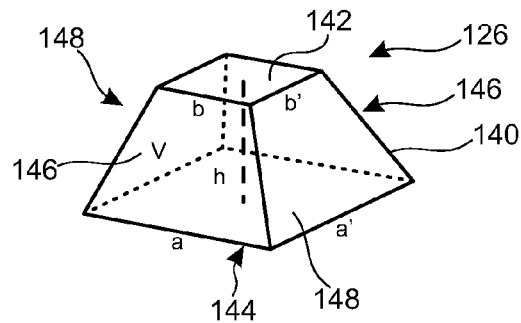
FIGS. 5a to 5c illustrate using a perspective view, and schematic cross-sections, a lateral battery module having shaped sides, as well as examples of cell layout within a module of a battery pack.
Figure 5B:
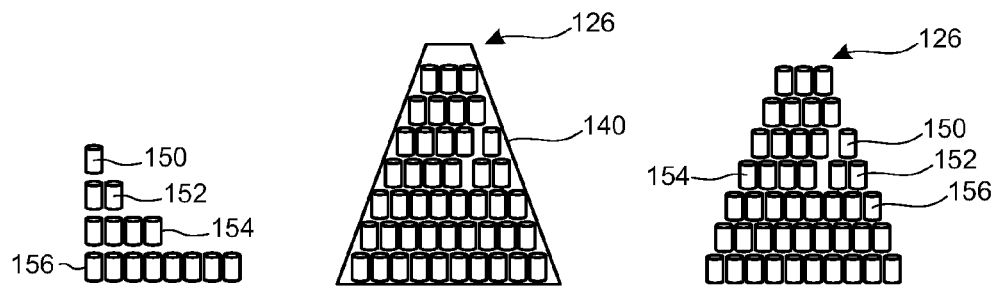
Figure 5C:
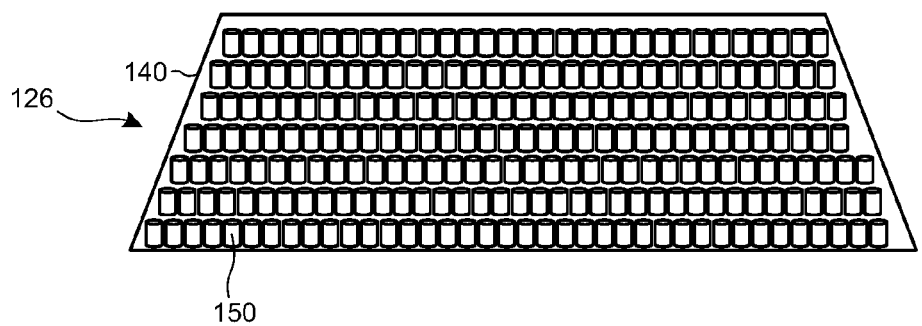

FIGS. 2a to 2d indicate, by way of example, the cells 150 that can make up the modules of the pack, said cells being packed and stacked together. FIGS. 5a to 5c illustrate examples of the form of the lateral module 126 i.e. the envelope in which the cells of a module are packed. FIG. 5a is an example of an envelope 140 shape for maximising the utilisation of the space 134 or void between front seats and rear seats. It can be scaled and/or adjusted to accommodate the available space in a vehicle. In this example the envelope 140 of the pack has a rectangular pyramid form of the lateral module—the base has a length a width a', and it's upper portion has a length b and a width b'. It has a hight V in in a vertical direction of the vehicle. The example shown has 6 faces—a crown or upper surface 142, footprint 144, two side-faces 146, and front and rear faces 148. The lateral module 126 is configured to extend from the footprint 144 to the crown 142 in a vertical direction. In the example shown the crown has a flat surface, although this can be rounded or pointed. The example also shows edges extending in the lateral direction being parallel, although these could be non-parallel. The example shows parallel longitudinal edges extending in the longitudinal direction, although these could be non-parallel.

FIGS. 5b and 5c show an envelope 140 of the lateral module configured to encase cells 150—such an envelope and cell arrangement can equally be applied to the longitudinal module 128, rear module 130, front module 132 or extension module 138. The envelope can conform to substantially enclose a module, such as the truncated rectangular pyramid shown in FIG. 5a—and is configured to do so with minimal surface area. To be clear, the envelope can be a case enclosing cells within the module. In the event that the cells within a module do not have a shape or form that enables them to tessellate i.e. fit exactly without any gaps between are at the interface with the envelope, which is the most likely scenario, then the envelope can be configured to extend across spaces between the cells. The envelope can be a physical layer, such as a layer of sheet-steel, substantially enclosing the cells of the module, or the envelope can be defined, at least in part, by the vehicle around the overall perimeter shape around a cross section of a module. The envelope can be a combination of a part of the module and a part of the vehicle. The envelope can be a perimeter shape that is defined by the shortest distance around the perimeter of the cross-section of the module.

Space within the envelope of the modules that is not utilised by cells can accommodate at least one of fixtures, fasteners, reinforcement, insulation, cooling mechanism and electrical connections, such as busbars. It is important, therefore, to maximise the volume of a pack.

FIG. 5b shows a cell 150, pair of cells 152 and two sub-modules of cells arranged in a 4-set 154 and an 8-set 156, which form part of the pack. The submodules can have any number of cells. Adjacent the cells and sub-modules, a trapezoidal-shaped physical envelope 140 has been populated with cells 150 to illustrate how the cells can be packed within the envelope. The envelope can be seen bridging gaps between the cells to substantially minimise the length of the perimeter of the cross-section. Next to the physical envelope the same number of cells are arranged without a physical envelope—this can be achieved because cells and sub-modules can be connectably configured to be self-supporting using, for example, a frame. A physical envelope can be provided for protection only. In practice, the envelope can be the body of a vehicle in which the module is installed, or the vehicle components that define the void in which the pack is configured. FIG. 5c shows a section of a module taken along its longest length, and in this example an envelope is provided.

The cells 150 can be cylindrical, as shown in FIGS. 5b and 5c. Additionally, or alternatively the cells can be cuboid in shape, as per FIGS. 2a to 2d, or in the form of pouches. A module can contain a mixture of cylindrical cells, cuboid cells and/or pouches. In light of the teaching herein it will be appreciated that the cell arrangements are examples and alternative arrangements can be configured within the envelope of the modules of the pack.

In cross-section, the envelope of the lateral module has a wide base and narrows towards the top of the vehicle. Not only is this advantageous in complementing the void between back-to-back front and rear seats, but the shape provides further beneficial characteristics including, at least: a lower centre of gravity than a cuboid-shaped module if the same height and volume; utilising the gaps between the cells for cooling and/or routing of wiring looms or internal bus-bar connections; and a lower weight relative to cuboid-shaped module of the same height and volume because the triangular or trapezoidal form is an inherently stronger shape and requires less reinforcement or strengthening. The internal structure can include components that support cells and/or reinforce the strength of the module or pack. For example, the shelves can be arranged in a shaped arrangement, such as a triangular or honeycomb arrangement.

The lateral module 126 has been described as an ideal shape, such as truncated rectangular based pyramid-however, in light of the teaching herein it can be appreciated that features can be added to the lateral module, or indeed any of the modules, in which: a protrusion is provided to increase volume e.g. to occupy dead-space, such as unutilised space, in a vehicle; and/or a recess to improve visibility between the front and rear of the vehicle.

As described above, the wide base and height of the lateral module 126 not only provides stability to the module, but a significant volume of storage space is provided within the envelope 140 configured as part of a pack that additionally includes a longitudinal module and a rear module.

The lateral module can be the only module of a pack for small vehicles e.g. a 'Smart car' or VW UP®. In such small vehicles the broad base and truncated pyramid shape can lower the centre of gravity and improve the stability, especially during a crash, when compared to an equivalent cuboid-shaped module of the same height. To maximise the range of an electric vehicle, however, modules such as the longitudinal and/or rear module are important for providing additional volume for accommodating energy cells.

As described above in relation to FIGS. 3a to 3c, the central position of the pack in the vehicle increases, on average, the distance between the perimeter of the envelope 140 of the pack and the edge of the vehicle body 108, or crash buffer zone 16. In the examples provided herein the ends of the lateral module are the closest part of the pack to the exterior body of the vehicle. The ends of the lateral module define a lower percentage of the overall perimeter of the pack that is exposed to a side-impact crash compared to, for example, vehicles with underfloor type battery packs.

The crash pulse from the impact of a collision to the front or rear of a vehicle is not only significant to the lateral module 126, which has improved stability during a crash, but also to the longitudinal 128 and rear 130 modules. The force upon the mass of the lateral and rear modules can be managed during a crash to inhibit one module of a pack from impacting against, or otherwise compressing upon or damaging another module of a pack. A traditional method of maintaining the integrity of the pack would be to add reinforcement, such as additional layers of metal sheeting or thicker gauge metal or additional fixings. In contrast to known methods, and to minimise the weight of the vehicle, the trapezoidal shape of the lateral module has non-vertical sides that can be used to direct the forces within a pack during a crash. FIG. 6a shows a pack having a layout analogous to FIGS. 3c to 4c, wherein a pack has three modules: the longitudinal module, lateral module and rear module. In FIG. 6a the rear module is optionally mounted adjacent an upper portion of the lateral module, although can also be positioned at the same level as the longitudinal module. The height of both the longitudinal module and the rear module, in comparison to the lateral module, can be adjusted to accommodate features of a vehicle.

In FIG. 6a, the interface between the longitudinal module and the lateral module, and between the lateral module and rear module, is angled. The envelope 140 of the modules can be angled. The angled interfaces are complementary such that they function to direct the movement of modules caused by the force of a front or rear impact, which is primarily along the longitudinal axis of a vehicle, in a vertical direction thus reducing any longitudinal impact forces between modules thus diluting or deflecting, at least in part, the impact forces from a front-end or rear-end collision.

In FIG. 6b, a material 158 having energy absorbing and/or low-friction surfaces is configured at the angled interface between the modules of FIG. 6a. The material can function to absorb energy and inhibit contact between the modules and/or facilitate movement in a vertical direction thus redirecting longitudinal forces from a front or rear end collision.

Figure 6C:
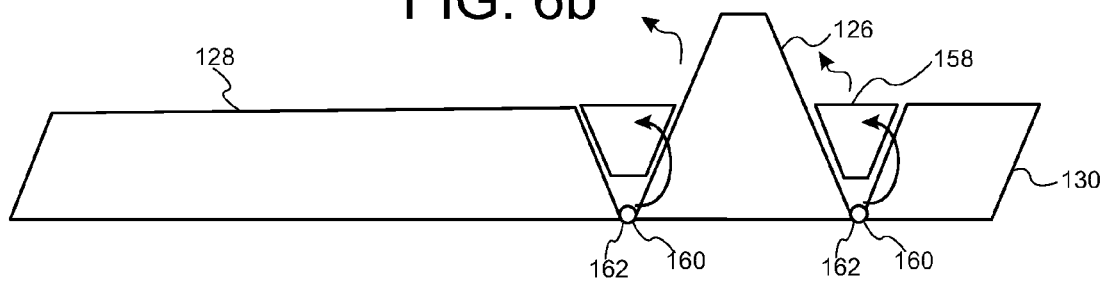

An alternative arrangement of modules for mitigating the effects of front or rear impact forces, which are primarily along the longitudinal axis of a vehicle, is shown in FIG. 6c. In this example, the lateral module is connected to the longitudinal module, and the rear module, via a pivot connection 160 about which the connected modules can turn. The surface of the face of the longitudinal module and the rear modules, which are closest to the lateral module, are shaped to accommodate movement between the modules of the pack when they rotate about the pivot connection 160. The axis of the pivot connection about which the modules can turn extends in a lateral direction across the vehicle-into the page, as viewed in FIG. 6c. Arrows indicate a direction of rotation of modules around the pivot connection. An optional energy absorber 158 is shown configured between the modules. The energy absorber can be configured at the front and/or the rear. The energy absorber can be configured, at least in part, between the faces of the modules that would come in to contact in the event of a collision. The energy absorber can be configured as a component part of a seat of the vehicle, furnishing of the vehicle or other trim component. Additionally, or alternatively a torque bar 162 can be configured in the pivot connection to control the rate at which modules turn towards each other. Additionally, or alternatively one or more dampers can be provided between the or each modules of the pack, said dampers configured to manage the rigidity of the pack by managing the movement therebetween and/or said dampers configured to manage the rigidity of the vehicle.

Figure 7A:
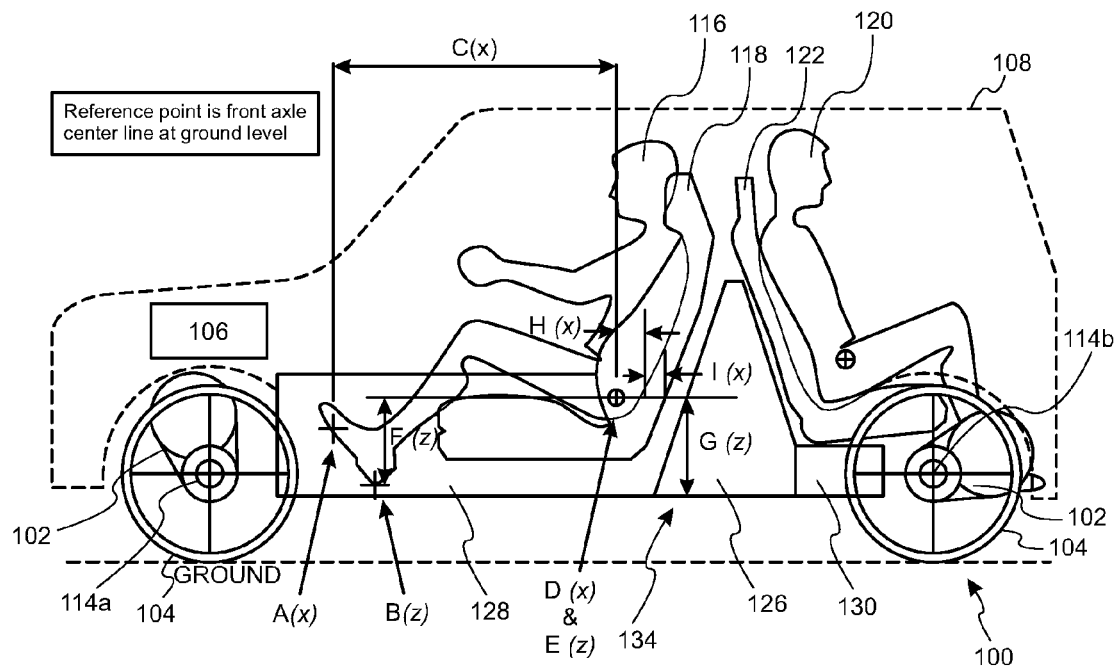
Figure 7B:
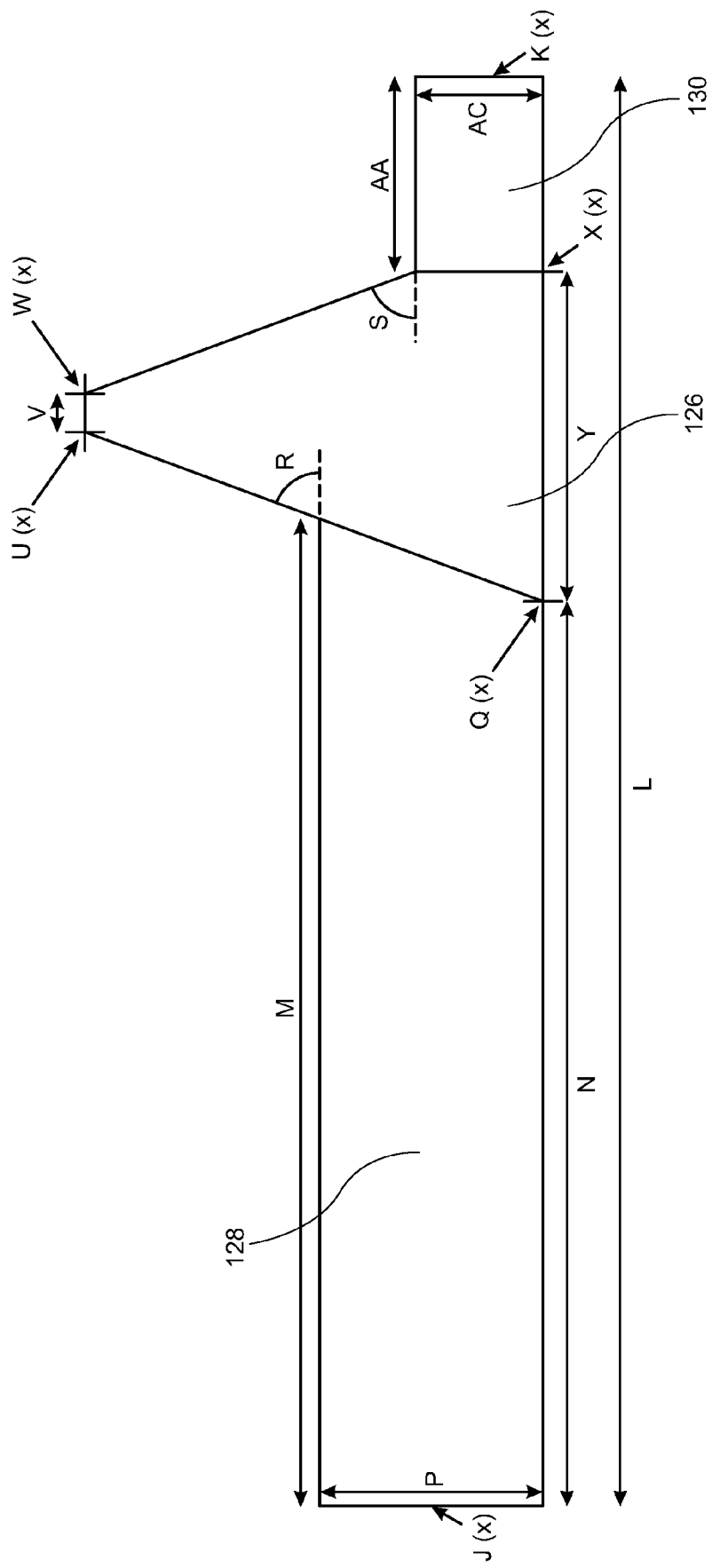
FIGS. 7b and 7c show, respectively, a side-elevation and a side elevation of the pack of FIG. 7a, all of which are provided with references.
Figure 7C:
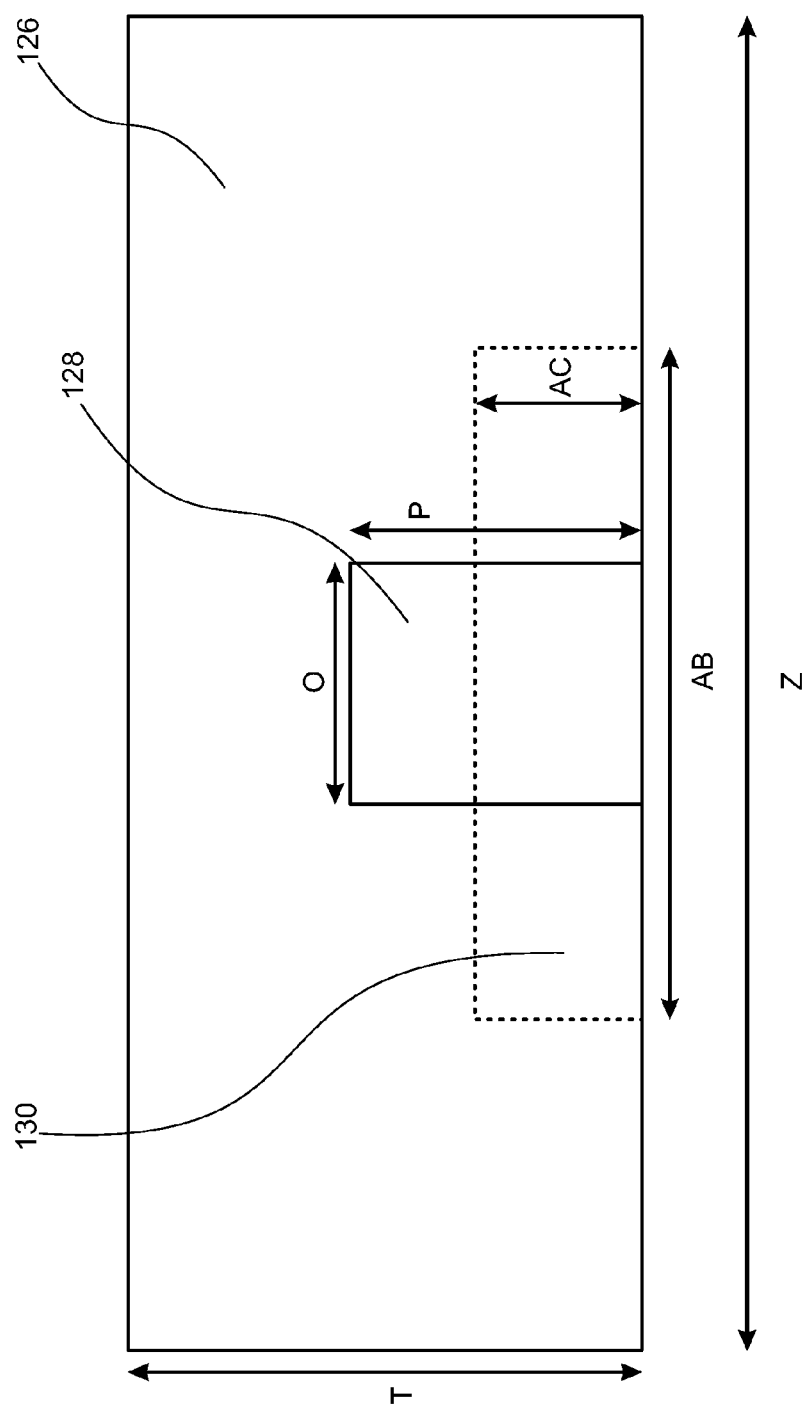

While FIGS. 2a to 4c generally describe the invention, FIGS. 7a to 7c represent a vehicle and pack providing examples of layouts of the invention, and provide a 'reference' for allowing a comparison of different vehicle sizes or segments, which are representative of vehicles currently in the market. FIGS. 8a to 8f, when collated, represent a single table of parameters taken from manufacturers data, measured data, estimated values and calculations-all of which support an appreciation of how the vehicle and pack according to the invention can be adapted for a vehicle by referring to the features and references of FIGS. 7a to 7c. Many occupant and seating positions are possible with the invention and FIGS. 7a to 8f merely provide support, by way of example, for at least a portion of the configurations possible.

FIG. 7a shows an electric vehicle 100 having a length, width and height determined by the body 108 and the wheels 104 mounted on front and rear axles 114a, 114b. A front electrical traction motor 102 is connected to the front axle and a rear motor is connected to the rear axle. The vehicle has the energy conversion module 106 for managing energy to and from the vehicle and to and from the traction motors. Although not shown in these Figures, vehicles can include features such as a front mounted steering rack, independent rear suspension and a rear perimeter frame. The vehicle is shown situated above ground level, which is a reference surface indicated by a dashed line beneath the wheels. The vehicle has a ground clearance, wheelbase, front track, rear track and interior width. The reference point for all dimensions is the front axle centre line at ground level.

Two seats are shown in the side-elevation schematic of FIG. 7a, with a 95$^{th}$ percentile male outline positioned on each of the seats. A pack 107 having a lateral 126, longitudinal 128 and rear module 130 is shown, said pack located between the axles 114a, 114b of the vehicle, as viewed. The longitudinal module of the pack can extend along a tunnel portion of the vehicle and can, alternatively, be referred to as a tunnel module.

Although not shown in detail, the wheels and tyres 104 have dimensions including: front tyre width, front tyre profile and front rim diameter, which can allow the front tyre outer diameter to be approximated through calculation; and a rear tyre width, a rear tyre profile and rear rim diameter, which can allow the front tyre outer diameter to be approximated through calculation.

Ergonomic positions of an occupant position and seating are described in relation to the front passenger, as shown in FIG. 7a, and as tabulated in FIGS. 8a to 8f, which also provides an indication of the direction nomenclature, wherein: X is the longitudinal dimension, extending from front to rear of the vehicle; Y is the lateral dimension, extending from side to side of the vehicle; and Z is the vertical dimension, extending from top to bottom of the vehicle. The reference datum for all measurements in FIGS. 8a to 8f is the front axle centre line at ground level of the vehicle in FIG. 7a. The letter in brackets next to a reference in FIGS. 7a to 7c refers to the dimension it relates to—for example, A(x) refers to the position of the ball of a foot and 'x' is the distance in the longitudinal direction from the front axle centre line at ground level.

FIG. 7a indicates positions of an occupant position and seating, and in which is shown: a position of the ball of the foot of the front passenger at point A(x); a position of the heel of the foot of the front passenger at point B(z); a longitudinal distance from the heel of the foot B(z) to the seating reference point (SgRP, which is the hip-point); the SgRP position from the reference—D(x) and E(z); a vertical distance F(z) from the heel of the foot B(z) to the SgRP; a vertical distance G(z) from the groundline of the vehicle to the SgRP; a distance H(x) from the SgRP to the back of the front seat; and the depth of the seat I(x).

The seat width is not shown in FIG. 7a, although is listed as being 550 mm in FIG. 8c along with examples of the values of the positions shown. FIGS. 7b and 7c are, respectively, a side elevation view and end elevation view of the pack of FIG. 7a. The values of positions of different examples are listed in FIGS. 8e and 8f, and include: the distance of the position of the frontal face of the pack J(x) from the front axle; the distance of the position of the rearmost face of the pack K(x) from the front axle; the overall pack length L; the length M of the upper surface of the longitudinal module (tunnel) from the front of the pack to the interface with the lateral module; the length N of the lower surface of the longitudinal module (tunnel) from the front of the pack to the interface with the lateral module; the width O of the longitudinal module, which has been set to a value of 300 mm for all but two of the examples to emphasise the importance of the lateral module in the pack; the height P of the longitudinal module, which has been set to a value of 350 mm for all examples to emphasise the importance of the lateral module in the pack; the length AA of the rear module; the width AB of the rear module; the height AC of the rear module, which has been set to a value of 200 mm for all of the examples to emphasise the importance of the lateral module in the pack; the distance Q(x) from the front axle to the front edge of the lateral module; the angle R between the front face of the lateral module and the ground; the angle S between the rear face of the lateral module and the ground; the height T of the lateral module, which has been nominally set at 55% of the vehicle depth for all of the examples to emphasise the importance of the lateral module in the pack; the longitudinal distance U(x) from the reference point to the uppermost front edge of the lateral module; the length V in the longitudinal direction of the uppermost surface of the lateral module; the longitudinal distance W(x) from the reference point to the uppermost rear edge of the lateral module; the longitudinal distance X(x) from the reference point to the rear edge of the lateral module; the length Y of the base of the lateral module; and the width Z of the lateral module in the lateral direction.

In light of the teaching herein a vehicle can be configured with a pack having a lateral module. While the applicant considered a pack having a lateral module combined with a longitudinal module as being suitable for lowering the hip-point (HP) or SgRP of a sports vehicle that typically has a lower ride height, the use of a pack having a lateral module of the invention provides substantial storage capacity for any vehicle, and the use of the longitudinal module enables the SgRP to be configured relatively lower in the vehicle.

FIG. 8a considers the pack of the invention applied to a range of vehicles of different sizes, including: a sub-A segment vehicle, such as a 'SMART'®; an A-segment vehicle, such as a Volkswagen UP®; a B-segment vehicle, such as an Audi A1® or a Volkswagen Polo®; a C-segment vehicle, such as an Audi A3® or a Volkswagen Golf®; a D-segment vehicle, such as an Audi A4®; an E-segment vehicle, such as an Audi A6® or a Volkswagen Passat®; a F-segment vehicle, such as an Audi A8® or a Volkswagen Phaeton®; a sports C-segment vehicle, such as an Audi TT®; and an independent bespoke example of sports C-segment vehicle.

Many parameters and ratios of values can be determined from the dimensions of each vehicle in the tables in FIGS. 8a to 8f, which can be understood in context by referring to the example layout of FIGS. 7a to 7c. The provision of a lateral module having a prismatic or pyramidal form improves the stability of the module and provides improvements on its own. A vehicle having such a lateral module can benefit from an improved layout and internal packaging when a front seat and rear seat are arranged to face in opposite directions. The dominant factors influencing the volume of a pack are the wheelbase of a vehicle, vehicle height and the height of the lateral pack. FIGS. 8a to 8f demonstrate how, despite the difference in sizes of vehicles in different segments, a lateral module and/or a configuration between back-to-back front and rear seats, layout improvements can be achieved.

The improved layout can, using the examples of FIGS. 7a to 8f, which are considered representative of the sizes of most electric driven vehicles, provide at least one of the following configurations:

- A lateral module with a volume ranging from about 3791 to about 5991, when the height (dimension T) is about 55% of the depth of the vehicle i.e. vehicle height minus ground clearance. At about 55% of the depth, if a lateral module is configured in a pack with longitudinal and lateral modules (where possible) then the lateral module accounts for between about 68% to about 83% of the volume of the pack. The most notable contribution of the lateral module in a small sub-A-segment vehicle. Increasing the height of a lateral module to about 70% of the depth can increase the range in volumes of the lateral module alone to between about 3921 to about 8981 (which is between about 78% to 84% of the pack volume). Increasing the height of a lateral module to about 80% of the depth can increase the range in volumes of the lateral module alone to between about 3781 to about 11231 (which is between about 80% to 86% of the pack volume). The height of the lateral module in a vehicle depends on the configuration requirements of the vehicle, but it can be appreciated that over a range of vehicle sizes the lateral module can account for between about 3791 to about 11231, and between about 68% to about 86% of the pack volume when configured in conjunction with a longitudinal module and/or a rear module. The longitudinal and rear modules can be optional but serve to illustrate the benefit of the lateral module configured herein. Although not described in detail a front module, positioned between the bulkhead and the front of the car can add additional volume to the pack.
- The length of the pack, when including longitudinal, lateral and rear modules, is influenced by the length of the vehicle wheelbase (longitudinal direction) and the necessary clearance space thereto. As such, the length of the pack can be between about 88% to about 92% (dimension L) of the wheelbase.
- The length of the base of the lateral module (dimension Y) can be between about 26% to about 41% of the wheelbase length. In particular, when the height of the lateral unit is about 55% of the depth of the vehicle then the length of the base of the lateral module can be between about 26% to about 33% of the length of the wheelbase. When the height of the lateral unit is about 80% of the depth of the vehicle then the length of the base of the lateral module can be between about 26% to about 41% of the length of the wheelbase. When the height of the lateral unit is about 70% of the depth of the vehicle then the length of the base of the lateral module can be between about 32% to about 39% of the length of the wheelbase.
- The lateral module and the longitudinal module (tunnel) can be the largest of the pack. In the examples the longitudinal module has a height of about 350 mm. The lateral module can be between about 275% and about 700% of the volume of the longitudinal module, and between about 150% and about 350% of the height of the longitudinal module. In particular, when the height of the lateral unit is about 55% of the depth of the vehicle then the lateral module can be between about 275% and about 500% of the volume of the longitudinal module, and between about 157% and about 225% of the height of the longitudinal module. When the height of the lateral unit is about 80% of the depth of the vehicle then the lateral module can be between about 400% and about 720% of the volume of the longitudinal module, and between about 250% and about 350% of the height of the longitudinal module.
- Given that the lateral module and the longitudinal module (tunnel) can be the largest of the pack, the dominance of the lateral module can be appreciated further when the longitudinal module has a height of about 200 mm. In this case, when the height of the lateral unit is about 55% of the depth of the vehicle then the lateral module can be between about 500% and about 875% of the volume of the longitudinal module, and between about 300% and about 400% of the height of the longitudinal module. When the height of the lateral unit is about 80% of the depth of the vehicle then the lateral module can be between about 700% and about 1300% of the volume of the longitudinal module, and between about 450% and about 650% of the height of the longitudinal module.
- When the pack is configured as shown in FIGS. 2a to 3c, with no underfloor-type pack, then the hip-point of front passenger—the SgRP—can be between about 31% and about 41% of the vehicle height. These figures can be subject to fluctuation according to each vehicle's bespoke configuration-however, it is reduced in comparison with equivalent vehicles having underfloor-type packs that raise the height of the passengers and, therefore, the SgRP. The pack of the invention, especially in combination with rear-facing seats behind the front seats, enable the height of an SgRP and overall height of a vehicle to be minimised—but used in combination with an underfloor type pack the overall capacity for energy storage can be increased for a vehicle.

When taking in to account the area in which a pack can be configured in vehicle, and the height of the vehicle, the packaging efficiency can consider the volume of the pack per m$^2$ (wheelbase×average of the track of the vehicle) and the volume of the pack compared to the height of the vehicle.

In particular, when the height of the lateral unit is 55% of the depth of the vehicle then the pack can provide between about 144 l/m$^2$ and about 187 l/m$^2$, and about 294 l/m and about 564 l/m. When the height of the lateral unit is 70% of the depth of the vehicle then the pack can provide between about 173 l/m$^2$ and about 242 l/m$^2$, and about 302 l/m and about 746 l/m. When the height of the lateral unit is 80% of the depth of the vehicle then the pack can provide between about 168 l/m$^2$ and about 265 l/m$^2$, and about 293 l/m and about 885 l/m. The examples of FIGS. 7a to 8f can be implemented on known vehicles. However, the shapes and values provided are an indication of the scope of the invention. Modifications and adjustments can be made in light of the teaching herein to optimise the form of a pack or its integration into a vehicle while achieving substantially the same volumes and ratios presented in the examples herein. The percentage values given as approximations e.g. 'about' because of tolerance variations and minor adjustments that can be implemented in light of the teaching herein.

FIGS. 2a to 6b are examples in which the lowermost, or bottom surfaces, of the modules of the pack extend in the same plane, and this configuration enables the pack to be positioned as low as possible in the vehicle. As a consequence, the SgRP of the front and/or rear passengers can be minimised because there is no pack beneath said passengers. This, consequently, enables the frontal area of the car to be minimised such that range can be increased by reducing aerodynamic drag. However, the modules of the pack can be positioned at different heights to accommodate other features of the vehicle e.g. the rear-axle, such that the base of the rear module is raised with respect to the base of the longitudinal and/or lateral module. And the pack taught herein can be combined with known pack configurations, such as an underfloor-type battery.

Examples of the pack in various passenger vehicles have been demonstrated, and in light of the teaching herein the pack can be adjusted to larger passenger vehicle including, but not limited to, a Volkswagen® minibus or a Mercedes Sprinter® minibus.

If a vehicle height does not have to be limited, and the volume of the pack is to be maximised, to maximise the range, then the lateral module can be provided upon an underfloor-type module that extends across the floor of a vehicle between the axles. In such a configuration the lateral module extends between the front seats and rear seats, the latter facing the rear of the vehicle. A longitudinal module can be provided, additionally, to extend between the front seats. A rear module can be provided, additionally, to extend the between or beneath the rear seats.

In addition to the ability to reduce the height of the hip-point, often referred to as the SgRP, of the seating: The pack and seating arrangement can improve the rear occupant safety in the event of a frontal collision, because the rear occupants are facing rearwards. The lateral module can be configured to provide improved structural performance of the vehicle in which it is configured. The lateral module of the pack, and elements thereof, such as the envelope, functions as a torque-box that is configured to improve vehicle stiffness.

Figure 9:
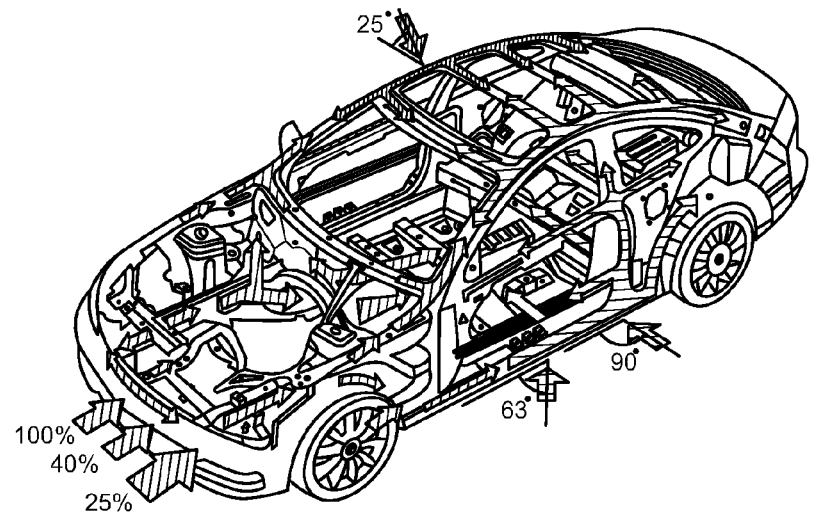
FIG. 9 is a perspective views of a body-in-white (BIW) of a known vehicle in which load paths are illustrated by arrows alongside the respective structural members.

FIG. 9 illustrates, using arrows, a selection of load paths through a typical vehicle's structural members. The uppermost arrows, as viewed, indicate the forces applied at a 25-degree angle to the roof, which would occur during a roll-over event and impose forces across the roof structure of the vehicle. Similarly, the arrows directed at the side of the vehicle indicate the forces and load-paths upon and through the vehicle during a direct (90-degree) or indirect (63-degree) side-impact collision. Arrows also show frontal impact forces and the subsequent loads paths through the structure of the vehicle. While three groups of arrows are illustrated a skilled person would appreciate that the structural members of a vehicle worked together to provide the overall structural integrity of the vehicle.

Figure 10A:
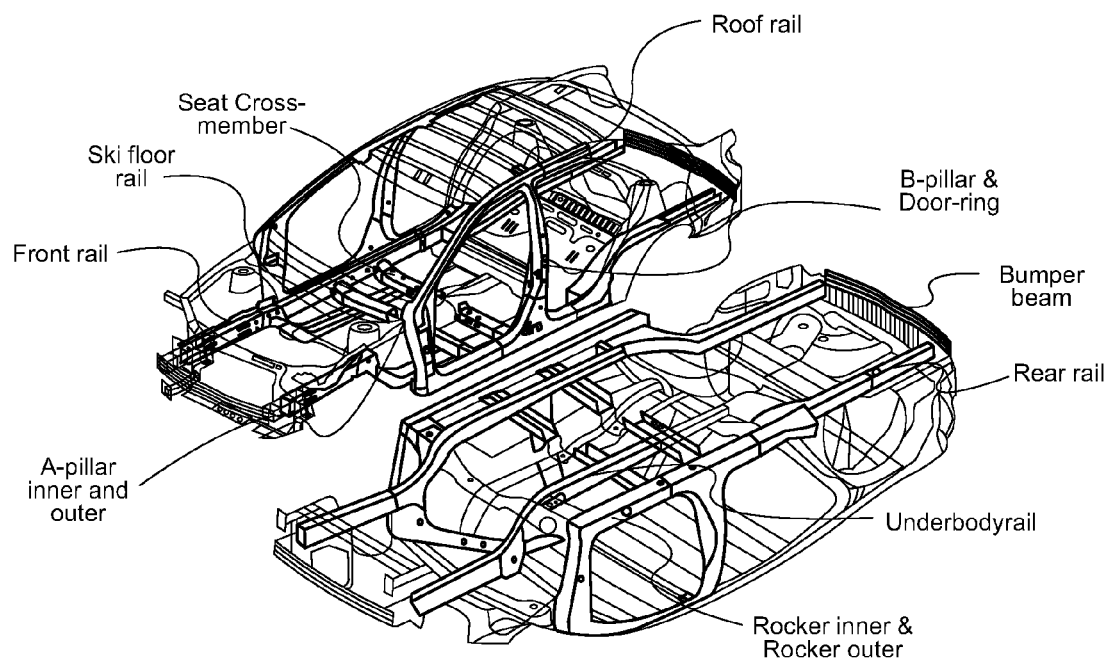
FIGS. 10a to 10b are perspective views of a body-in-white (BIW) of a vehicle showing structural members.
Figure 10B:
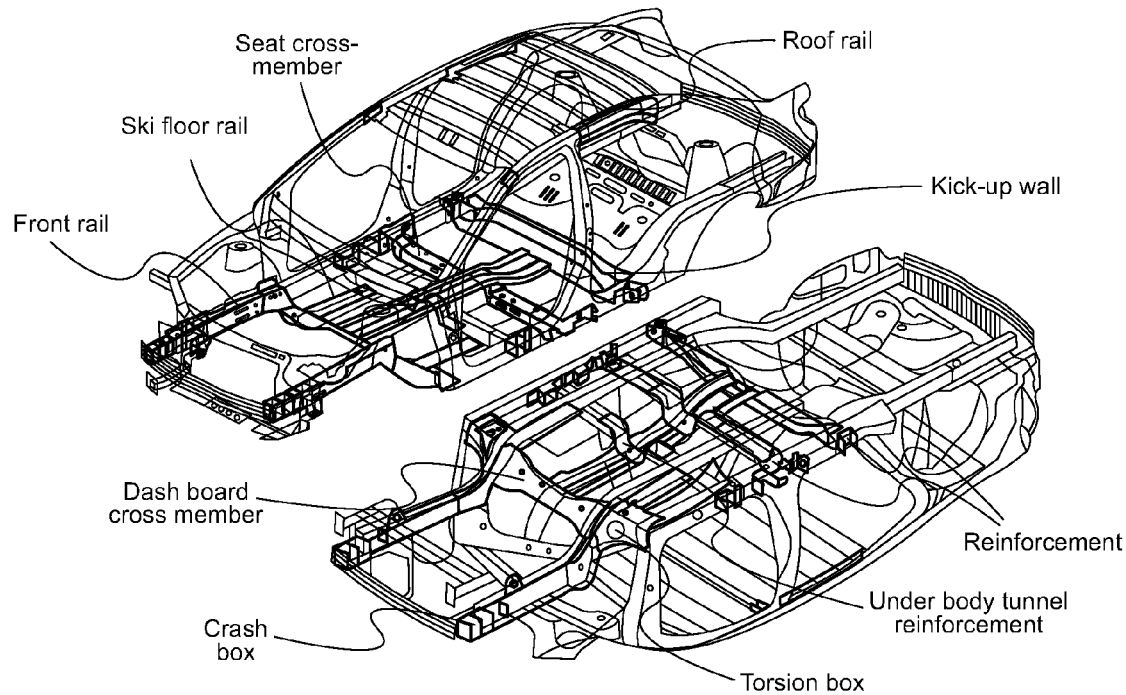

FIGS. 10a and 10b name, using labels, individual structural members in a comparable typical vehicle. Four perspective views are provided to illustrate structural members from different angles. Each type of structural member is labelled, although not all of the same type are labelled. FIG. 10a includes: seat cross-member; roof rails; B-pillar, and door ring; bumper beam; rear rail; under body rail; rocker inner and rocker outer, which are also commonly referred to as 'sills'; A-pillar inner and A-pillar outer; front rail; and ski floor rail. FIG. 10b also includes: seat cross-member; roof rail; front rail; and ski floor rail. FIG. 10b additionally includes: kick-up wall; reinforcements; under-body tunnel reinforcement; torsion box; crash box and dashboard cross member.

By comparing the positions of these structural members with the corresponding position in FIG. 9, the complexity and connectivity therebetween can be in a vehicle body-in-white can be appreciated. During a collision, impact forces create a 'crash pulse' that passes through the vehicle along the structural members and their connections. Equally important are the forces applied to the vehicle through the wheels during dynamic driving conditions, or a collision, which create torque forces within the vehicle body about at least one of the x-axis (roll), y-axis (pitch) and z-axis (yaw).

The structural efficiency of a vehicle can be determined by a balance between weight, strength, material choice, crash structures for energy absorbance and torsional and bending stiffness. The structural efficiency of the BIW in FIGS. 10a and 10b is an illustrative example, and a skilled person would appreciate that changes to the vehicle cannot be made without a compromise. For example, underbody reinforcing members are shown running fore-aft and laterally under the vehicle in addition to the floor tunnel, swaging on the floor panel and the seat cross-members all contribute significantly to the structural integrity during impact events. These members also significantly contribute to the torsional and bending stiffness of the vehicle body.

An alternative BIW that could accommodate an underfloor-type battery pack, such as a skateboard platform, are required to package the battery pack where many structural members are positioned. Modifications are, therefore, necessary to implement the structural integrity using additional or modified structural members in order to avoid increases to vehicle ride height and maintain torsional and bending stiffness. Furthermore, in vehicles with underfloor battery packs the floor tends not to be treated as a significant structural member as it is undesirable for the bulkhead and floor areas to be subjected to high strain in the event of an impact to prevent intrusion into the battery pack. The battery pack once installed in the vehicle provides a useful and sometimes high contribution to the torsional and bending stiffness of the vehicle. As the body on vehicles with underfloor battery packs tends not to have high lateral stiffness due to the limited use of structural members in the floor (typically limited to seat cross-members), the battery pack has to provide the necessary lateral stiffness once installed in the vehicle. To provide the lateral stiffness the underfloor battery pack is required to have a high stiffness outer casing and many lateral structural members. The battery casing and structural members would typically equate to 18% to 28% of the weight of an underfloor battery pack. The structural integrity of the underfloor battery pack requires greater strength to provide the high lateral stiffness and reduced intrusion into the battery pack in the event of a side impact.

In comparison, there are lower requirements for the lateral module 126 in relation to lateral structural performance, which is configured to provide a restraint mechanism for battery modules or cells, enabling a useful weight saving. This is because the compartment 170 can provide the primary structural performance. The envelope 140 of the lateral module can, optionally, contribute to the vehicle torsional or bending stiffness and thereby the envelope 140 and lateral module can be significantly lighter than an underfloor battery pack of similar volume. The weight saving of the lateral module and envelope can typically be 6% to 16% of the total weight depending on vehicle and battery pack size.

Figure 11:
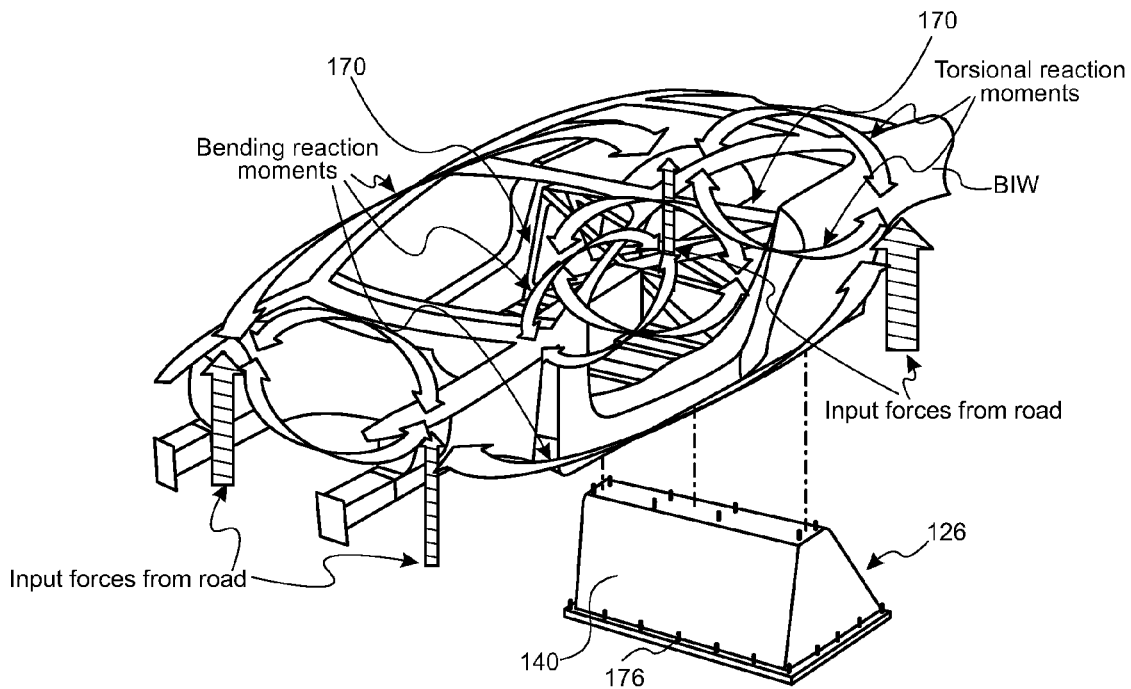
FIG. 11 is a perspective view of a vehicle according to the invention and the forces acting upon it in the X, Y and Z planes, as well as input forces from a road surface, indicated by arrows.

FIG. 11 shows a BIW that includes vertical arrows indicating input forces that it would typically receive from a road surface, while curved arrows illustrate the resulting bending reaction moments and torsional reaction moments experienced when the body of the vehicle is subject to forces about its axes. Forces acting on the vehicle suspension from reaction to road surface irregularities, potholes, speed-bumps, cornering etc. results in a net side to side and front to rear torques acting from front axle to rear axle, as indicated by the vertical arrows that have different widths indicating asymmetric forces. The net side-to-side torque is regarded as a torsional input, and torsional stiffness refers to the displacement of the body relative to the torsional input. The net front-to-rear torque is regarded as a bending input and bending stiffness refers to the displacement of the body relative to the bending input. Torsional and bending stiffness (both static stiffness and dynamic modal properties) are key considerations for the performance of vehicle ride and handling, and in particular the performance in relation to noise and vibration. The structural members fore, aft and on top of the compartment 170 and/or lateral module 126, which are represented by struts 170a, which are shown as a brace type structure in this example. Additionally or alternatively to the struts 170a, walls 170b that form a firewall/bulkhead type configuration, typically of sheet metal, can be configured to connect the body sides and/or the struts 170a, creating a structure that greatly resists torsional bending forces experienced by the vehicle in use. The compartment and/or the struts and or the bulkhead can function to resist the bending input. The compartment is an integrated part of the body structure, which can be either permanently attached or connected with a removable fixing arrangement. The form, size and material selection for the structural members is engineered along with the body structure and other structural members to meet the body's specific design requirements. The compartment adds additional mechanical constraint to the body sides, thereby reducing resultant displacement from forces acting on the BIW structure. This additional constraint is of particular benefit on a large vehicle such as a minibus, or a vehicle with multiple door openings on each side due to the open structure of such arrangements. The connection of the lateral module 126 to the compartment can be implemented by the fixings 176. Each fixing point further improves the torsional and bending stiffness of the vehicle body.

The compartment's integration with the vehicle body is such that it improves crashworthiness, and increases occupant protection in all types of crash scenarios. In particular, the compartment 170 functioning as a housing for energy storage, such as hydrogen or an electric battery, is configured to ensure the lateral module 126 battery pack experiences low levels of intrusion during impact events to prevent leakage, rupture, fire and explosions.

The width of the lateral module 126 can be less than the total width of the compartment, which is comparable to the width of the vehicle—example dimensions can be appreciated in the table of FIG. 8, wherein the width of the lateral module (dimension Z) is less that the width of the vehicle. A gap between the ends of the compartment 170 and the ends of the lateral module 126 therein can provide a crumple-zone. Not only does the compartment provide structural integrity during side impact events (such as from another vehicle or impacting a pole), which result in large lateral forces acting on the vehicle side, but the cells within the lateral module can be spaced from the side. The envelope 140, however, of the lateral module can complement the strength of the compartment 170 by at least one of (i) having a close fit to the compartment, such that the gap between is less than 50 mm, and preferably less than 30 mm, and preferably 10 mm of less, and (ii) the fixings 176 between the envelope and the compartment.

The compartment can improve crashworthiness and passenger protection in particular crash scenarios. One such scenario involves a side-impact collision between vehicle with low ride-height, which this invention is suited to, and another vehicle having a higher ride-height, such as a pick-up truck having a robust ladder-chassis. In a conventional vehicle, the collision could occur at a mid-point of the B-pillar, which is the weakest point thus increasing the likely protrusion into the passenger compartment. In a vehicle having a compartment 170 extending across the vehicle, said compartment extending vertically within the vehicle and connected to the sides e.g. to the B-pillar, thus improving the structural integrity of the vehicle in the event of such a crash.

Overall, the compartment 170 can be connected to the body-in-white of conventional vehicle bodies, and at least one of the body sides, the body pillars, the door rings, the floor, the seat cross-members, the floor reinforcements, the rockers, which contributes to the structural integrity during side impact events.

The provision of a compartment 170 and the lateral module 126 provide a number of structural features to a vehicle. The compartment connects to the side of the vehicle. The connection at the sides of the vehicle can extend from the lowermost level of the vehicle, the floor or bottom of the passenger compartment, and said connection can extend upwards. The height of the uppermost point of connection at the side of the vehicle can be above at least one of: the top of the seat back of the first and/or second seat; the maximum height of a cushion of the seat in the first seat in a first row and/or the second seat in a second row; an average height of a seat cushion in the first seat in a first row and/or the second seat in a second row; and a hip-point of the seats in the first row and/or the second row.

The compartment, alone or in combination with the lateral module, can function as a torsion box, connecting to the vehicle base and/or sides to improve vehicle torsion and bending stiffness. The compartment can be implemented at one of the pillars of the vehicle, such as the A-pillar, B-pillar or C-pillar. The compartment can increase body lateral stiffness, especially where passenger and/or battery protection is required, or where the vehicle has an open and relatively weak structure, such as in a panel-van. In other words, the compartment can enhance side impact stiffness, reducing passenger cell intrusion during side impact and/or improve protection for a battery pack from side impact intrusion.

While known vehicles are designed with performance in mind, such as crash performance, the development of a vehicle to incorporate a pack, which has significant mass, can lead to weight gain because of the additional strength of structural members required to accommodate the pack and its weight. It is therefore important that the accommodation of a pack is implemented in an efficient manner such that the weight and cost increase in minimal, while there is no detriment to either torsional stiffness and/or lateral stiffness. The compartment 170 not only improves vehicle stiffness but can minimise the need for higher gauge material, material with greater strength and extensive structural member modifications.

While underfloor batteries, such as those found in a 'skateboard' platform, provide an alternative to the lateral module they have an impact of the vehicle stiffness and weight. The use of the compartment 170 and a lateral module 126 allows a conventional vehicle structure to be used, with minimal modification and improved performance compared to the underfloor battery pack arrangement. This is because an underfloor battery pack arrangement requires additional protection in the front to protect the battery pack in the event of a frontal biased impact, wherein the forces transmitted during the impact event are required to be channelled along the body front longitudinal support members into the vehicle lower side members and the structure around the door aperture. Accommodating an open body structure requires members of significant section size to provide the back-up structure with sufficient force transmission into the side members.

The use of an underfloor battery arrangement increases the mechanical property requirements on both the vehicle body structure as a stand-alone structure and also on the battery pack as a stand-alone structure. The vehicle body structure needs to have sufficient structural integrity without the battery pack installed to enable assembly of vehicle and to enable the battery to be removed for servicing of the vehicle or battery pack. Similarly, the battery pack has to have sufficient structural integrity when not installed in the vehicle to enable the battery pack to be lifted and transported. These requirements are over and above the requirements of the body & battery pack as a combined unit. The requirements for the body and for the battery pack as stand-alone structures add one or more of the following to both the body and the battery pack: additional structural elements; increased section sizing; increased material thickness; and increased material specifications.

In contrast, the compartment and lateral module 126 taught herein enables a vehicle's body-in-white structural members to require no, or minimal, modification. That is, the original structure, or back-up structure, of a vehicle incorporating the compartment allows the design to follow conventional arrangements where the forces are transmitted from the body front longitudinal members into the vehicle floor panel and tunnel structure in addition to the vehicle side members and door aperture structure. Such an arrangement results in a more efficient back-up structure with smaller section sizes, lower gauge and lower specification material-resulting in weight and cost savings.

Similar to the above, except in the case of rear biased impact: for an underfloor battery arrangement, the forces transmitted during an impact event are required to be channelled along the body rear longitudinals into the vehicle lower side members and the structure around the door aperture—such an arrangement results in an open body structure requiring members of significant section size to provide the back-up structure with sufficient force transmission into the side members. The placement of the battery pack in-front of and or between the second-row seats enables the vehicle back-up structure to follow conventional arrangements where the forces are transmitted from the body rear longitudinal members into the vehicle floor panel and tunnel structure in addition to the vehicle side members and door aperture structure. Such an arrangement results in a more efficient back-up structure with smaller section sizes, lower gauge and lower specification material-again resulting in weight and cost savings.

The dimensions and integration of the compartment 170 and lateral module 126 into a vehicle, as disclosed herein, have separate requirements for the body and the battery pack. The compartment has a smaller aperture 172 relative to the body structure. Using the examples from FIG. 8, which provides examples of lateral modules of different sizes for different vehicles, it can be appreciated that: the area of the base of a lateral module (determined from the references Y and Z) ranges between 0.777 $m^2$ to 1.217 $m^2$; the volume of the lateral module per square metre ranges between 433 litres to 506 litres per square metre; and taking in to account the area defined by the wheelbase and width of the vehicle, that base of the lateral module ranges between 20% and 25% of said area. These examples illustrate the minimal detrimental impact of a lateral module upon a vehicle structure and the volume of the lateral module relative to its footprint-all of which can be compared to the requirements of a comparable underfloor-type pack in a skateboard platform.

By way of example, a lateral module of the invention incorporated in a large F-segment vehicle would have a module size L×W×H of around 800 mm 1500 mm×700 mm, providing a pack volume of 0.84 $m^3$ and a footprint of 1.2 m2, resulting in 0.7 l/$m^2$. In comparison, a Tesla Model S® has a module size L×W×H of around 2650 mm×1560 mm×110 mm, providing a pack volume of 0.455 $m^3$ and a footprint of 4.134 m2, resulting in 0.11 l/$m^2$.

The relative size of the aperture 127 footprint compared to the footprint of the vehicle between the wheelbase allows for a greater relative stiffness of the floor panel for a given material specification or section size, leading to lower levels of noise, vibration and harshness. Another benefit of the reduction in maximum dimension of panels is that it leads to a reduction in production tooling and gauge costs.

Further vehicle performance flexibility achievable as a consequence of the efficient volume per floor space requirements as taught herein is the ability to implement larger diameter wheels and tyre assemblies on the vehicle, which can achieve lower rolling resistance. Further, an increase in vehicle weight can dictate the use of wider tyres such that the volume required to house the wheel and tyre assembly increases. The volume required to house wheel and tyre assemblies has grown circa 20% in the last twenty years. As an example, a 2000 model Range Rover has a maximum in service tyre diameter of 756 mm and maximum in-service tyre width of 277 mm. By comparison, a 2020 model Range Rover has a corresponding maximum in service tyre diameter of 801 mm and a maximum in-service tyre width of 302 mm. The corresponding maximum volume for each wheel and tyre assembly has increased from 124 litres to 151 litres. The space required to house and provide clearances for the operation of the wheel and tyre assembly directly impacts the available space for occupants and the battery pack. In the situation where the battery pack is fitted under the floor of the vehicle, the reduction in space for the battery pack when large wheels and tyres are used requires alternative space to be created for the battery pack, and this is achieved either by extending the wheelbase or by increasing the height of the battery pack. Both approaches for increasing space reduce the vehicle energy efficiency through either higher aerodynamic drag and/or greater vehicle mass.

Reference is now made to the impact on the structural members of a typical vehicle, with reference to those identified in FIGS. 10a and 10b. Different vehicle types will have different performance requirements, so the impact on each component of this typical is considered by way of example. Emphasis is placed, therefore, of the impact of a vehicle having a compartment 170 for a lateral module. This is compared, on a component-by-component basis with a vehicle having an underfloor battery pack.

On a vehicle having a compartment 170, the roof rail and seat cross-member can be carried over. A number of structural components follow conventional body structural requirements, such that modification is required to increase section size and/or material specification and/or form only to support the additional mass of a lateral module in an electric vehicle, which has a mass increase of around 10% to around 24% compared with the mass of a vehicle having an internal combustion engine (ICE). The components requiring conventional modification include: A-pillar inner and outer; B-pillar and door-ring; Crash box; Dashboard cross member; Floor panel; Floor tunnel; Front Rail; Rear rail; Rocker inner and outer; Roof rail; Seat cross-member; Ski floor rail; Torsion box; and Under body rail. Depending on the vehicle type, under body tunnel reinforcement can be omitted because its function is provided by the compartment 170. The kick-up wall can be omitted because its function is provided by the compartment 170.

In contrast, a vehicle having an underfloor-type 28 battery omits the ski floor rail, under body rail and underbody tunnel reinforcement to accommodate the battery. A primary function of these components was structural, especially to accommodate impact loads and to increase bending stiffness. A secondary function of these components was to improve noise and vehicle handling (NVH) from increased floor stiffness, which is transferred to torsion boxes, rockers, A-pillars, B-pillars, roof rails, door rings and battery pack structure. Their omission has a knock-on effect to other structural members.

In a vehicle having an underfloor-type 28 battery a number of structural members require modification, including: the a-pillar inner and outer; rocker inner and outer; rear cross-member; B-pillar and door-ring; front torsion box; and roof rail. These sections require a significantly increased section size and/or material specification and panel form to cope with at least (i) increased loads from frontal impact transmitted from the torsion box into the A-Pillars and Door-rings, (ii) increased loads transmitted along rockers and door-rings into A-pillar from a side impact as a result of the removal of the underbody reinforcement, and (iii) the additional mass of the battery pack compared with an ICE. (typically mass increase of 16% to 30%). Further, modification is required to accommodate fatigue loads from hanging the underfloor-type battery pack (typically 400 kg to 900 kg) from the rockers (the battery pack is also typically hung from the dashboard cross-member, torsion boxes and cabin rear cross-member). In a vehicle having an underfloor-type 28 battery structural members requiring modification to accommodate the additional mass compared to an ICE include the rear rail, crash box and front rail.

In a vehicle having an underfloor-type 28 battery, the kick-up panel, which is positioned above the battery pack, is typically smaller in section size to provide space for the battery pack. This reduction in size reduces the capability to transmit load during a side impact. By way of example, a Porsche Taycan® has a kick-up panel raised above the floor and can be a greater size than a conventional vehicle to accommodate a secondary stack of battery cells or the battery management system below the kick-up panel. The dashboard cross member is also, typically, has a reduced section size in fore-aft direction to liberate space for battery pack.

The floor panel in a vehicle having an underfloor-type 28 battery, is redundant as the battery pack is integral to the structural performance of the vehicle and the primary function of the floor panel is largely reduced to providing support for the interior components. Seat cross-members are typically reduced in height compared with a conventional vehicle to help keep the overall vehicle height as low as possible for aerodynamic reasons, whilst providing sufficient occupant headroom—the impact of a reduced height seat cross-member is that it reduces the ability of the seat cross-member to transmit loads during side impact, thus requiring the rockers, door-rings, pillars, roof rails and battery pack to take a greater portion of the side impact loads.

A further redundant structural member, which is often omitted in vehicles with underfloor battery packs, is the floor tunnel that performs a structural impact safety function. Said function need to be implemented in the battery pack structure.

Generally, in vehicles with underfloor battery packs the key differences are as a result of having a large and heavy object, that typically extends across a large portion of the width of the vehicle, attached below the vehicle floor resulting in high loads and high strain levels. The high loads and strain levels are particularly concentrated at the corners of the battery pack, from impact and other proof load events. In addition, many of the structural functions of the floor and some other structural members (such as underfloor rails) in close proximity to the floor are transferred to the battery pack casing and internal structural members due to incompatibility of those structural members with an underfloor battery pack. The battery pack structure and rockers tend to be of large section size and/or high gauge to provide structure for side impact protection.

Additional structural members are required for a vehicle having an underfloor-type 28 battery. These include:

a battery pack lower shield, configured to resist puncture from objects hitting the underside of the vehicle, while providing additional stiffness to the battery casing. Such shield is typically made from 6 mm sheet aluminium or 1.5 mm sheet steel-which add significant weight because of the large footprint to be protected;

battery pack inner lateral members, and inner longitudinal members, configured to provide: lateral connection, and hence a load path from the battery pack casing sides to primarily provide stiffness during side impacts; additional torsional and bending stiffness to the battery pack; mounting points for the battery cells or modules (the longitudinal members may perform this function); and an arresting function for battery cells or modules in the event of an impact;

battery pack outer casing, using steel and/or aluminium, and if formed of aluminium, they tend to be formed using extrusions or castings for the front, side and rear members with high wall thickness and internal stiffening to achieve high stiffness and high strength, to meet the strain level requirements during impact events and the proof and fatigue loads from durability events, and if formed of steel, they tend to be formed from a combination of press-formed and roll-formed sections, using high strength steels to meet the strain level requirements during impact events and the proof and fatigue loads from durability events; and fastenings to integrate the battery pack with vehicle at the dashboard cross-member, the torsion boxes, the rockers and rear cross-member with approximately 10 to 20 fixings per side, with an increased number in the corners due to the high proof and fatigue loads at the corners of the battery pack to maintain the integrity of fixings.

Overall, the integration of the underfloor battery pack with the body adds around 10% to the torsional and bending stiffness of the body. Given that a typical battery pack casing and structural members has a mass of between 60 kg and 200 kg, depending on battery and vehicle size, the additional stiffness offered by the integration of the battery pack and body is low compared with that possible if the body was stiffened more optimally by a similar mass, this is principally as a result of the long span, and the low height of the battery pack leading to a low second moment of area or "I value".

A battery electric vehicle designed with the lateral module 126 and compartment 170, preferably extending vertically from the floor region to above the seat cushion and/or hip-point, enables the BIW design and structure to follow conventional body structural designs to meet the requirements for occupant and battery protection. The front and rear impact loads would largely follow the path as on a conventional vehicle, although can be enhanced by the compartment 170 structure. The side impact load paths differ in that the panels/cross-members fore, aft and above the battery pack provide high stiffness load paths, enabling some of the structural function of the following items to be transferred to these panels: rockers, A-Pillar, B-Pillar, door rings, dash-cross-member, seat cross-members, underfloor tunnel reinforcement and the kick-up stand.

While the compartment has been described in relation to a traditional BIW structure, the compartment can be configured, at least in part, as an integral component of a monocoque chassis, such as a carbon fibre monocoque chassis. A monocoque chassis can be defined a single body component that integrates with the rest of the vehicle. The compartment, preferably, connects to the sides of the vehicle BIW or monocoque.

Further the concentration of the battery pack in a smaller footprint enables the battery structure to have high structural stiffness, which is at least 50% greater compared with an equivalent volume underfloor battery pack due to the shorter span of the lateral battery pack, combined with the greater height allowing for a considerably higher second moment of area. This higher structural stiffness of the battery pack when mechanically connected to the rockers, body sides, and importantly the panels/cross-members fore, aft and above the battery pack provides a high contribution to the body torsional and bending stiffness.

Figure 12A:
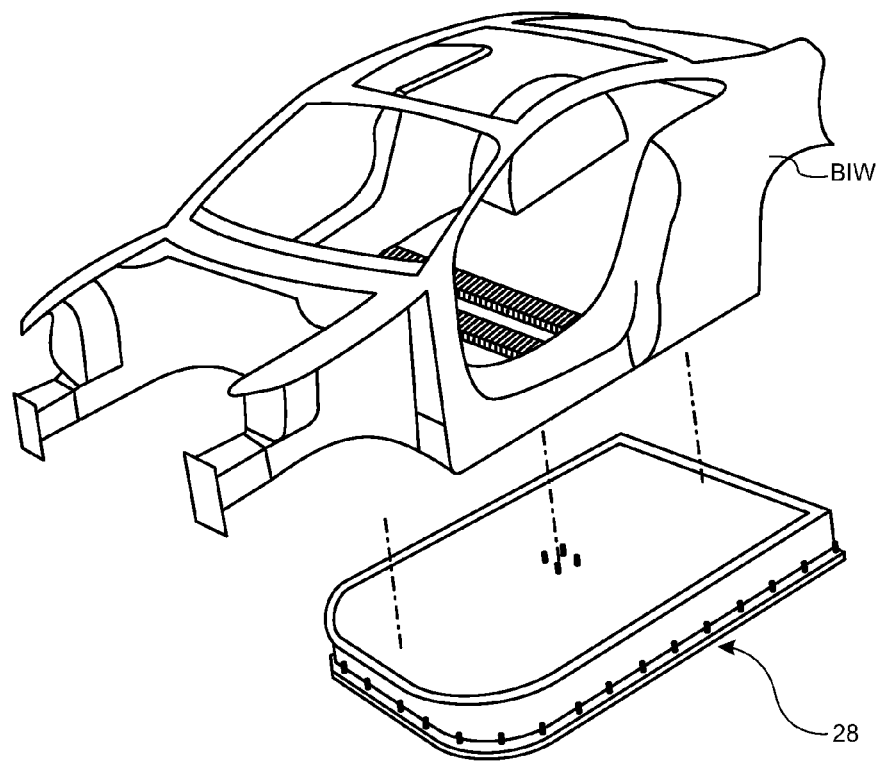
FIGS. 12a and 12b show, respectively, perspective views of a known vehicle having an underfloor-type battery pack beneath a vehicle, prior to installation, and a vehicle configured according to the invention, wherein the pack is shown beneath the vehicle prior to installation.
Figure 12B:
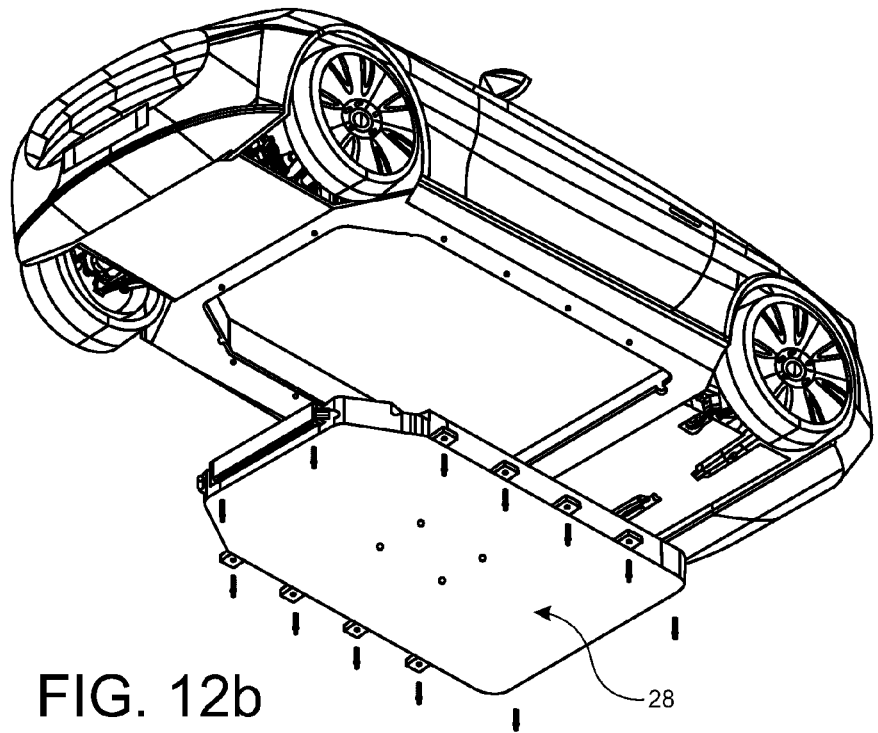

An underfloor-type battery pack 28 is shown in FIG. 12a positioned beneath a BIW into which it can be installed. The planar-like nature of the pack 28 is such that it would not intrude into the cabin space, thus avoiding a significant reduction in space for the occupant or luggage. The cavity that receives the pack 28 is shown in FIG. 12b, with a pack aligned for installation.

Figure 12C:
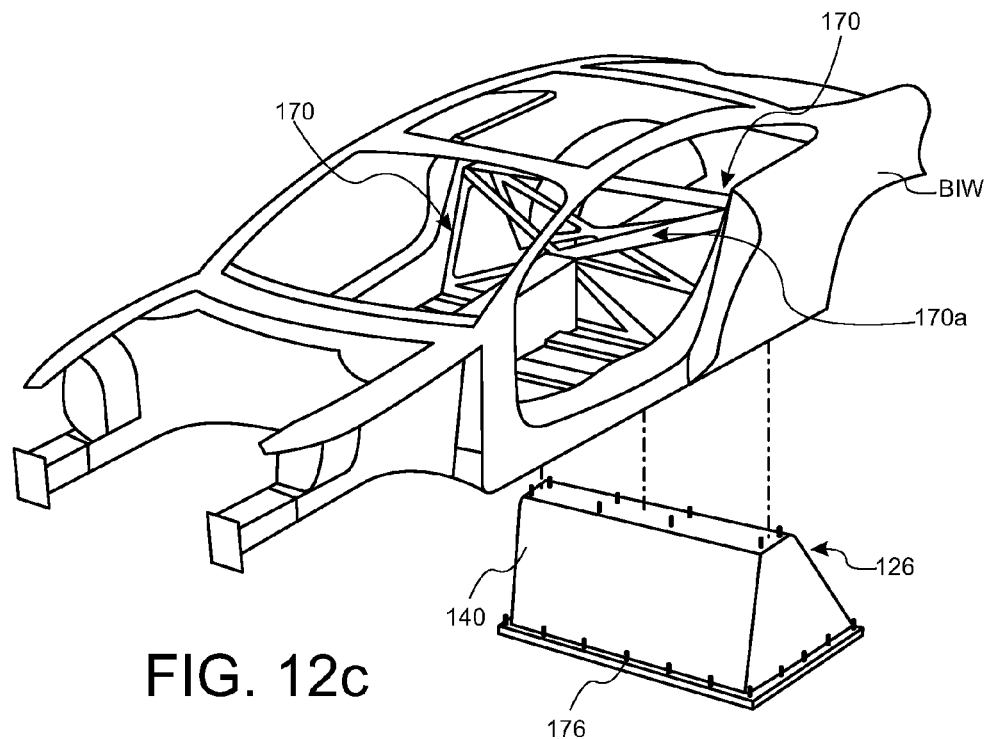

FIG. 12c shows the vehicle of FIG. 12a having a compartment 170 with an aperture 172 for receiving a lateral module 126. The compartment is sized to accommodate the lateral module 126. In the example shown the aperture 172 is beneath the vehicle. An aperture can, alternatively, be provided on the side of the vehicle or within the vehicle, such that a lateral module can be inserted in a horizontal direction or a vertical direction, respectively. The compartment can be defined by a cage having struts 170a. The struts can form a brace extending laterally across the BIW. The struts can also be provided extending vertically at the side of the BIW. Further, the struts can form a diagonal cross-shape brace between the sides of the BIW. Additionally or alternatively, walls 170b of the compartment can be formed from sheet material, such as carbon fibre, or sheet steel. The compartment forms an integral structural part of the vehicle.

The compartment functions as a cavity or recess into which the lateral module can be stored.

Figure 12D:
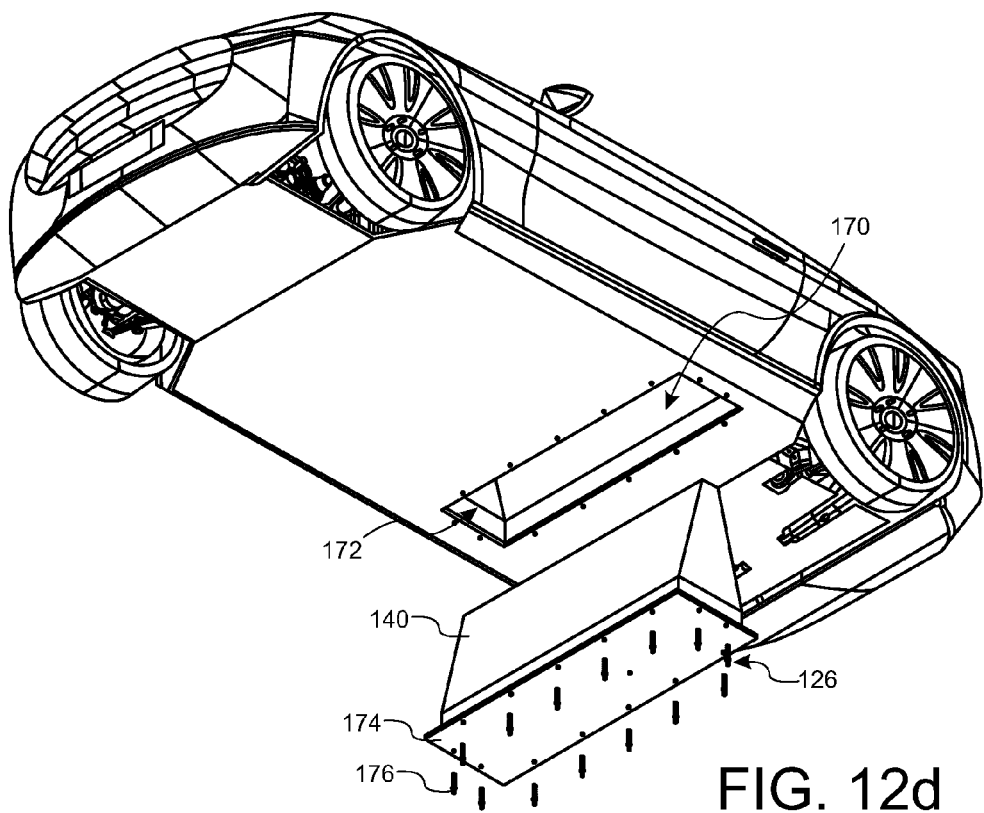

The cavity that receives the pack 126 is shown in FIG. 12d. The lateral module 126 is shown configured upon a support 174 having fixings 176. The fixings are shown around the perimeter of the aperture 172. The envelope 140 can also include fixings for securing the lateral module to the compartment 170.

Figure 13:
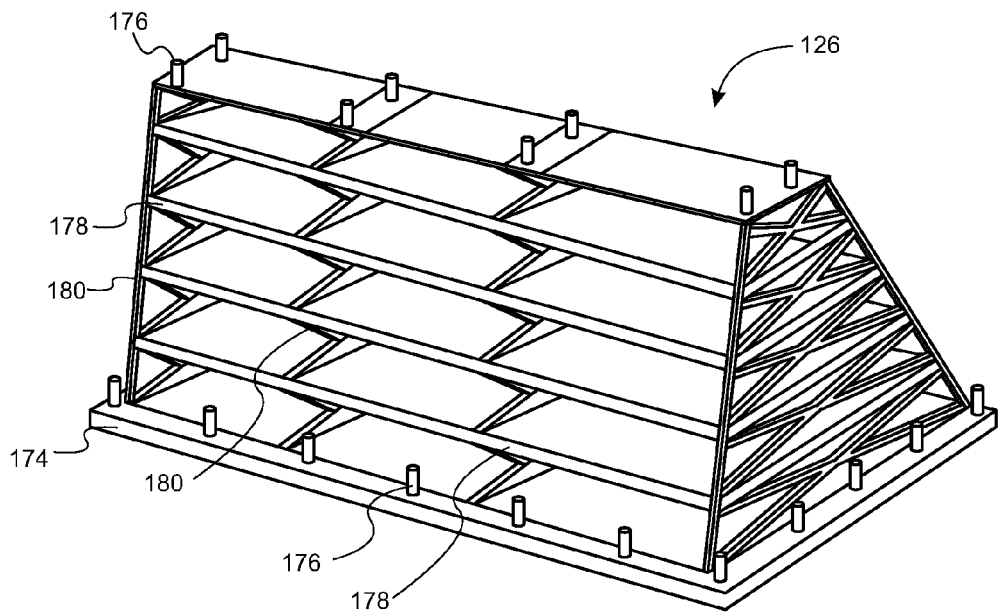
FIG. 13 is a perspective sketch of the internal structure of a lateral module.

A sketched perspective view of an example interior of the lateral module 126, without the envelope 140, is shown in FIG. 13 such that the interior structure can be appreciated. Built upon the support 174 are a series of shelves 178 connected by braces 180 that create sub-compartments 182 for retaining cells 150, or packs holding cells, as described above in relation to FIGS. 5a to 5c. The sub-compartments are illustrated, by way of example, in rectilinear form, and can additionally or alternatively have a triangular, circular or hexagonal profile. Cells and/or packs can be protected by the shelf 178, braces 180 and envelope 140, or a combination thereof. The cells and/or packs can also be configured in a protective case. Fixings 176 are provided around the perimeter of the support for connection to the BIW, as illustrated in FIG. 12d. Fixings are also provided on the upper surface of the lateral module 126 and/or envelope 140 for connection with the compartment 170 within the vehicle.

Figure 14A:
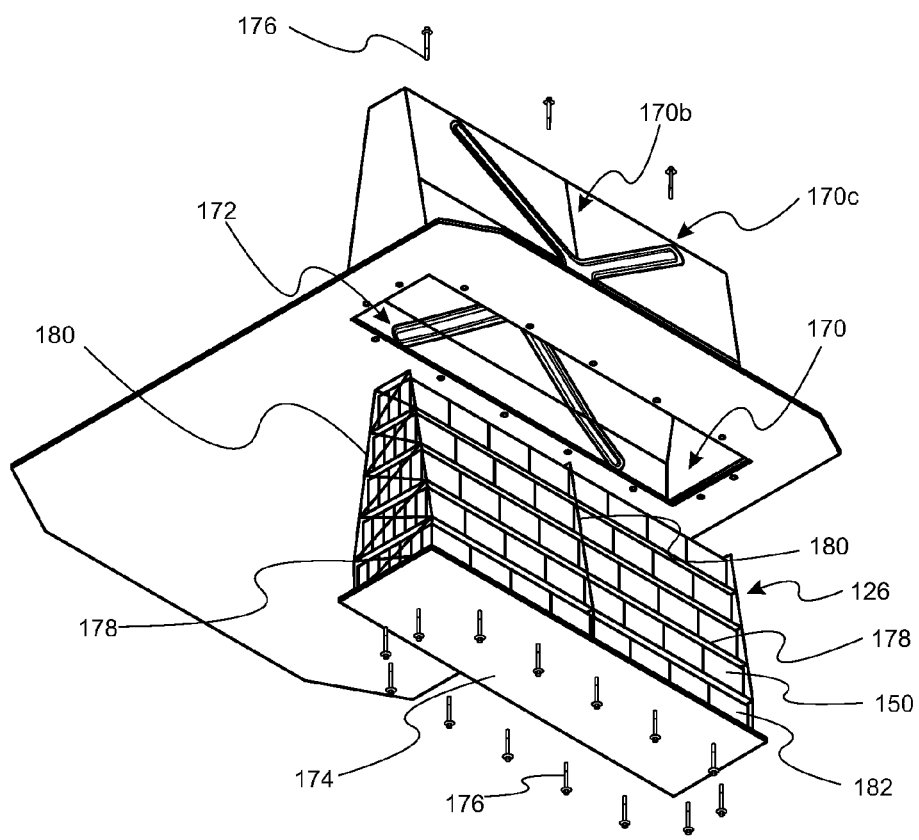
FIGS. 14a to 14c are expanded views of the cells of the pack, interior structure of the lateral module, envelope of the lateral module and compartment prior to all these components nesting together.
Figure 14B:
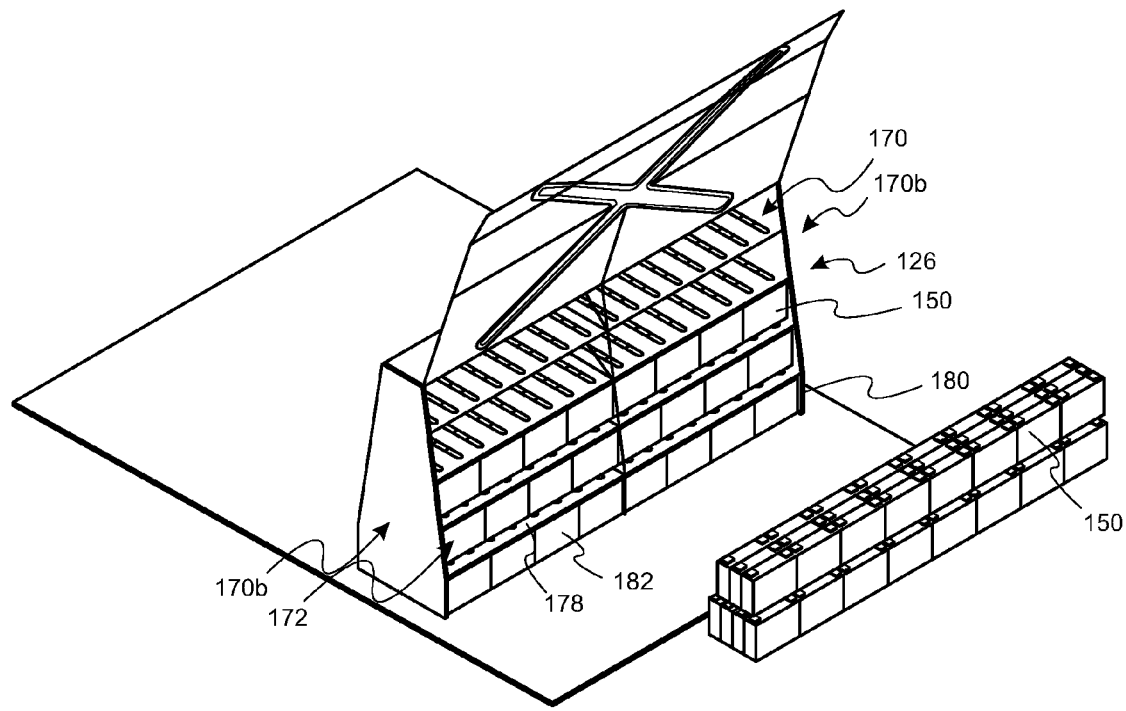
Figure 14C:
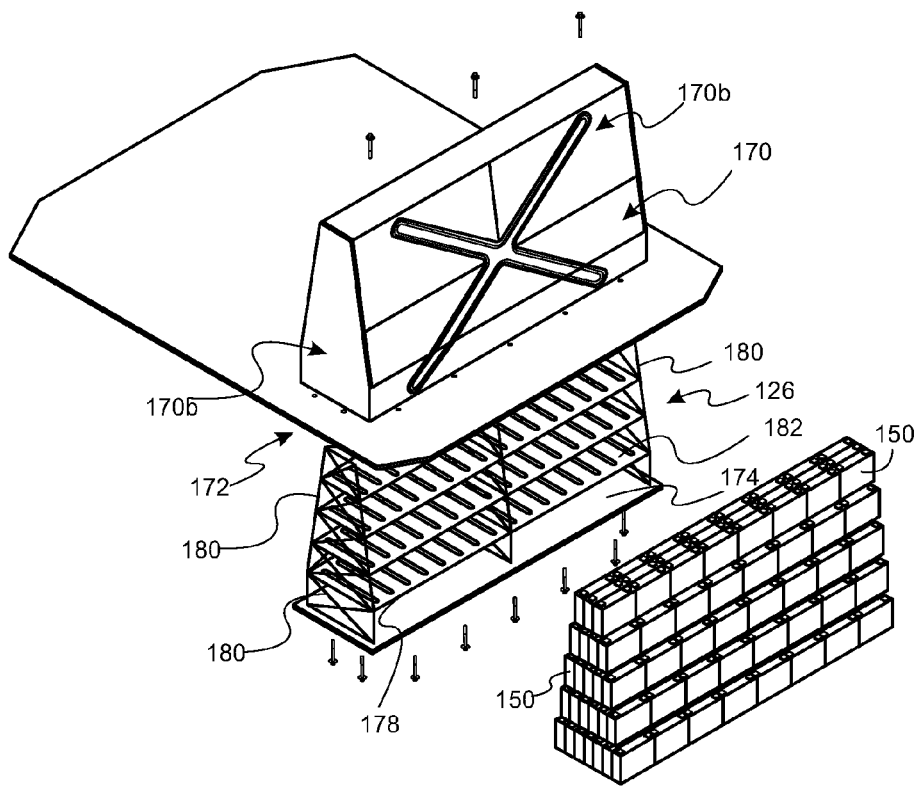

FIGS. 14a to 14c are expanded views of the compartment 170 and module 126 with the interior structure and cells 150 visible. FIG. 14a is an expanded view of the components of the compartment 170, the envelope 140 and the lateral module 126, interior structure of the lateral module, including the fixings 176, shelves 178 and braces 180, as well as the individual cells 150, 152, 154, 156. When assembled, in use, these components are nested together within the vehicle. The compartment can be defined by struts 170a and/or a wall 170b, which can be provided with reinforcement formations 170c. The formations can be provided to increase the rigidity of walls 170b having large surface areas. The compartment 170 is shown in isolation although can be connected to the vehicle sides and/or floor. In this example, the compartment is connected to a floor panel and formed of walls 170b having a formation 170c. A lateral module 126 having a support 174 for a base, shelves and braces is positioned for installation into the compartment before being secure therein via fixings 176. The envelope of the lateral module is optional and not shown. The envelope of the lateral module can engage with the compartment via, for example, braces 180. The structure of the lateral module can be analogous to the structure of the compartment in that has equivalent structural features to the struts 170a and/or a walls 170b in the form of sheet material, such as sheet metal e.g. sheet steel. The arrangement of FIG. 14a is suitable for bottom-loading of the lateral module 126 as a whole. A large pack e.g. the lateral module, would be heavy and installation would require lifting the pack into the compartment or lowering the vehicle on a 4-post lift on to a pack resting on a trolley on the floor beneath. To facilitate installation, the compartment and/or lateral module can be configured with alignment features such that the fixing features e.g. bolts at the top and/or bottom of the lateral module engage with the uppermost and/or lowermost perimeter of the compartment.

FIG. 14b illustrates a configuration in which the compartment 170 and lateral module are integral, and installation of the cells or packs 150, 152 is from the side of the compartment. Cells can be individually inserted on the shelves 178. This configuration avoids the need for an aperture 172 on the floor of the vehicle. Further, the range of the vehicle can be readily adjusted by providing a customisable number of cells. For example (i) a city vehicle may only require two of the shelves to be populated with cells, which can be the two lowermost shelves, while (ii) said city vehicle can optionally hire or lease additional cells if longer range is required, and fully populate the shelves with cells.

Customising the number of cells 150, 152, 154, 156 in a lateral module 126 is possible in the configuration of FIG. 14*c*, wherein a compartment 170 has an aperture 172 beneath the vehicle and the lateral module with shelves 178 and braces 180 is inserted from beneath. As described in relation to FIG. 14*b*, not all the shelves have to be populated with cells. For reference, a full suite of cells 150 are shown adjacent the lateral module prior to installation.

Overall, the compartment 170 is connected to the vehicle, and can provide inherent strength by functioning as a torsion box and improving the structural strength of the vehicle on its own. The support 174 of the lateral module 140 is configured to close the aperture 172 and compliment the strength of the compartment by becoming a component of the torsion box. Further, the envelope 140 of the lateral module can be removably connected to the compartment 170, such that the compartment connects to the upper and lower portions of the lateral module, resulting in at least one of the lateral module envelope 140, shelves 178 and braces 180 adding to the strength of the compartment-effectively creating a dual-skinned torsion box. Finally, cells/packs 150, 152, 154, 156 configured having structural shells or enclosures can further enhance the strength of the lateral module.

Cells/packs can be connected to the lateral module 126. In other words, the one or more combined components provide a strength that is greater than the sum of the parts.

On a vehicle having a compartment 170, the compartment and/or the lateral module 126 can include additional structural members:

Battery pack inner lateral members, such as braces 180, the envelope 140 or sub-compartments 182, which are configured to provide: mounting points for the battery cells or modules (e.g. longitudinal members can perform this function); and an arresting function for battery cells or modules in the event of a front or rear impact. The following functions become of secondary importance as a result of having the panels/cross-members fore, aft and above the battery pack, and the support structure for each additional stack of cells/modules providing structural functions: to provide lateral connection, and hence a load path from the battery pack casing sides to primarily provide stiffness during side impacts; and, to add torsional and bending stiffness to the battery pack. As a result the section size of the battery pack inner lateral members can be smaller than those of alternative battery packs, such as underfloor battery packs.

Battery pack inner longitudinal members, such as braces 180, the envelope 140 or sub-compartments 182, which are configured to provide: mounting points for the battery cells or modules (the lateral members may perform this function); and an arresting function for battery cells or modules in the event of a side impact. To a lesser extent than with underfloor battery packs, battery pack inner longitudinal members provide longitudinal connection, and hence a load path, from the battery pack casing front and rear lateral members as the battery pack support structure for each additional stack of cells/modules also contributes this structural function. The battery pack inner longitudinal members also add torsional and bending stiffness to the battery pack as a secondary function.

Battery pack lower shield, such as the support 174, which can be configured to provide resistance to puncture from objects hitting the underside of the vehicle, while additionally providing additional stiffness to the battery casing. This shield can be comparable with the underfloor battery pack shield, being typically made from aluminium of about 6 mm thickness or steel of about 1.5 mm thickness, with the significant different being the size because the aperture 172 of the compartment is smaller than that of a slab-type pack in an underfloor-type vehicle system.

Battery pack outer casing, such as the envelope 140, typically formed from steel and/or aluminium, yet having thinner sections than the equivalent volume underfloor battery pack due to the lower structural requirements enabled by the better integration of the lateral battery pack in the vehicle and the structural function provided by the panels/cross-members fore, aft and above the battery pack.

Battery pack support structures, such as braces 180 or shelves 178, for each additional stack of cells/modules, wherein said structure can be provided for each additional stack of battery cells or modules to support the weight of the cells or modules. This support structure can be mechanically connected to the structure below and can provide the ability to have a mechanical connection to the panel/cross-members in front, behind and above the battery pack, enabling high integration of the battery pack with the vehicle. The panel/cross-members in front, behind and above the battery pack, through the mechanical connection could also contribute to the function of supporting the weight of the battery cells or modules.

Integration of battery pack with vehicle can include fastenings 176 at multiple points to the body at the panels/cross-members fore, aft and above the battery, the rockers and the body sides. The integration of the battery pack with the body adds to the torsional and bending stiffness of the body. As the lateral battery pack has a higher stiffness than an equivalent volume underfloor battery pack, and as a result of better distribution of the mechanical connection across the body of the battery pack, it provides a greater contribution to the stiffness of the vehicle. A typical lateral battery pack casing including structural members would have a mass of 30 kg to 120 kg, the additional stiffness offered by the integration of the battery pack, and body is likely to be moderate compared with that possible if the body were to be stiffened by a similar mass optimally placed. As battery cells or modules progress to use as structural members, whereby the cells can be subjected to moderate strain levels and still require protection from rupturing, the structural properties of the lateral battery pack will improve, providing a useful improvement to vehicle torsion and bending stiffness, a definite improvement over the underfloor battery pack due to the reduction in span and much greater height (second moment of area) of the battery pack.

Panel/cross-member configured above the battery pack e.g. braces 180 or struts 170*a*, which provides lateral connection between the body sides, door-rings and/or A-pillar or B-pillar, at what is typically areas of high strain during a side impact. The form and shape of the panel/cross-member will depend on the individual application, however the primary function will remain to connect the body sides to provide a load path for lateral forces during a side impact, to resist torsional forces resulting from road inputs and to provide a mounting point for the battery pack casing. This structural element is likely to be connected to the battery outer casing i.e. the envelope 140 or braces 180, to enhance the stiffness of the integrated structure and provide a support function for the additional stacks of battery cells or modules.

Panel/cross-member behind the battery pack, which provides lateral connection between the body sides, rockers and door-rings and/or A-pillar or B-pillar, at what is typically areas of high strain during a side impact. The form and shape of the panel/cross-member will depend on the individual application, however the primary function will remain to connect the body sides to provide a load path for lateral forces during a side impact, to resist torsional forces resulting from road inputs and to provide a mounting point for the battery pack casing. This structural element is likely to be connected to the battery pack outer casing, which is the envelope 140, to enhance the stiffness of the integrated structure.

Panel/cross-member in front of battery pack, which provides lateral connection between the body sides, rockers and door-rings and/or A-pillar or B-pillar, at what is typically areas of high strain during a side impact. The form and shape of the panel/cross-member will depend on the individual application, however the primary function will remain to connect the body sides to provide a load path for lateral forces during a side impact and to resist torsional forces resulting from road inputs and to provide a mounting point for the battery pack casing. This structural element is likely to be connected to the battery pack outer casing at multiple points to enhance the stiffness of both elements. The floor tunnel with be connected to this structural element to enhance the stiffness of both elements.

The compartment 170 above has been described in relation to a lateral module 126 only. In light of the teaching herein, the structural elements and features taught in relation to the compartment 170 and lateral module 126 can be applied/adapted to any one of the longitudinal module 128, rear module 130 and front module 132, or a combination thereof. The footprint of the required compartments, and corresponding apertures, would correspond, by way of example, to the footprints illustrated in FIGS. 3a to 3d.

An additional module, such as a longitudinal module 128, not only increases the volume of the pack, but the compartment can provide additional strength to a vehicle by functioning as the floor tunnel. Swaging on the floor panel and the seat cross-members all contribute to the torsional stiffness and bending stiffness. The compartment for a longitudinal module can also function as a structural member for front and rear impact performance.

Each of the lateral module 126, longitudinal module 128, rear module 130 and front module 132 can have their own pack 126 and envelope 170 as described above, or the pack can be combined as a single unit. Each module can have its own aperture 172.

Figure 15:
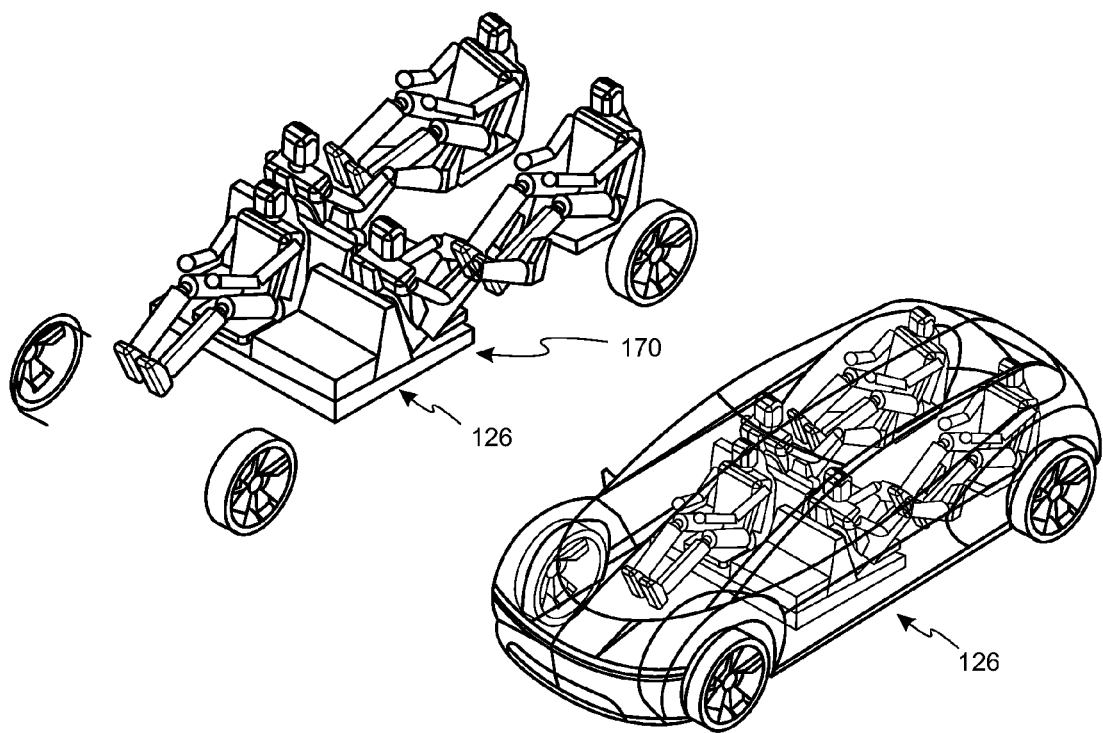
FIG. 15 is an alternative arrangement of the lateral module that extends across the width of the vehicle in an offset manner, shown with and without the skin of a body-in-white.

FIG. 15 shows a compartment/lateral module 126, 170 extending across the width of a vehicle, which extends between a first seat facing forwards and occupied by a passenger, and a second seat, directly behind, facing rearward. The lateral module can be described as dividing the passenger compartment in to front and rear sections. Overall there are 5 seats in the rear, with only four passengers illustrated. The lateral module 126 has front modules and rear modules or portions that extend beneath the adjacent seats/passengers, which provides additional volume to the lateral module 126. The lateral module extends from beneath the lowest point of the first seat and/or the second seat, and an uppermost point of the compartment that is above at least the maximum height of a cushion of the first seat and/or the second seat. The lateral module extends in an offset manner across the vehicle width. It can have a profile including a step, or bend. In other words it can be described as being non-linear, or asymmetric. The configuration of the lateral module can be offset to accommodate different passenger or cargo requirements according to the vehicle's purpose. In this particular example, the layout is suitable for a London Taxi, wherein only a driver sits upfront, while up to 5 passengers sit in a rear compartment.

Figure 16:
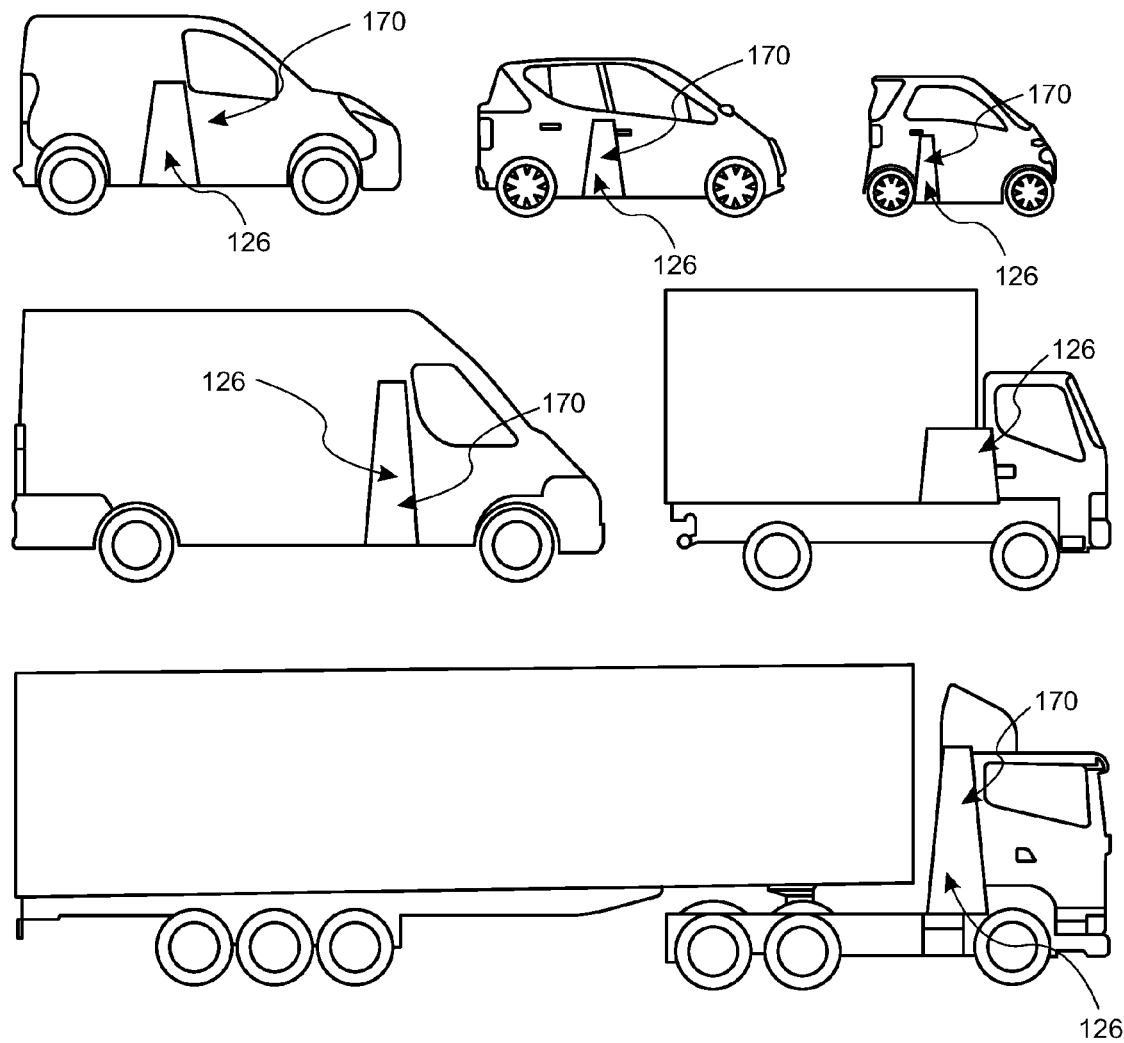
FIG. 16 is a collection of side views of different vehicles having the position of a compartment super-imposed thereon.

FIG. 16 illustrates different vehicle types in side-view, with a profile of a compartment/lateral module 126, 170 superimposed on the side of each vehicle in a position that enables the compartment to provide, at least, additional structural integrity to the vehicle in question. The compartment can, by way of example, extend between the B-pillars to improve amongst other things the crash worthiness of the passenger compartment. As shown, the compartment can be configured in both passenger vehicles, commercial panel vans and tractor-trailer type heavy good vehicles. In light of the teaching herein, the modules 126, 128, 130, 132 and/or compartments can be adapted to different vehicle types, such as those incorporating arrangements such as: two seats, in line, back-to-back; a first seat facing forward and back-to-back with at least two seats, which can be individual seats, or a bench seat; two seats facing forward, and at least two adjacent seats arranged back-to-back; a first seat facing in a perpendicular direction to travel and a second adjacent seat arranged back-to-back facing in the opposite direction to the first seat, such that the module and compartment extend in a longitudinal direction of the vehicle.

The present invention has been described above purely by way of example, and modifications can be made within the spirit of the invention, which extends to equivalents of the features described.

For example, many of the vehicles illustrated are shown having two seats and two passengers thereupon. It would be clear to a skilled person that further seating can be provided according to the type and function of the vehicle.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention also consists in any individual features described or implicit herein or shown or implicit in the drawings or any combination of any such features or any generalisation of any such features or combination.

The invention claimed is:

1. A vehicle having an electric motor and a pack for storing energy, said vehicle configured having a first seat, configured to face forward, and
  a compartment for receiving the pack,
  wherein the compartment includes reinforcing features, including walls that form a firewall, said firewall connected to body sides that create a structure for resisting torsional bending forces experienced by the vehicle in use, wherein said compartment is configured:
    as a cage for functioning as a torsion box, and integral with the vehicle structure and/or a body, and behind the first seat; and
    to extend laterally across the vehicle substantially perpendicular to its longitudinal axis,
  wherein the pack is configured having a lateral module configured to extend laterally across the vehicle substantially perpendicularly to a longitudinal axis of the vehicle,
  wherein the height of the compartment extends in a vertical direction between:
    a lowermost point of the compartment that is beneath the lowest point of the first seat adjacent to the compartment, and
    an uppermost surface of the compartment that is above at least one of:
      the top of a seat back of the first seat;
      the maximum height of a cushion in the first seat in a first row;
      an average height of the cushion in the first seat in the first row; and
      a hip-point of at least the first seat in the first row.

2. A vehicle according to claim 1, further comprising a longitudinal module configured: to extend along a longitudinal axis of the vehicle; to extend perpendicularly from the lateral module; and to extend, at least in part, between the first seat and a second seat.

3. A vehicle according to claim 1, wherein said first seat is positioned to the side of the longitudinal axis of the vehicle.

4. A vehicle according to claim 1, wherein the longitudinal axis is central to the vehicle, and the vehicle is configured having: at least two front seats, separated by the longitudinal axis; and/or at least two rear seats, separated by the longitudinal axis.

5. A vehicle according to claim 1, wherein at least one first seat and at least one second seat are arranged, at least in part, back-to-back.

6. A vehicle according to claim 1, wherein the maximum distance between the first seat and a second seat is less than the maximum dimension of the first seat or the second seat in the longitudinal direction.

7. A vehicle according to claim 1, further comprising a second seat as a bench seat.

8. A vehicle according to claim 1, wherein the pack further comprises a longitudinal module connected to the lateral module, the longitudinal module configured to extend along the longitudinal axis from the lateral module towards the front of the vehicle.

9. A vehicle according to claim 1, wherein the pack has a rear module connected to the lateral module and configured to extend rearward from the lateral module.

10. A vehicle according to claim 9, wherein the rear module is wider towards the front of the vehicle and narrower towards the rear of the vehicle.

11. A vehicle according to claim 9, wherein the rear module is configured to extend: between at least two second seats in line with a longitudinal module; and/or beneath a second seat.

12. A vehicle according to claim 11, wherein a lowermost surface of the longitudinal module and a lowermost surface of the lateral module extend at the same level in the vehicle.

13. A vehicle according to claim 1, wherein the height of the lateral module is at least one of: a maximum of the height of the lowermost position of the top of either the first seat or a second seat, or up to 100 mm lower; at least greater than the maximum height of the cushion of the first or second seats in the first row and/or a second row; and lower than the lowest edge of a window opening nearest to the pack.

14. A vehicle according to claim 1, configured having at least one of the following parameters:
the lateral module having a volume ranging from about 3791 to about 11231;
the length of the pack further includes a longitudinal module, the lateral module, and a rear module is between about 88% to about 92% of the wheelbase;
the length of the base of the lateral module is between about 26% to about 41% of the wheelbase length in the longitudinal direction;
in the vehicle having the lateral module and the longitudinal module, the lateral module is between about 275% and about 720% of the volume of the longitudinal module, and/or about 150% and about 350% of the height of the longitudinal module,
when the pack extends outside of the area beneath front seat passengers the hip-point of front passenger is between about 31% and about 41% of the vehicle height, when taking in to account the area in which the pack can be configured in vehicle, and the height of the vehicle, the packaging efficiency (i) the volume of the pack per $m^2$, which is the wheelbase multiplied by the average of the track of the vehicle, and (ii) the volume of the pack per $m^2$ compared to the height of the vehicle, then the pack provides between about 144 $l/m^2$ and about 265 $l/m^2$, and/or about 294 l/m and about 885 l/m.

15. A vehicle according to claim 1, wherein the lowermost surface of the pack is level with at least one of the bottom of the vehicle, which is the floor of the body-in-white, or bottom of the vehicle chassis.

16. A vehicle according to claim 1, wherein the length of an uppermost portion of the lateral module in the longitudinal direction is between about 10% and about 50% of the length of a base of the lateral module.

17. A vehicle according to claim 1, wherein the vehicle has a planar slab-like underfloor battery pack and at least one of the lateral module, a longitudinal module, a front module and a rear module.

* * * * *